US012281472B2

(12) United States Patent
Patton et al.

(10) Patent No.: US 12,281,472 B2
(45) **Date of Patent: *Apr. 22, 2025**

(54) QUICK ASSEMBLE WALL SYSTEM, AND RELATED METHODS

(71) Applicant: Varidesk, LLC, Coppell, TX (US)

(72) Inventors: David Patton, Flower Mound, TX (US); Michael Creighton, Warrington, PA (US); Ersen Boran, Chalfont, PA (US); Shuichi Amano, Bethlehem, PA (US); Gary Reuther, Warminster, PA (US); Nicholas Max, Quakertown, PA (US); Olin Linke, III, Allen, TX (US); William Benoist, Carrollton, TX (US)

(73) Assignee: VARIDESK, LLC, Coppell, TX (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/862,332

(22) Filed: Jul. 11, 2022

(65) Prior Publication Data

US 2022/0341162 A1 Oct. 27, 2022

Related U.S. Application Data

(63) Continuation-in-part of application No. 16/891,799, filed on Jun. 3, 2020, now Pat. No. 11,585,087, which (Continued)

(51) Int. Cl.
*E04B 2/00* (2006.01)
*E04B 2/74* (2006.01)

(Continued)

(52) U.S. Cl.
CPC .......... *E04B 2/7435* (2013.01); *E04B 2/7409* (2013.01); *E04B 2/7433* (2013.01);

(Continued)

(58) Field of Classification Search
CPC .... E04B 2/7433; E04B 2/7425; E04B 2/7422; E04B 2002/7462; E04B 2002/742;

(Continued)

(56) References Cited

U.S. PATENT DOCUMENTS 5,155,955 A 10/1992 Ball et al.
5,433,046 A * 7/1995 MacQuarrie .......... E04B 2/7422 52/240

(Continued)

FOREIGN PATENT DOCUMENTS

GB 2289701 A 11/1995
GB 2438775 A 12/2007

(Continued)

OTHER PUBLICATIONS

Extended European Search Report issued in related European Patent Application No. 18172295.0 dated Sep. 28, 2018.

(Continued)

*Primary Examiner* — Chi Q Nguyen
(74) *Attorney, Agent, or Firm* — Squire Patton Boggs (US) LLP

(57) ABSTRACT

A wall panel includes a first upright post, a second upright post, an upper stretcher connecting the first upright post to the second upright post, a lower stretcher connecting the first upright post to the second upright post, and a frame having an extrusion profile, wherein the extrusion profile is configured to couple the frame to the wall panel frame. A wall panel assembly includes a plurality of the wall panels.

22 Claims, 42 Drawing Sheets

Related U.S. Application Data is a continuation of application No. 15/979,909, filed on May 15, 2018, now Pat. No. 10,689,844.

(60) Provisional application No. 62/506,346, filed on May 15, 2017.

(51) Int. Cl.

| | |
|---|---|
| ***E04B 2/78*** | (2006.01) |
| ***E05D 15/06*** | (2006.01) |
| *E05B 65/00* | (2006.01) |
| *E05C 1/04* | (2006.01) |
| *E05C 1/10* | (2006.01) |
| *E06B 3/46* | (2006.01) |

(52) U.S. Cl.

CPC .......... *E04B 2/7453* (2013.01); *E04B 2/7818* (2013.01); *E05D 15/0626* (2013.01); *E04B 2002/7418* (2013.01); *E04B 2002/742* (2013.01); *E04B 2002/7446* (2013.01); *E04B 2002/7461* (2013.01); *E04B 2002/7462* (2013.01); *E04B 2002/7466* (2013.01); *E04B 2002/7488* (2013.01); *E04B 2002/749* (2013.01); *E05B 65/006* (2013.01); *E05C 1/04* (2013.01); *E05C 1/10* (2013.01); *E06B 3/4636* (2013.01)

(58) Field of Classification Search

CPC ..... E04B 2002/7446; E04B 2002/7466; E04B 2002/7487; E04B 2002/749; E04B 2002/7461; E04B 2/7435; E04B 2/7409; E04B 2/7453; E04B 2002/7418; E04B 2002/7488; E05D 15/0626; E05B 65/006; E05C 1/04; E05C 1/10; E06B 3/4636

See application file for complete search history.

(56) References Cited

U.S. PATENT DOCUMENTS

| | | | | |
|---|---|---|---|---|
| 5,524,402 | A | 6/1996 | Sykes | |
| 5,592,787 | A | 1/1997 | Ophardt | |
| 5,642,593 | A | 7/1997 | Shieh | |
| 6,115,977 | A | 9/2000 | Hornberger et al. | |
| 6,341,457 | B1 | 1/2002 | Aerts et al. | |
| 6,425,219 | B1 * | 7/2002 | Barmak | E04B 2/7425 52/656.1 |
| 6,446,396 | B1 | 9/2002 | Marangoni et al. | |
| 6,729,085 | B2 | 5/2004 | Newhouse et al. | |
| 7,975,445 | B2 | 7/2011 | Parshad et al. | |
| 8,408,579 | B2 * | 4/2013 | Bourgier | A63C 5/006 280/609 |
| 8,656,648 | B2 | 2/2014 | Liegeois et al. | |
| 8,910,435 | B2 | 12/2014 | Feldpausch et al. | |
| 9,243,422 | B2 | 1/2016 | Hunt et al. | |
| 9,315,985 | B2 * | 4/2016 | Gosling | E04B 2/7422 |
| 9,556,639 | B2 | 1/2017 | Hunt et al. | |
| 9,649,831 | B2 | 5/2017 | Gosling et al. | |
| 10,508,452 | B2 * | 12/2019 | Hooper | E01F 7/025 |
| 10,689,844 | B2 | 6/2020 | Patton et al. | |
| 11,585,087 | B2 * | 2/2023 | Patton | E04B 2/7435 |
| 11,814,839 | B2 * | 11/2023 | Colin | A47B 47/027 |
| 2001/0013209 | A1 * | 8/2001 | Waalkes | E04B 2/7433 248/245 |
| 2002/0029529 | A1 | 3/2002 | Waalkes et al. | |
| 2003/0041540 | A1 * | 3/2003 | Gravel | E04B 2/7422 52/656.1 |
| 2003/0070377 | A1 * | 4/2003 | Waalkes | E04B 2/7433 52/481.2 |
| 2003/0089057 | A1 | 5/2003 | Wiechecki et al. | |
| 2004/0035074 | A1 * | 2/2004 | Stanescu | E04B 2/7422 52/36.5 |
| 2007/0163190 | A1 | 7/2007 | Hofman et al. | |
| 2008/0209827 | A1 * | 9/2008 | Webb | E04B 2/821 52/220.7 |
| 2009/0090076 | A1 | 4/2009 | Abusada et al. | |
| 2009/0094913 | A1 | 4/2009 | Singh | |
| 2010/0186326 | A1 | 7/2010 | Cummings et al. | |
| 2013/0111833 | A1 | 5/2013 | Glass et al. | |
| 2013/0145719 | A1 | 6/2013 | Tseng | |
| 2015/0042107 | A1 | 2/2015 | Glickman et al. | |

FOREIGN PATENT DOCUMENTS

| | | | |
|---|---|---|---|
| JP | 2002-65383 | A | 3/2002 |
| KR | 20040058760 | A | 7/2004 |
| KR | 101537087 | B1 | 7/2015 |

OTHER PUBLICATIONS

Communication Pursuant to Article 94(3) EPC dated Apr. 6, 2020, directed to EP Patent Application No. 18172295.0; 9 pages.

Communication Pursuant to Article 94(3) EPC dated Apr. 6, 2021, directed to EP Patent Application No. 18172295.0; 4 pages.

* cited by examiner

QUICK ASSEMBLE WALL SYSTEM, AND RELATED METHODS

CROSS-REFERENCE TO RELATED APPLICATIONS

This application is a continuation-in-part of U.S. patent application Ser. No. 16/891,799, filed Jun. 3, 2020, now U.S. Pat. No. 11,585,087. U.S. patent application Ser. No. 16/891,799 is a continuation of U.S. patent application Ser. No. 15/979,909, filed May 15, 2018, now U.S. Pat. No. 10,689,844, which claims priority to U.S. Provisional Patent Application No. 62/506,346, filed May 15, 2017. The contents of all of the aforementioned applications are hereby incorporated by reference in their entireties.

TECHNICAL FIELD

The present application relates to a quick assemble wall system and related methods. More specifically, the present application relates to a system for quickly installing and removing wall panel systems, for example, in an office environment.

BACKGROUND

Office spaces typically include large open areas which are divided into smaller workspaces by wall panel systems. The wall panel systems generally include wall panels each having frames and panels which can be modularly assembled to create a workspace. The wall panels can be assembled, disassembled, and reassembled to a new configuration to accommodate the needs of the user. However, these wall panel systems often require additional tools and fasteners for attachment of the frames and panels. The added equipment creates complex, difficult, and/or time consuming assembly and disassembly.

SUMMARY

According to an embodiment, a wall panel includes a wall panel frame. The wall panel frame has a first upright post, a second upright post, an upper stretcher connecting the first upright post to the second upright post, a lower stretcher connecting the first upright post to the second upright post, and a frame having an extrusion profile, wherein the extrusion profile is configured to couple the frame to the wall panel frame.

According to an embodiment, each of the first upright post and the second upright post includes one or more hole patterns.

According to an embodiment, the one or more hole patterns each include a plurality of openings and a cutout.

According to an embodiment, the upper stretcher and the lower stretcher are identical.

According to an embodiment, the upper stretcher or the lower stretcher includes a hole pattern, the hole pattern configured to align with a hole pattern on the first upright post, the second upright post, or both the first upright post and the second upright post.

According to an embodiment, the hole pattern on the upper stretcher or the lower stretcher includes one or more slots configured to engage one or more fasteners installed in the aligned hole pattern.

According to an embodiment, the wall panel further includes a clip configured to couple the first upright post to the frame.

According to an embodiment, the extrusion profile includes a hook portion configured to engage a hook portion on the clip to secure the frame to the first upright post.

According to an embodiment, the wall panel further includes a second clip configured to couple the first upright post to the frame.

According to an embodiment, the hook portion of the extrusion profile is configured to engage a hook portion on the second clip to secure the frame to the first upright post.

According to an embodiment, the clip is a spring clip configured to move between a first, original state and a second, depressed state, wherein the extrusion profile causes the spring clip to move from the first, original state to the second, depressed state, and back again to the first, original state.

According to an embodiment, the clip is countered and includes a latch portion configured to couple to the first upright post and one or more hook portions configured to engage with the extrusion profile.

According to an embodiment, the extrusion profile includes a first lateral extrusion and a second lateral extrusion, and wherein the first lateral extrusion is configured to couple the frame to the first upright post and the second lateral extrusion is configured to couple the frame to the second upright post.

According to an embodiment, the first lateral extrusion and the second lateral extrusion are coupled to the same surface of the frame.

According to an embodiment, the first lateral extrusion is configured to couple to a plurality of clips on the first upright post and the second lateral extrusion is configured to couple to a plurality of clips on the second upright post.

According to an embodiment, the wall panel further includes a second extrusion profile coupled to the lower stretcher, the second extrusion profile configured to couple an auxiliary unit to the lower stretcher.

According to an embodiment, the frame is a plurality of frames, and wherein adjacent frames of the plurality of frames are separated by an additional stretcher.

According to an embodiment, the upper stretcher and the lower stretcher each have a first end plate and a second end plate, wherein the first end plate has a first end plate hole pattern configured to align with a first upright post hole pattern on the first upright post, and wherein the second end plate comprise a second end plate hole pattern configured to align with a second upright post hole pattern on the second upright post.

According to an embodiment, the first end plate hole pattern and the second end plate hole pattern each comprise at least one slot configured to slide over a fastener previously secured in the first upright post hole pattern and the second upright hole pattern, respectively.

According to an embodiment, the first end plate hole pattern and the second end plate hole pattern each comprise at least one discrete hole, and wherein a fastener is installed in the discrete hole after the first end plate hole pattern is aligned with the first upright post hole pattern and the second end plate hole pattern is aligned with the second upright post hole pattern.

According to an embodiment, a wall panel assembly includes a plurality of wall panels, each wall panel having a first upright post, a second upright post, an upper stretcher connecting the first upright post to the second upright post, a lower stretcher connecting the first upright post to the second upright post, and a frame having an extrusion profile, wherein the extrusion profile is configured to couple the frame to first upright post and the second upright post, and one or more brackets configured to join the first upright post of adjacent wall panels of the plurality of wall panels.

According to an embodiment, each of the one or more brackets includes a hole pattern configured to align with a hole pattern on the first upright post, the second upright post, or both the first upright post and the second upright post.

According to an embodiment, the plurality of wall panels are configured to be connected to adjacent wall panels in a linear configuration sharing one of the first upright post and the second upright post between the adjacent wall panels.

According to an embodiment, the plurality of wall panels are configured to be connected to adjacent wall panels at 90-degree angles by the one or more brackets.

According to an embodiment, the frame is a plurality of frames, and wherein adjacent frames of the plurality of frames are separated by an additional stretcher.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Embodiments of the present invention relate to wall panels and wall panel systems which may be easily assembled and disassembled by one or more users with little or no fasteners or tools to achieve a custom workspace. Embodiments provide a plurality of wall panels which may be interconnected to form a wall panel system, thus allowing a large open area to be subdivided into individual and customized workspaces. The wall panel system may comprise frames having panels of varying materials, such as plastic, clear glass, frosted glass, and insulating foam, sound dampening material, fabric wrapped fiberglass, and medium density fiberboard (MDF), as desired by the user of each individual workspace. The panels may comprise one or more of the above listed materials, for example, the panels may include a MDF mounting board attached between two fabric wrapped fiberglass panels. The panels of material may be continuous within the frames. The frames may be quickly locked into a skeleton by spring-loaded latches in a "pop-in" manner. The latches may be retracted or depressed to allow for insertion of the frame into the skeleton. The latches may then be released to a position extending through slots in the skeleton to lock the frames into place. The latches may be spring clips configured to interact with an extrusion on the frame. While the embodiments have been described with relation to workspaces, the apparatus and methods described herein may be used in any number of environments where an open space is desired to be customized.

Figure 1B:
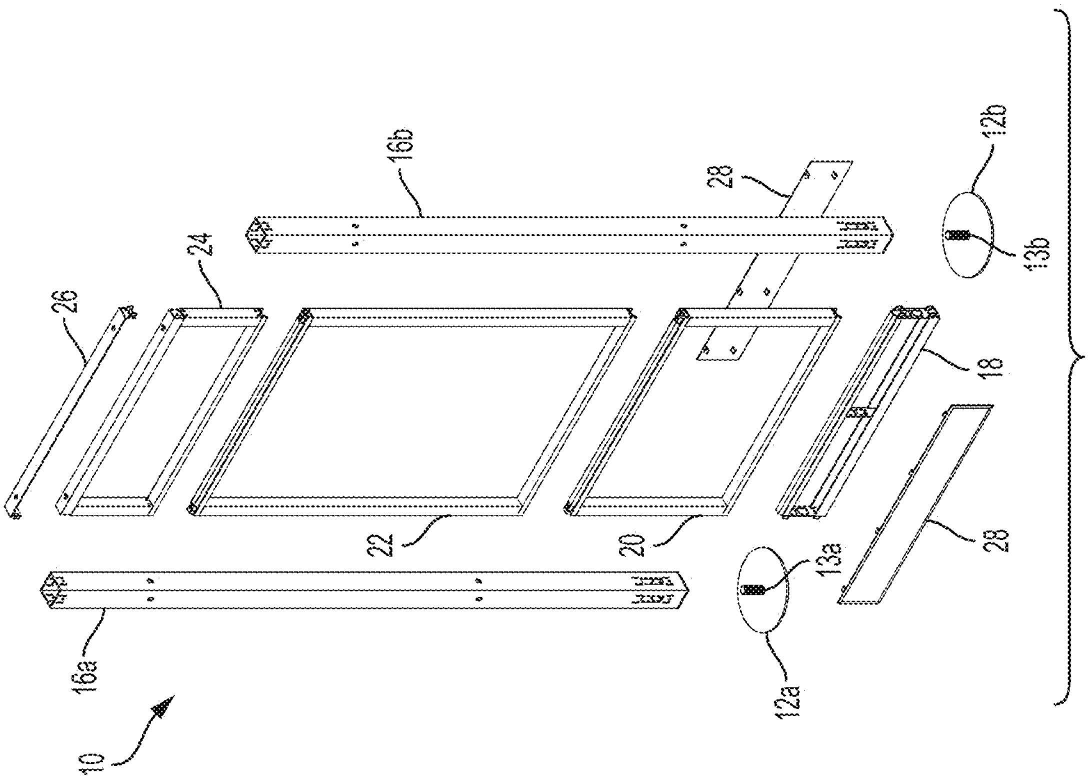
FIG. 1B is an exploded view of the assembled wall panel of FIG. 1A.
Figure 1A:
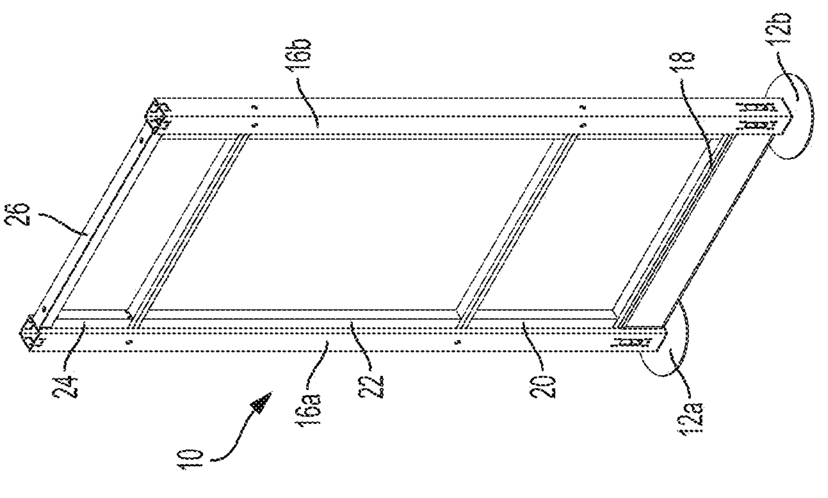
FIG. 1A is a perspective view of an assembled wall panel, according to an embodiment.

Referring to FIGS. 1A and 1B, an embodiment of a wall panel 10 according to the present invention is shown. Wall panel 10 may include base plates 12*a* and 12*b* comprising threaded posts 13*a*, 13*b* for connecting with posts 16*a* and 16*b*, respectively. The posts 16*a* and 16*b* may be substantially upright posts. Wall panel 10 may also include a lower stretcher 18, lower frame 20, middle frame 22, upper frame 24, and upper stretcher 26. According to embodiments, lower stretcher 18 may comprise a cable chase having a cover 28 on an outer surface, such as a front side and/or back side of the cable chase to enclose cables or wires which are routed through lower stretcher 18.

With continued reference to FIG. 1A, an embodiment of wall panel 10 is depicted in an assembled position. Posts 16*a* and 16*b* are connected to base plates 12*a* and 12*b*, respectively, via threaded posts 13*a*, 13*b*. Lower stretcher 18 and upper stretcher 26 are depicted in a releasably connected position with posts 16*a* and 16*b*. Together, lower stretcher 18, upper stretcher 26, first post 16*a*, and second post 16*b* form a skeleton of a wall panel 10. Within the skeleton, at least one frame may be placed during assembly of wall panel 10. As depicted in FIG. 1B, there may be three frames: a lower frame 20, a middle frame 22, and upper frame 24, however more or fewer frames are possible.

As will be discussed in more detail below, lower frame 20 may be placed on a rail of lower stretcher 18 and releasably locked in between posts 16*a* and 16*b*. Middle frame 22 may be placed on a rail of lower frame 20 and releasably locked in between posts 16*a* and 16*b*. Upper frame 24 may be placed on a rail of middle frame 22 and releasably locked in place between posts 16*a* and 16*b*. As can also be seen in FIG. 1B, lower stretcher 18 has openings through which cables or wires may pass. The lower stretcher 18 may have a cover 28 placed on an outer surface, such as a front and/or back side of the lower stretcher 18.

Lower frame 20, middle frame 22, and upper frame 24 may each support a panel (not shown) comprising any combination of plastic, clear glass, frosted glass, sound insulating foam, sound dampening material, fabric wrapped fiberglass, medium density fiberboard (MDF), and other desired wall panel materials. The panels may comprise one or more of the above listed materials, for example, the panels may include a MDF mounting board attached between two fabric wrapped fiberglass panels. The panel may be continuous within the frames. Base plates 12*a* and 12*b*, posts 16*a* and 16*b*, lower stretcher 18, upper stretcher 26, and covers 28 may be constructed of any combination of plastic, metal, aluminum, wood, composite, and other structurally supportive materials.

Figure 2B:
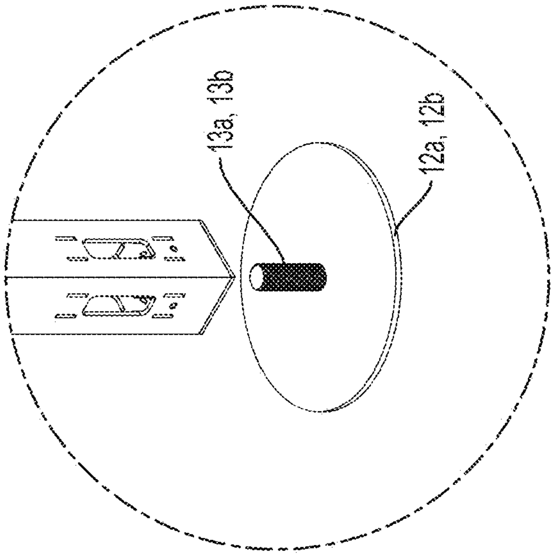
FIG. 2B is a detail view of a base plate of the wall panel of FIG. 1A.
Figure 2A:
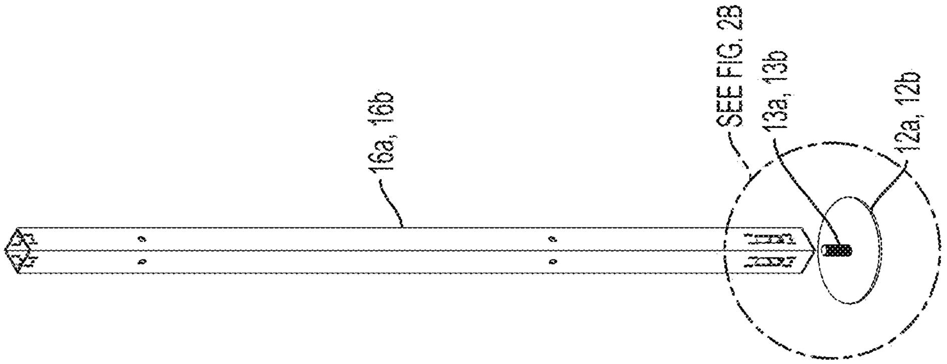
FIG. 2A is a perspective view of a post and base plate of the wall panel of FIG. 1A.

Referring to FIGS. 2A-2D, embodiments of a post 16*a*, 16*b* and base plate 12*a*, 12*b* are shown. Referring first to FIGS. 2A and 2B, base plates 12*a*, 12*b* may comprise threaded posts 13*a*, 13*b* that are received in threaded holes (not visible) in the bottom of posts 16*a*, 16*b*. During assembly of wall panel 10, threaded post 13*a* may be aligned with an opening in a lower end of post 16*a*. Base plate 12*a* or post 16*a* may be rotated to thread the threaded post 13*a* into the threaded hole of post 16*a*. This may secure the base plate 12*a* to the post 16*a*. The base plate 12*a* or the post 16*a* may be rotated to adjust the height of the post 16*a*. The threaded connection between base plate 12*a* and post 16*a* may allow for accommodation of uneven or non-level floors. The process may be repeated to connect base plate 12*b* with post 16*b*. During disassembly, the posts 16*a*, 16*b* or the base plates 12*a*, 12*b* may be rotated in a reverse direction to unthread the threaded posts 13*a*, 13*b* from the threaded holes in the posts 16*a*, 16*b*.

Figure 2D:
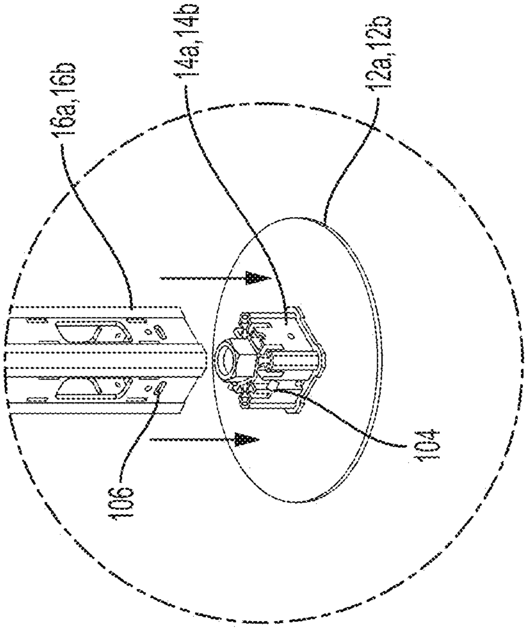
FIG. 2D is a detail view of the alternative base plate of FIG. 2C.
Figure 2C:
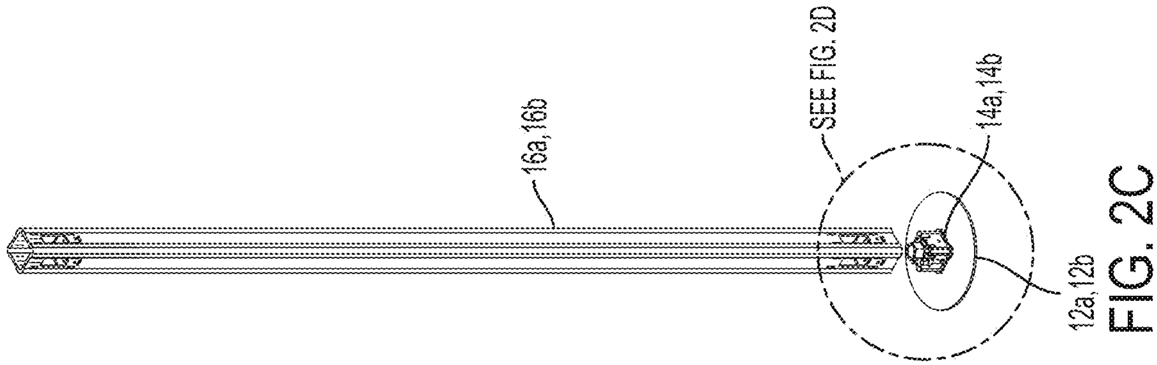
FIG. 2C is a perspective view of an alternative post and base plate of the wall panel of FIG. 1A.

Referring now to FIGS. 2C and 2D, an alternative embodiment incorporating blocks 14*a*, 14*b* is shown. FIG. 2D shows blocks 14*a* and 14*b* may include a latch 104 which may fit into an opening 106 on posts 16*a* and 16*b*. A similar latch 104 may be located on the opposing side of blocks 14*a* and 14*b*, or may be located on all four sides of blocks 14*a* and 14*b*. During assembly of wall panel 10, block 14*a* of base plate 12*a* is aligned with an opening in a lower end of post 16*a*. Post 16*a* may then be lowered onto block 14*a*, depressing the latch (or latches) 104 due to contact with the inner surface of the post 16*a* until the latch 104 is aligned with the opening 106. Once aligned, the latch 104 may extend through opening 106 to latch the post 16*a* to the block 14*a*. The process is repeated to connect base plate 12*b* with post 16*b*. During disassembly, a user may depress the latch 104 on block 14*a*, manually or with a tool (such as a flathead screw driver), and once depressed, the post 16*a* may be raised until the bottom of the post 16*a* has exited block 14*a*. The process is repeated to disassemble base plate 12*b* from post 16*b*.

Alternative structures for providing connection between base plates 12*a* and 12*b* and posts 16*a* and 16*b* may be provided. The connections may allow for height adjustability of the posts 16*a* and 16*b*.

Figure 3C:
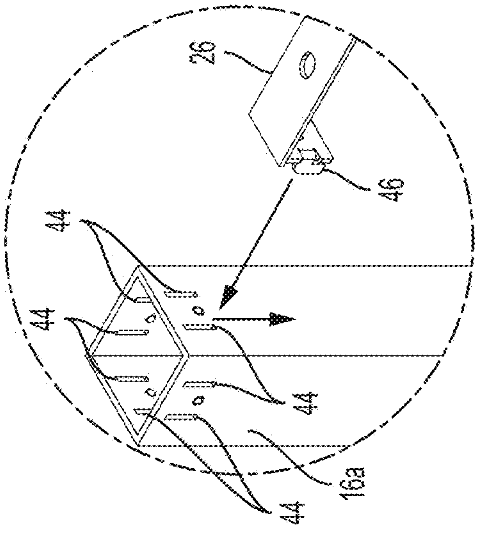
FIG. 3C is a detail view of a connection between an upper stretcher and a post of the wall panel of FIG. 1A.
Figure 3B:
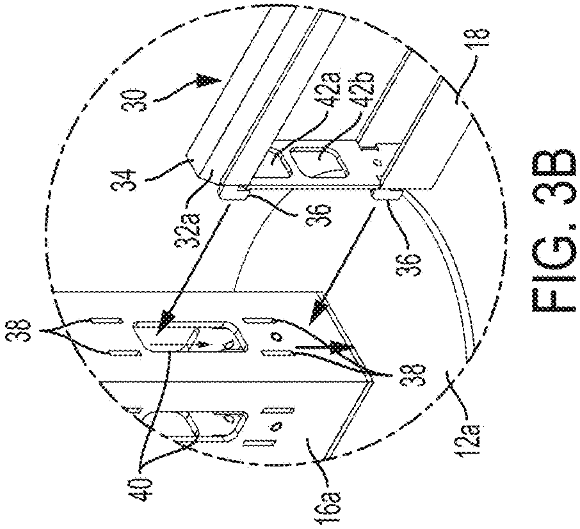
FIG. 3B is a detail view of a connection between a lower stretcher and a post of the wall panel of FIG. 1A.
Figure 3A:
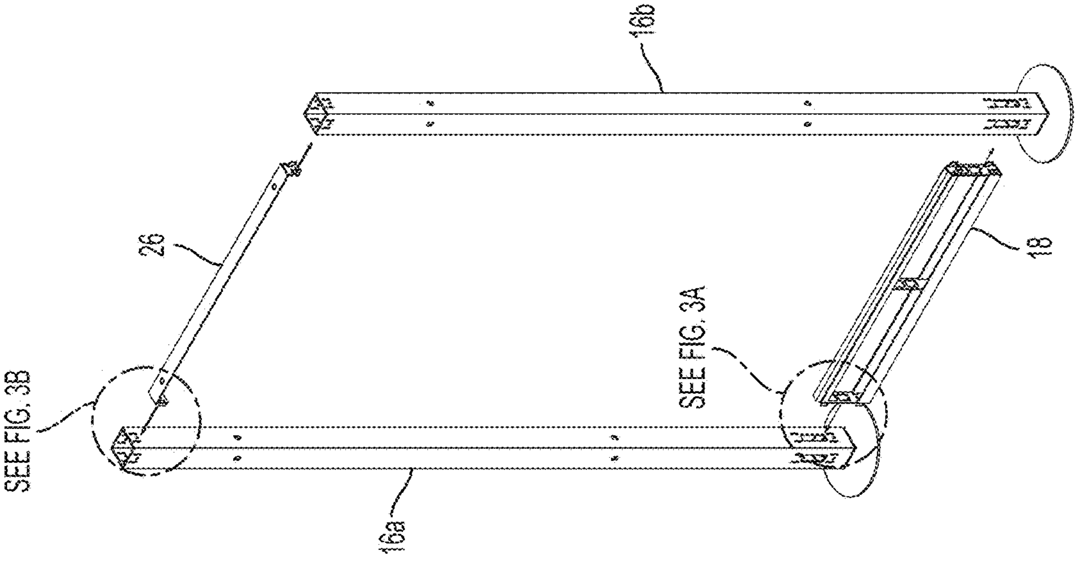
FIG. 3A is a perspective view of installation of an upper stretcher and lower stretcher of the wall panel of FIG. 1A.

Referring to FIG. 3A, lower stretcher 18 may be connected between post 16*a* and post 16*b*. Upper stretcher 26 may be connected between post 16*a* and post 16*b*. Together, lower stretcher 18, upper stretcher 26, first post 16*a*, and second post 16*b* form a skeleton of a wall panel 10.

Referring to FIG. 3B, a connection between lower stretcher 18 and post 16*a* is shown. The upper surface of lower stretcher 18 may comprise a rail 30. Rail 30 may be designed with an upper surface having a generally horizontal surface 34 coupling a first angled surface 32*a* to a second angle surface (not visible). The second angled surface may be the same or similar to the first angled surface 32*a* except that the second angled surface extends from the generally horizontal surface 34 to produce a mirror image of the first angled surface 32*a*. That is, a side profile of the rail 30 may produce a generally trapezoidal shape, such as, for example, rail 50 of FIG. 5D. Lower stretcher 18 may also comprise hooks 36, for example, downward facing hooks.

Referring again to FIG. 3B, post 16*a* may include slots 38 for receiving hooks 36 of lower stretcher 18. Though four slots 38 and hooks 36 are depicted, more or less may be employed. During installation, hooks 36 are aligned with slots 38 of post 16*a*. Corresponding hooks 36 on the opposing end of lower stretcher 18 (seen in FIG. 3A) are aligned with slots 38 of post 16*b*. With both sets of hooks 36 aligned with slots 38 on posts 16*a* and 16*b*, lower stretcher 18 is displaced downward to secure hooks 36 in slots 38.

With continued reference to FIG. 3B, post 16*a* may also include openings 40. Corresponding openings 42*a* and 42*b* on lower stretcher 18 may align with openings 40 on post 16*a*. The arrangement of aligned openings allows for receiving and routing cables or wires throughout the wall panel system. The opposing end of lower stretcher 18 may have corresponding openings 42*a* and 42*b* which may be aligned with openings 40 on post 16*b*. Thus, a continuous path from post 16*a* through lower stretcher 18 to post 16*b* may be provided. The continuous path may allow for cables or wires to be routed through the wall panel 10. When multiple wall panels 10 are installed to form a longer wall, a cubical, a room, etc., a network of cable paths may be achieved through openings 40, 42*a*, and 42*b*. Lower stretcher 18 and posts 16*a*, 16*b* may provide a cable management system that allows wires or cables, such as power or signal cables, to be routed through the openings 40, 42*a*, 42*b*. The wires or cables may couple to electrical outlets, Ethernet ports, auxiliary ports, communications ports, and other known connections for power and signal cables provided in the lower stretcher 18 or within one of the frames. Thus, devices may be coupled to the cables within the cable management system. Thus a workspace created by the described quick wall system may allow for the connection of one or more devices to one or more cables routed within the cable management system. The devices (such as computers, phones, printers, televisions, audio equipment, and other electronic devices) may thus be placed in the individual, subdivided workspaces and couple to the wires or cables which are routed through the quick wall system to a main power, electrical, or data source. The cable management system described may also allow routing the cables vertically through the interior of posts 16*a* and 16*b*, for example, routing the cables from the upper stretcher 26 to the lower stretcher 18 or to a location in between, such as a location along a frame.

Referring to FIG. 3C, a connection between upper stretcher 26 and post 16*a* is shown. Post 16*a* may include slots 44 for receiving hooks 46 of upper stretcher 26, for example, downward facing hooks. Though two slots 44 and hooks 46 are depicted, more or less may be employed. During installation, hooks 46 are aligned with slots 44 of post 16*a*. Corresponding hooks 46 on the opposing end of upper stretcher 26 are aligned with slots 44 on post 16*b*. With both sets of hooks 46 aligned with slots 44 on posts 16*a* and 16*b*, upper stretcher 26 is displaced downward to secure hooks 46 in slots 44.

Upper stretcher 26 may be designed similar to lower stretcher 18 such that upper stretcher 26 may be part of the management system that allows cables, such as power or signal cables, to be routed through the openings. Electrical outlets, Ethernet ports, auxiliary ports, communications ports, and other known connections for power and signal cables may be provided in the upper stretcher 26 or within one of the frames. The connections may allow for devices to be coupled to the cables routed within the cable management system.

Figure 4B:
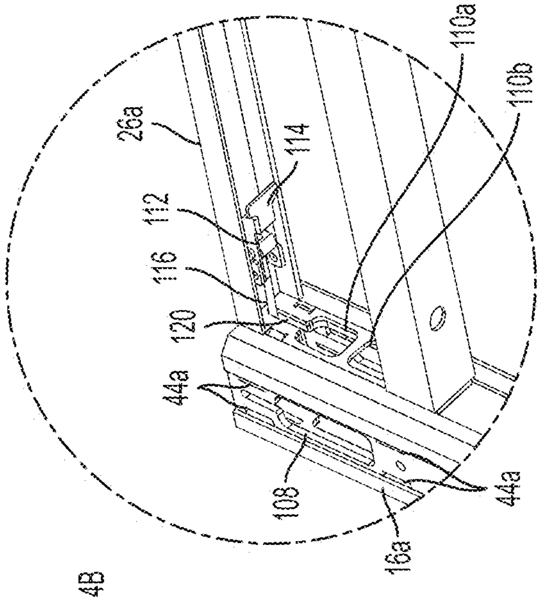
FIG. 4B is a detail view of a connection between an alternative upper stretcher and a post of the wall panel of FIG. 4A.
Figure 4A:
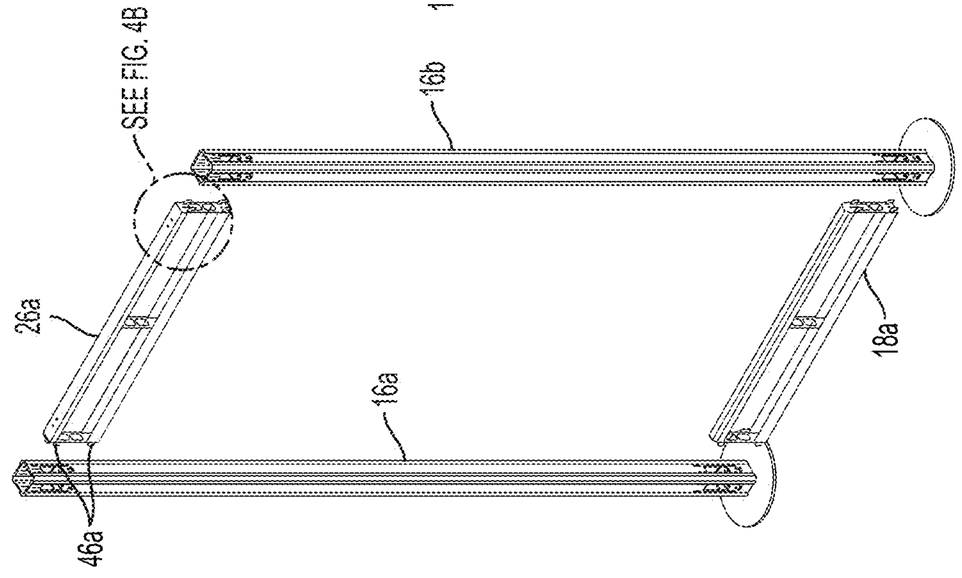
FIG. 4A is a perspective view of installation of an alternative upper stretcher and lower stretcher of the wall panel of FIG. 1A.

Referring to FIG. 4A, an alternative embodiment of the upper stretcher 26*a* is shown. Lower stretcher 18*a* may be connected between post 16*a* and post 16*b*. Upper stretcher 26*a* may be connected between post 16*a* and post 16*b*. Together, lower stretcher 18*a*, upper stretcher 26*a*, first post 16*a*, and second post 16*b* form a skeleton of a wall panel 10.

Referring to FIG. 4B, a connection between upper stretcher 26*a* and post 16*a* is shown. Post 16*a* may comprise slots 44*a* for receiving hooks 46*a* (See FIG. 4A) of upper stretcher 26*a*, for example, downward facing hooks. Though four slots 44*a* and hooks 46*a* are depicted, more or less may be employed. During installation, hooks 46*a* are aligned with slots 44*a* of post 16*a*. Corresponding hooks 46*a* on the opposing end of upper stretcher 26*a* are aligned with slots 44*a* on post 16*b*. With both sets of hooks 46*a* aligned with slots 44*a* on posts 16*a* and 16*b*, upper stretcher 26 is displaced downward to secure hooks 46*a* in slots 44*a*.

Figure 4C:
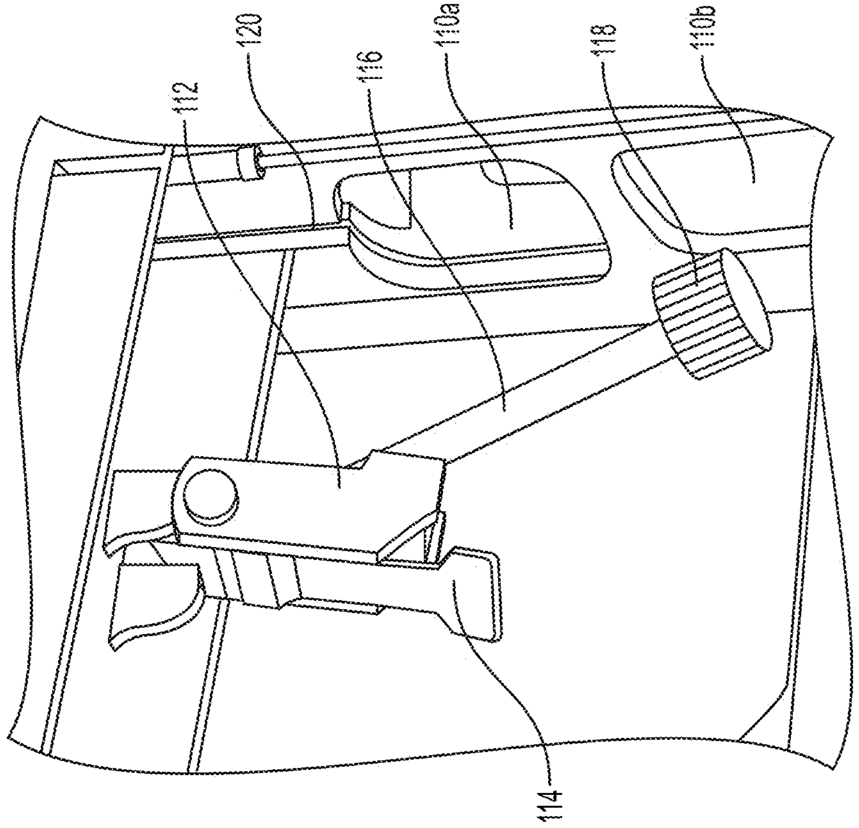
FIG. 4C is a detail view of a draw latch of the alternative upper stretcher of FIG. 4A.

Referring again to FIG. 4B, a draw latch 112 may be provided on upper stretcher 26*a*. The opposing end of upper stretcher 26*a* may have a corresponding draw latch 112. Draw latch 112 may be provided in addition to, or as an alternative to, hooks 46*a* and slots 44*a*. Referring to FIGS. 4B and 4C, draw latch 112 may be moved from a disengaged position, where rod 116 and foot 118 are not engaged with slot 120 and opening 110*a* to the engaged position of FIG. 4B. A flange 114 may be pivotally connected to a surface of the upper stretcher 26*a*. Referring to FIG. 4C, a rod 116 may be pivotally connected to the flange 114 and a foot 118 may be provided on an end of rod 116. To engage the draw latch 112, the foot 118 and rod 116 may be inserted into opening 110*a* and guided upward through slot 120. Holding rod 116 in place, an end of flange 114 may be depressed to retract the rod 116 to secure the foot 118 in place behind the slot 120, thereby securing the upper stretcher 26*a* to the post 16*a*.

Draw latch 112 may also be provided on lower stretcher 18*a*. Draw latch 112 may be provided on opposing longitudinal ends of lower stretcher 18*a*. Draw latch 112 may also be provided with the embodiment of FIG. 3A. That is, draw latch 112 may be provided on one or both of upper stretcher 26 and lower stretcher 18. Draw latch 112 may be provided on opposing longitudinal ends of lower stretcher 18 and/or upper stretcher 26.

Referring to FIG. 4B, post 16*a* may also include openings 108. Corresponding openings 110*a* and 110*b* on upper stretcher 26*a* may align with openings 108 on post 16*a*. The arrangement of aligned openings allows for receiving and routing cables or wires throughout the wall panel system. The opposing end of upper stretcher 26*a* may have corresponding openings 110*a* and 110*b* which may be aligned with openings 108 on post 16*b*. Thus, a continuous path from post 16*a* through upper stretcher 26*a* to post 16*b* may be provided. A person of skill in the art will recognize that when multiple wall panels 10 are installed, a network of cable paths is achieved through openings 108, 110*a*, and 110*b*. Upper stretcher 26*a* provides a cable management system that allows cables, such as power or signal cables, to be routed through the openings. Electrical outlets, Ethernet ports, auxiliary ports, communications ports, and other known connections for power and signal cables may be provided in the upper stretcher 26*a* or within one of the frames to allow for connection of devices to cables routed within the cable management system. Additionally, the cable management system described may further allow routing the cables through the interior of posts 16*a* and 16*b*.

Figures 5A, 5B, 5C, 5D:
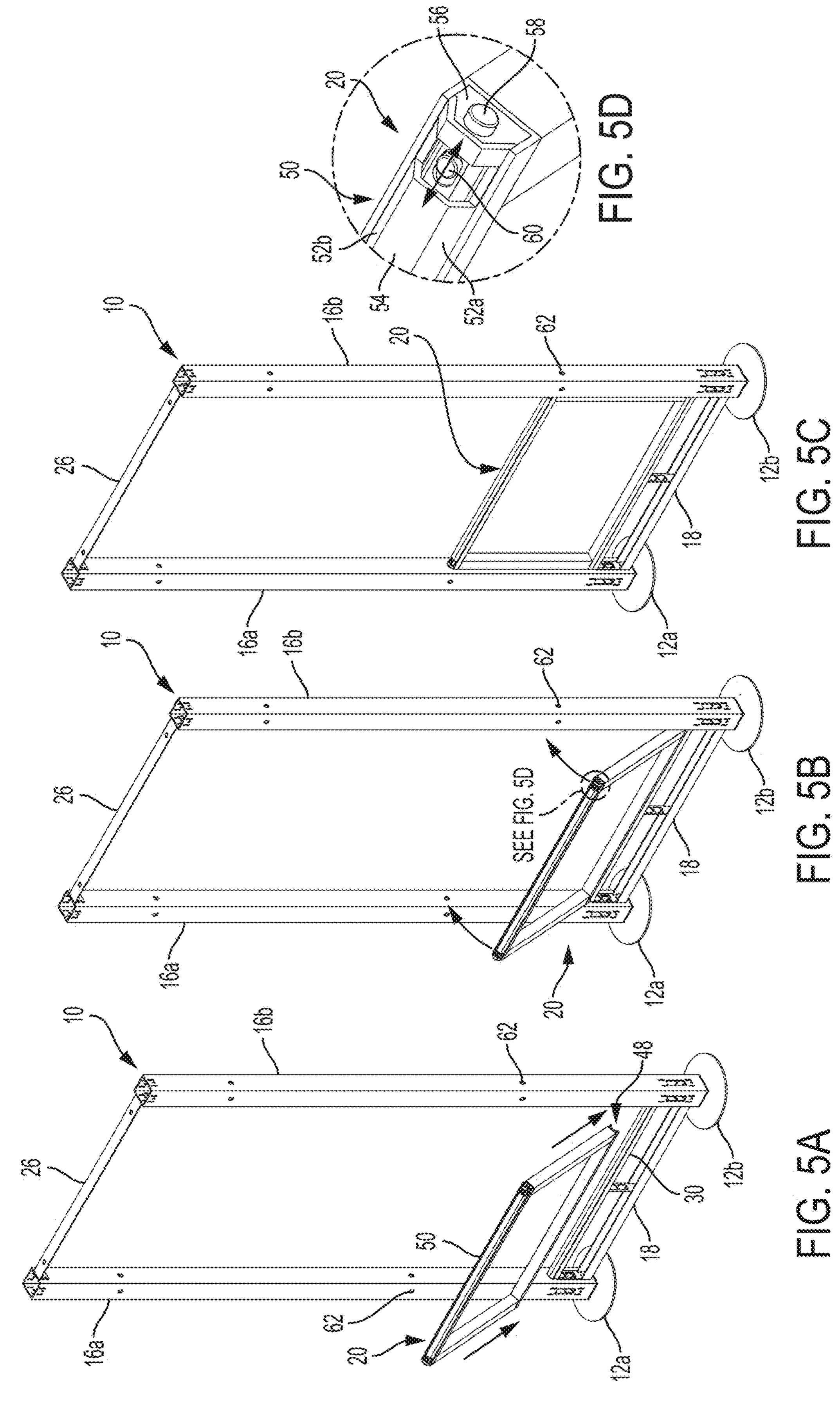
FIGS. 5A, 5B, and 5C are perspective views depicting an illustrative sequence of installation of a lower frame of the wall panel of FIG. 1A.
FIG. 5D is a detail view of a rail and latch on a lower frame of the wall panel of FIG. 5B.

Referring to FIGS. 5A, 5B, and 5C, installation of lower frame 20 is shown. Lower frame 20 may have a trench 48 which may be placed on rail 30 of lower stretcher 18. Lower frame 20 may also comprise a rail 50 on an upper end. Trench 48 is generally concave as can be seen in FIG. 5A. In some embodiments, trench 48 may have a profile corresponding to the profile of the rail 30. That is, trench 48 may have two angled surfaces connected by a generally horizontal surface. The two angled surfaces of trench 48 may mate with the two angled surfaces of rail 30 (FIG. 3B). The generally horizontal surface of the trench 48 may mate with generally horizontal surface 34 of rail 30 (FIG. 3B). The angled surfaces may engage on opposite sides of the horizontal surface 34 of rail 30. The mating of the surfaces of trench 48 and rail 30 hold the lower frame 20 on the lower stretcher 18. Although the discussed geometry comprises angled surfaces connected by a generally horizontal surface, other mating geometries are possible. For example, the trench may take a shape that is generally triangular, semicircular, square, rectangular, curved, or other geometry. Similarly, the rail may then take a sufficiently corresponding shape to mate with the geometry of the trench.

Referring to FIG. 5D, rail 50 is shown in more detail. Rail 50 may be designed with an upper surface having two angled surfaces 52*a* and 52*b* connected by a generally horizontal surface 54. Extending from a side surface 56 of rail 50 is a spring-loaded latch 58 (spring not depicted). Slide 60 may be moved inward toward the center of lower frame 20 to retract latch 58 (e.g. against the force of the spring) and may be released or moved outward toward the edge of lower frame 20 to release latch 58. The opposing side of lower frame 20 may have a second latch 58 extending from a second side surface 56 and actuated by a second slide 60.

Referring again to FIG. 5A, trench 48 of lower frame 20 may be positioned on rail 30 of lower stretcher 18. As discussed, trench 48 may have a generally concave shape to mate with the rail 30. Slides 60 may be moved inward toward the center of lower frame 20 to retract latches 58. The slides 60 may be moved inward simultaneously or substantially simultaneously. As seen in FIG. 5B, lower frame 20 may then be pivoted upward to a substantially vertical or upright position. With slides 60 still pressed inward, latches 58 may be aligned with slots 62 on posts 16*a* and 16*b*. Once aligned, slides 60 may be released or moved outward such that latches 58 are extended outward (e.g. due to the spring force) and into slots 62. The slides 60 may be released or moved outward simultaneously or substantially simultaneously. Referring to FIG. 5C, latches 58 are in their extended position in engagement with slots 62 and lower frame 20 is in the installed and releasably locked position. Although two of each of latches 58, slides 60, and slots 62 are depicted; one of each of latch 58, slide 60, and slot 62 may be provided. Alternatively, more than two of each of latches 58, slides 60, and slots 62 may be provided.

Although lower frame 20 is described as being placed on rail 30 and pivoted upward to a substantially vertical or upright position, other methods of assembly are possible. For example, lower frame 20 may be initially placed in a substantially vertical or upright position and angled through an opening provided between posts 16*a* and 16*b* such that lower frame 20 slides into the opening and onto rail 30, remaining in a substantially vertical position during assembly. Alternatively, lower frame 20 may be placed such that rail 50 is placed within trench 64 of middle frame 22 and then pivoted downward into a substantially vertical or upright position. Alternatively, rail 30 and/or trench 48 may be located on one or both side surfaces of the lower frame 20 with a corresponding rail and/or trench located on post 16*a* and/or 16*b*, such that lower frame 20 slides into an installed location mating with a surface or surfaces on posts 16*a* and/or 16*b*. In such an embodiment, latches 58 and/or slides 60 may be located on the upper surface, as previously described, or on one of the side surfaces.

Figure 6C:
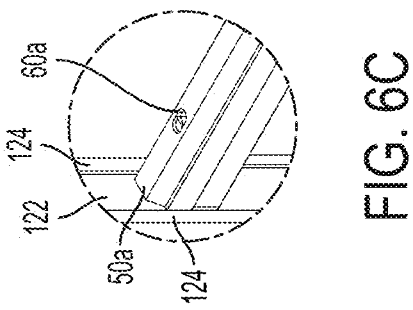
FIG. 6C is a detail view of a latch on a lower frame of the wall panel of FIG. 6A.
Figure 6B:
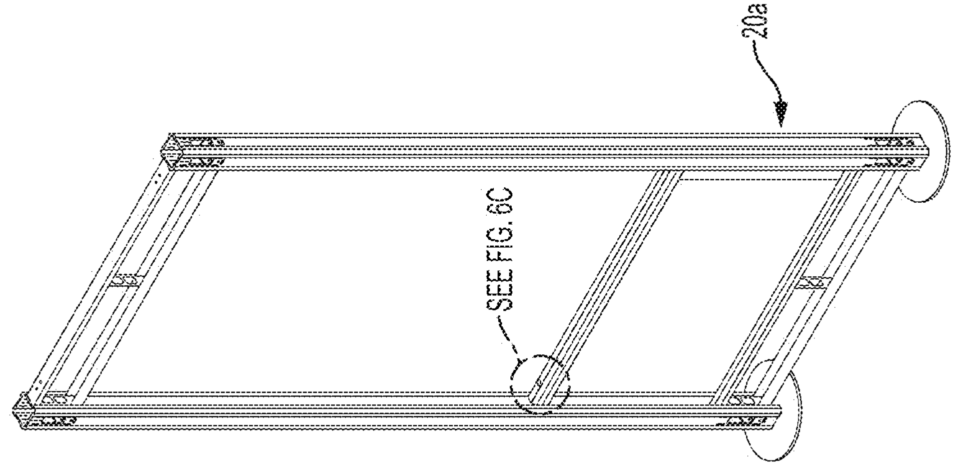
FIGS. 6A and 6B are perspective views depicting an illustrative sequence of installation of an alternative lower frame of the wall panel of FIG. 1A.
Figure 6A:
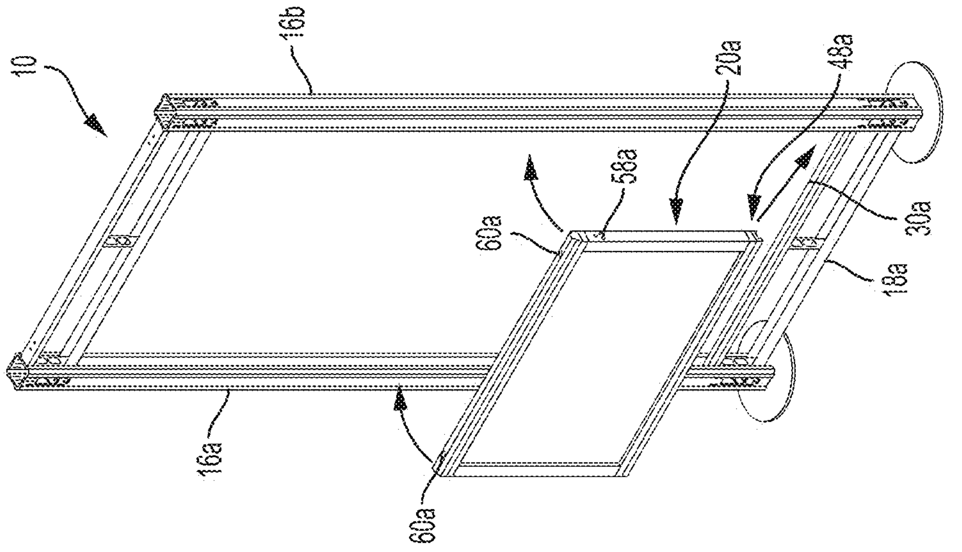

An alternative embodiment is shown in FIGS. 6A-6C. Lower frame 20*a* may have a trench 48*a* which may be positioned on rail 30*a* of lower stretcher 18*a*. Lower frame 20*a* may also comprise a rail 50*a* on an upper end. Trench 48*a* and rail 30*a* may be substantially the same as trench 48 and rail 30 in the FIGS. 5A-5C. Trench 48*a* and rail 30*a* may have mating surfaces such as those described with relation to FIGS. 5A-5C. Located on side surfaces of lower frame 20*a* are latches 58*a*. The latches 58*a* may be the same or similar to latches 58 of FIGS. 5A-5C. Any number of latches may be used, including a single latch. The single latch may be elongated such that it spans substantially the width of the side surface of lower frame 20*a*. Similarly, multiple latches may be elongated to span substantially the width of the side surface of lower frame 20*a* and then may be stacked in a generally vertical manner. The opposing side of lower frame 20*a* may have a second set of latches 58*a* extending from a second side surface.

Referring to FIG. 6A, trench 48*a* of lower frame 20*a* may be positioned on rail 30*a* of lower stretcher 18*a*. As discussed, trench 48*a* may have a generally concave shape to mate with the rail 30*a*. Lower frame 20*a* may then be pivoted upward to a substantially vertical or upright position. The latches 58*a* may depress (e.g. against the force of a spring) when they come into contact with a raised portion 124 (FIG. 6C) of the post 16*a*. As the lower frame 20*a* is moved from contact with the raised portion 124 to the substantially vertical or upright position of FIG. 6B, the latches 58*a* may extend (e.g. due to the springs extending) into the reduced portion 122 of the post 16*a*. The latches 58*a*, now extended into the reduced portion 122 will maintain the lower frame 20*a* in the assembled position due to the raised portions 124 which will not allow the latches 58*a* to pass. To remove the lower frame 20*a*, the slide 60*a* (FIG. 6C) may be moved inward simultaneously or substantially simultaneously with a second slide 60*a* on an opposing side of lower frame 20*a*. Movement of the slides 60*a* inward will cause the latches 58*a* to depress and allow the lower frame 20*a* to be disassembled from the posts 16*a* and 16*b*.

Figures 7A, 7B, 7C, 7D:
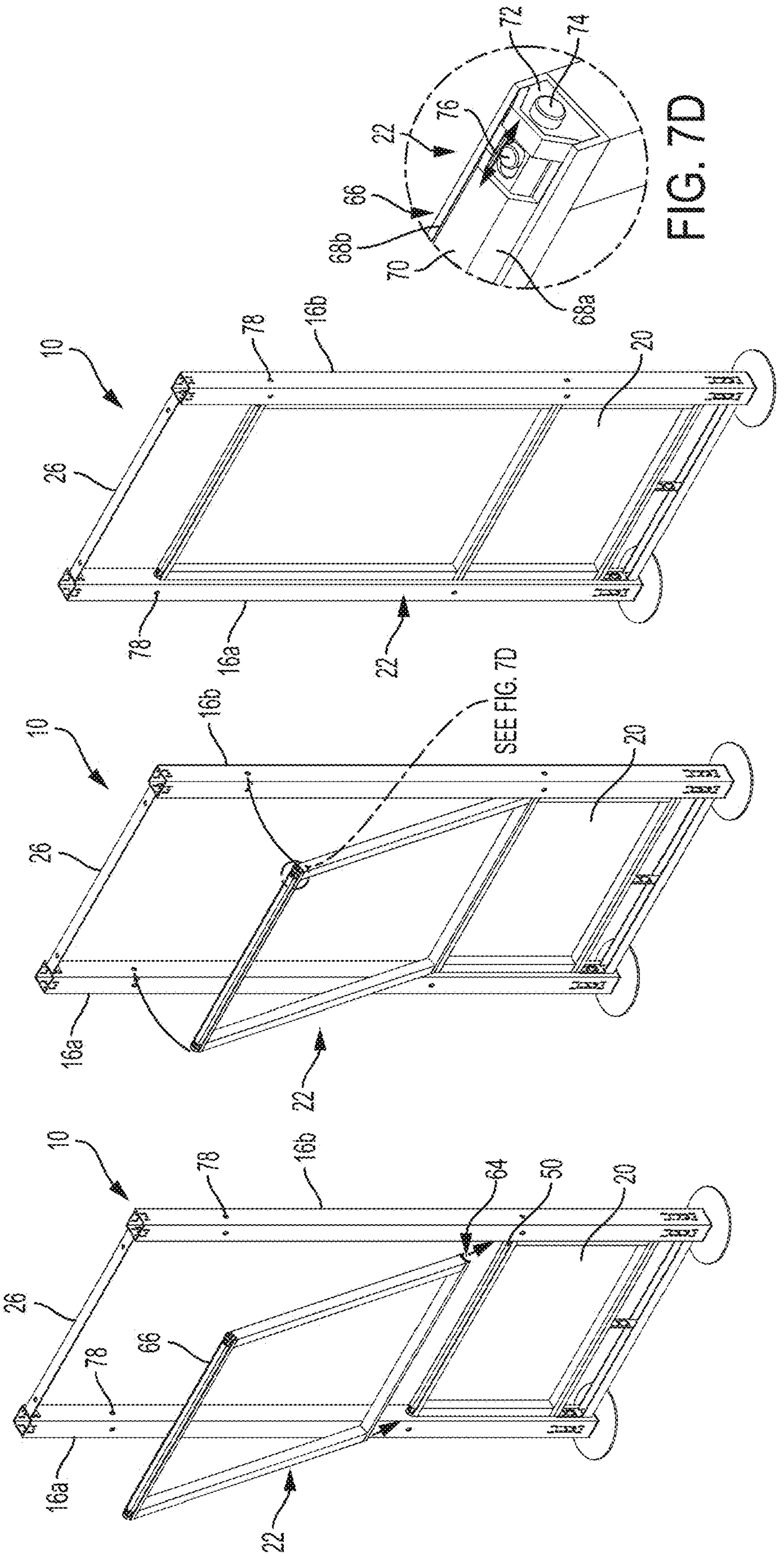
FIGS. 7A, 7B, and 7C are perspective views depicting an illustrative sequence of installation of a middle frame of the wall panel of FIG. 1A.
FIG. 7D is a detail view of a rail and latch on a middle frame of the wall panel of FIG. 7B.

Referring to FIGS. 7A, 7B, and 7C, installation of middle frame 22 is shown. Middle frame 22 may have a trench 64 which may be placed on rail 50 of lower frame 20. Middle frame 22 may also comprise a rail 66 on an upper end. Trench 64 is generally concave as can be seen in FIG. 7A. In some embodiments, trench 64 may have a profile corresponding to the profile of the rail 50. That is, trench 64 may have two angled surfaces connected by a generally horizontal surface. The two angled surfaces of trench 64 may mate with the two angled surfaces 52*a* and 52*b* of rail 50 (FIG. 5D). The generally horizontal surface of the trench 64 may mate with generally horizontal surface 54 of rail 50 (FIG. 5D). The angled surfaces may engage on opposite sides of the horizontal surface 54 of rail 50 (FIG. 5D). The mating of the surfaces of trench 64 and rail 50 hold the middle frame 22 on the lower frame 20. Though the discussed geometry comprises angled surfaces connected by a generally horizontal surface, other mating geometries are possible. For example, the trench may take a shape that is generally triangular, semicircular, square, rectangular, curved, or other geometry. Similarly, the rail may then take a sufficiently corresponding shape to mate with the geometry of the trench.

Referring to FIG. 7D, rail 66 is shown in more detail. As can be seen, rail 66 may be similar to rail 50 of lower frame 20. Rail 66 may be designed with an upper surface having two angled surfaces 68*a* and 68*b* connected by a generally horizontal surface 70. Extending from a side surface 72 of rail 66 is a spring-loaded latch 74 (spring not depicted). Slide 76 may be moved inward by a user toward the center of middle frame 22 to retract latch 74 (e.g. against the force of the spring) and may be released or moved outward toward the edge of middle frame 22 to release latch 74. The opposing side of middle frame 22 may have a second latch 74 extending from a second side surface 72 and actuated by a second slide 76.

Referring again to FIG. 7A, the trench 64 of middle frame 22 may be positioned on rail 50 of lower frame 20. As discussed, trench 64 may have a generally concave shape to mate with the rail 50. During assembly, the slides 76 may be moved inward by a user toward the center of middle frame 22 to retract latches 74. The slides 76 may be moved inward simultaneously or substantially simultaneously. As seen in FIG. 7B, middle frame 22 may then be pivoted upward to a substantially vertical or upright position. With the slides 76 still pressed inward, latches 74 are aligned with slots 78 on posts 16*a* and 16*b*. Once aligned, slides 76 are released or moved outward such that latches 74 are extended outward (e.g. due to the spring force) and into slots 78. The slides 76 may be release or moved outward simultaneously or substantially simultaneously. Referring to FIG. 7C, latches 74 are in their extended position in engagement with slots 78 and middle frame 22 is in the installed and locked position. Although two of each of latches 74, slides 76, and slots 78 are depicted (see FIG. 7C), one of each of latch 74, slide 76, and slot 78 may be provided. Alternatively, more than two of each of latches 74, slides 76, and slots 78 may be provided.

Although middle frame 22 is described as being placed on rail 50 and pivoted upward to a substantially vertical or upright position, other methods of assembly are contemplated by the invention. For example, middle frame 22 may be initially placed in a substantially vertical or upright position and angled through an opening provided between posts 16*a* and 16*b* such that middle frame 22 slides into the opening and onto rail 50, remaining in a substantially vertical position during assembly. Alternatively, middle frame 22 may be placed such that rail 66 is placed within trench 80 of upper frame 24 and then pivoted downward into a substantially vertical or upright position. Alternatively, rail 50 and/or trench 64 may be located on one or both side surfaces of the middle frame 22 with a corresponding rail and/or trench located on post 16*a* and/or 16*b*, such that middle frame 22 slides into an installed location mating with a surface or surfaces on posts 16*a* and/or 16*b*. In such an embodiment, latches 74 and/or slides 76 may be located on the upper surface, as previously described, or on one of the side surfaces.

Figure 8D:
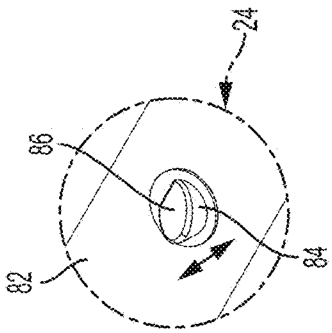
FIG. 8D is a detail view of a latch on an upper frame of the wall panel of FIG. 8B.
Figure 8E:
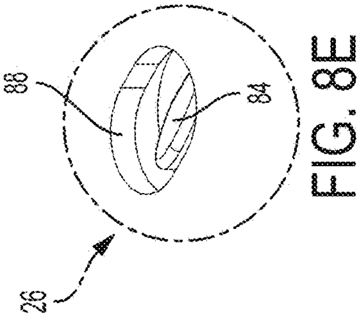
FIG. 8E is a detail view of a latch receiver on an upper stretcher of the wall panel of FIG. 8C.
Figure 8C:
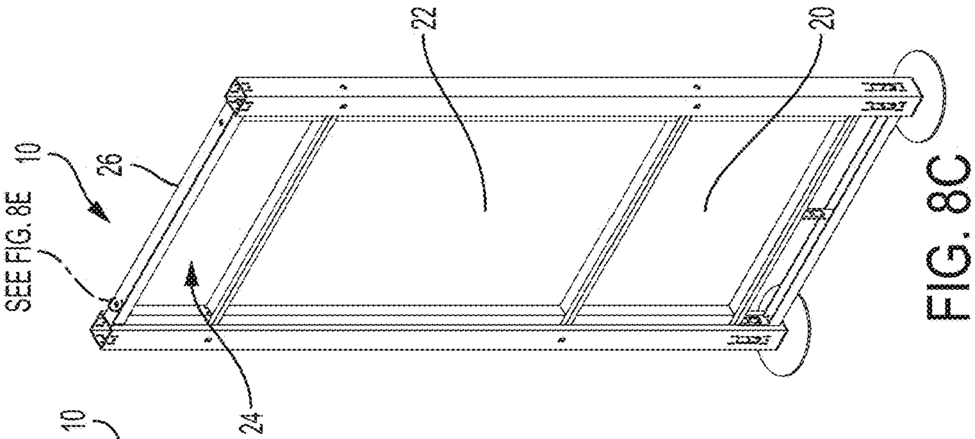
FIGS. 8A, 8B, and 8C are perspective views depicting an illustrative sequence of installation of an upper frame of the wall panel of FIG. 1A.
Figure 8B:
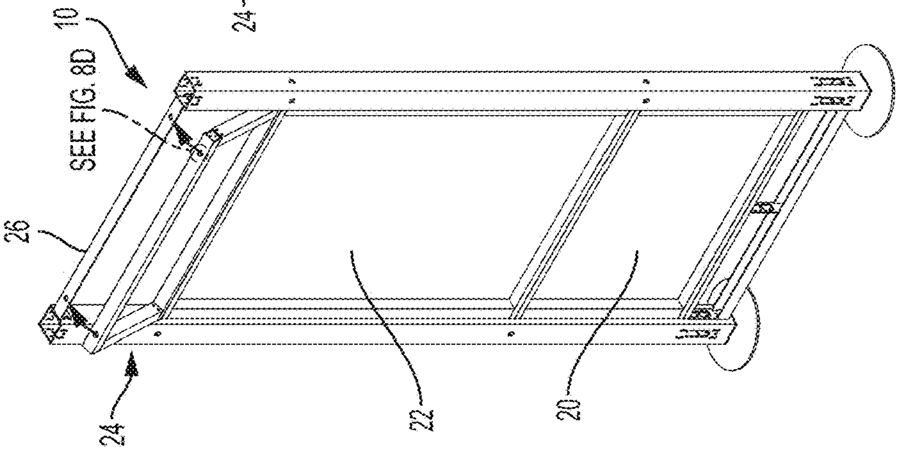
Figure 8A:
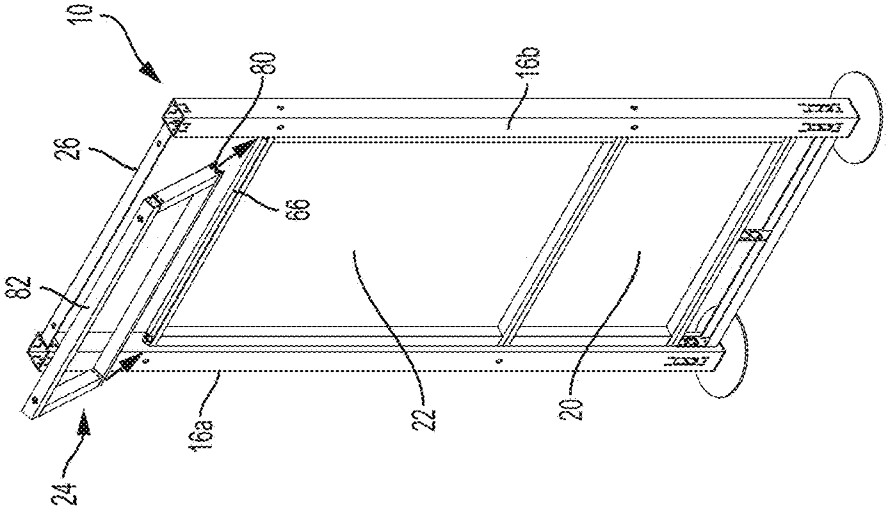

Referring to FIGS. 8A, 8B, and 8C, installation of upper frame 24 is shown. Upper frame 24 may have a trench 80 which may be placed by a user on rail 66 of middle frame 22. Trench 80 is generally concave as can be seen in FIG.

8A. In some embodiments, trench 80 may have a profile corresponding to the profile of the rail 66. That is, trench 80 may have two angled surfaces connected by a generally horizontal surface. The two angled surfaces of trench 80 may mate with the two angled surfaces 68*a* and 68*b* of rail 66. The generally horizontal surface of the trench 80 may mate with generally horizontal surface 70 of rail 66. The angled surfaces may engage on opposite sides of the horizontal surface 70 of rail 66. The mating of the surfaces of trench 80 and rail 66 hold the upper frame 24 on the middle frame 22. Though the discussed geometry comprises angled surfaces connected by a generally horizontal surface, other mating geometries are possible. For example, the trench may have a shape that is generally triangular, semicircular, square, rectangular, or other geometry. Similarly, the rail may then have a corresponding shape to mate with the geometry of the trench.

Referring to FIG. 8D, upper frame 24 may comprise a top surface 82. Top surface 82 is shown with latch 84, biased toward an upward position (e.g. by a spring). Latch 84 comprises angled surface 86. FIG. 8E depicts slot 88 on upper stretcher 26 for receiving latch 84. Referring back to FIGS. 8A-8C, a second latch 84 and second slot 88 may be seen on an opposing side of upper frame 24 and upper stretcher 26, respectively. Though two of each of latches 84 and slots 88 are depicted, one of each of latch 84 and slot 88 may be provided. Alternatively, more than two of each of latches 84 and slots 88 may be provided.

Referring again to FIG. 8A, during assembly, the trench 80 of upper frame 24 is located on rail 66 of middle frame 22. As discussed, trench 80 may have a generally concave shape to mate with the rail 66. Upper frame 24 is positioned on rail 66 such that angled surfaces 86 are facing toward wall panel 10 and upper stretcher 26. As depicted in FIG. 8B, upper frame 24 is pivoted upward to a substantially vertical or upright position. During movement of upper frame 24, angled surfaces 86 will come into contact with a lower surface of upper stretcher 26. The contact of the lower surface with the angled surfaces 86 will cause latches 84 to depress (e.g. against the force of the spring). When latches 84 reach slots 88 in upper stretcher 26, the force on angled surface 86 will be released and latches 84 will extend through slots 88 (e.g. due to the springs extending). Referring to FIG. 8C, latches 84 are in the extended position through slots 88 and upper frame 24 is in the installed and locked position.

Although upper frame 24 is described as being placed on rail 66 and pivoted upward to a substantially vertical or upright position, other methods of assembly are contemplated by the invention. For example, upper frame 24 may be initially placed in a substantially vertical or upright position and angled through an opening provided between posts 16*a* and 16*b* such that upper frame 24 slides into the opening and onto rail 66, remaining in a substantially vertical position during assembly. Alternatively, upper frame 24 may be placed such that top surface 82 is placed in contact with the lower surface of upper stretcher 26 and then pivoted downward into a substantially vertical or upright position. Alternatively, trench 80 or a rail may be located on one or both side surfaces of the upper frame 24 with a corresponding rail and/or trench located on post 16*a* and/or 16*b*, such that upper frame 24 slides into an installed location mating with a surface or surfaces on posts 16*a* and/or 16*b*. In such an embodiment, latches 84 may be located on the upper surface, as previously described, or on one of the side surfaces. Once constructed, the wall panel 10 may be disassembled by reversing the order of assembly, as is described in more detail to follow.

A feature of the present invention is the ability to easily deconstruct wall panel 10. To remove upper frame 24, latches 84 are depressed (e.g., by pressing through the slots 88 to contact latches 84) and upper frame 24 is pivoted from the substantially vertical position downward until upper frame 24 is no longer in engagement with upper stretcher 26. To remove middle frame 22, slides 76 are moved inward toward the center of middle frame 22 to retract latches 74. Middle frame 22 is pivoted from the substantially vertical position downward until latches 74 are no longer in engagement with posts 16*a* and 16*b*. Lower frame 20 is removed in a similar manner. Slides 60 are moved inward toward the center of lower frame 20 to retract latches 58. Lower frame 20 is pivoted from the substantially vertical position downward until latches 58 are no longer in engagement with posts 16*a* and 16*b*.

To remove upper stretcher 26, an upward force is applied to the upper stretcher 26 to disengage hooks 46 from slots 44. To remove lower stretcher 18, an upward force is applied to the lower stretcher 18 to disengage hooks 36 from slots 38. According to embodiments having blocks 14*a*, 14*b*, to remove posts 16*a*, 16*b* from base plates 12*a*, 12*b*, base plate 12*a*, 12*b* is held in place while an upward force is applied to post 16*a*, 16*b* to disengage the block 14*a*, 14*b* from the respective post 16*a*, 16*b*.

Figure 9B:
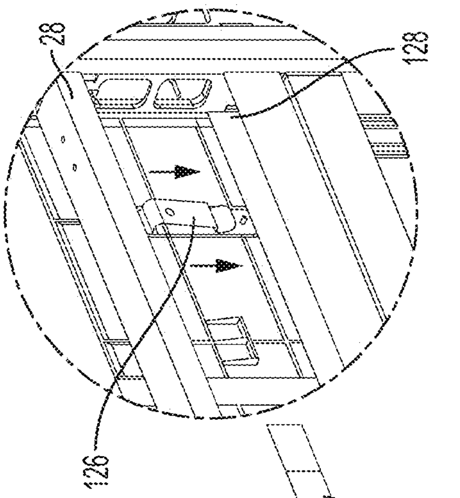
FIG. 9B is a detail view of the covers of the wall panel of FIG. 9A.
Figure 9A:
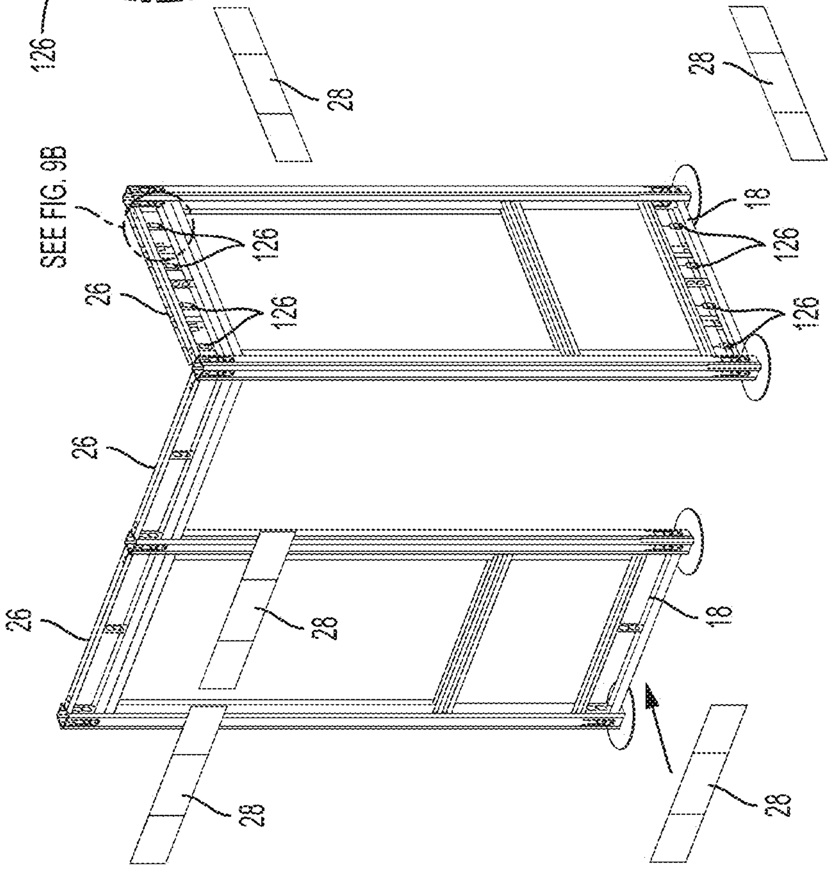
FIG. 9A is a perspective view of covers for a wall panel of FIG. 1A.

Referring to FIGS. 9A and 9B, a cover 28 may be provided on an outer surface of lower stretcher 18 or upper stretcher 26. As shown in FIG. 9B, cover 28 may comprise one or more clips 126 on an interior surface of cover 28. The clips 126 can engage a surface on the corresponding stretcher or support, such as a surface on support 128. The clips may slide over an edge of support 128 securing the cover 28 to lower stretcher 18 or upper stretcher 26. To remove, the cover 28 slides upward to disengage the clips 126 from the support 128 of lower stretcher 18 or upper stretcher 26.

Another embodiment of cover 28 may comprise one or more snaps on an interior surface. The snaps may engage a lower and/or upper surface of lower stretcher 18. A lower set of snaps may be engaged with a lower surface of lower stretcher 18 and pivoted upward to engage an upper set of snaps with an upper surface of lower stretcher 18. To remove, the cover pops off. In addition to clips or snaps, other connectors are contemplated by the current invention, including hooks, magnets, screws, etc.

Referring to FIGS. 10A-D, an external cable management system may be provided in addition to or instead of the cable management system within lower stretcher 18, upper stretcher 26, and posts 16*a* and 16*b*. Mounting plate 132 may include brackets 130 having hooks 138 (see FIG. 10C) for engagement with slots 38 and 44 (see FIG. 10A). Mounting plate 132 may be installed in a manner similar to installation of the lower stretcher 18 and upper stretcher 26. That is, the hooks 138 may be aligned with slots 38 and 44 and then mounting plate 132 may be forced downward to secure the hooks 138 in the slots 38 and 44 on a side of one of the posts 16*a*, 16*b*. A vertical trough 134 may snap onto mounting plate 132. Once installed, the interior space of trough 134 may receive and route cables or wires throughout the wall panel system.

Figure 10A:
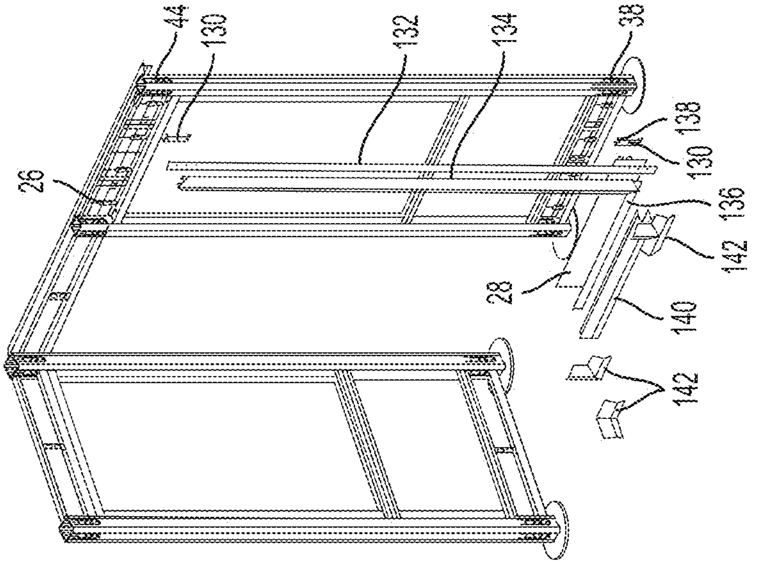
FIG. 10A is an exploded view of an external cable management system of a wall panel of FIG. 1A.
Figure 10B:
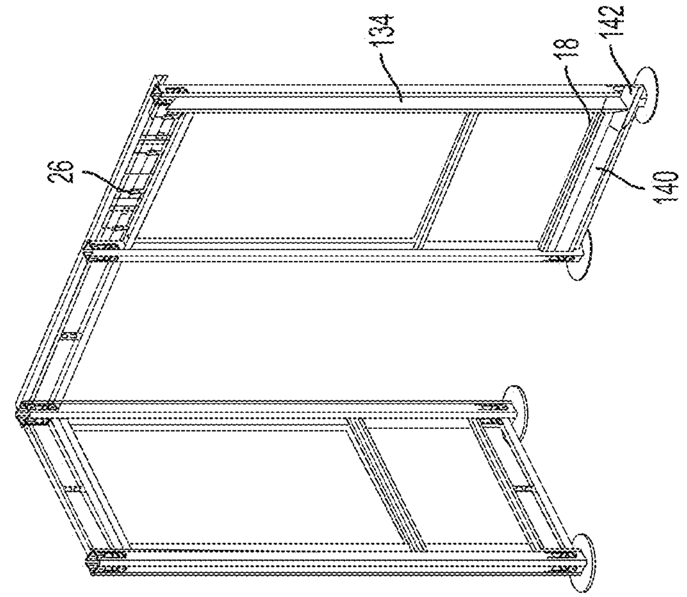
FIG. 10B is a perspective view of an external cable management system of a wall panel of FIG. 10A.
Figure 10C:
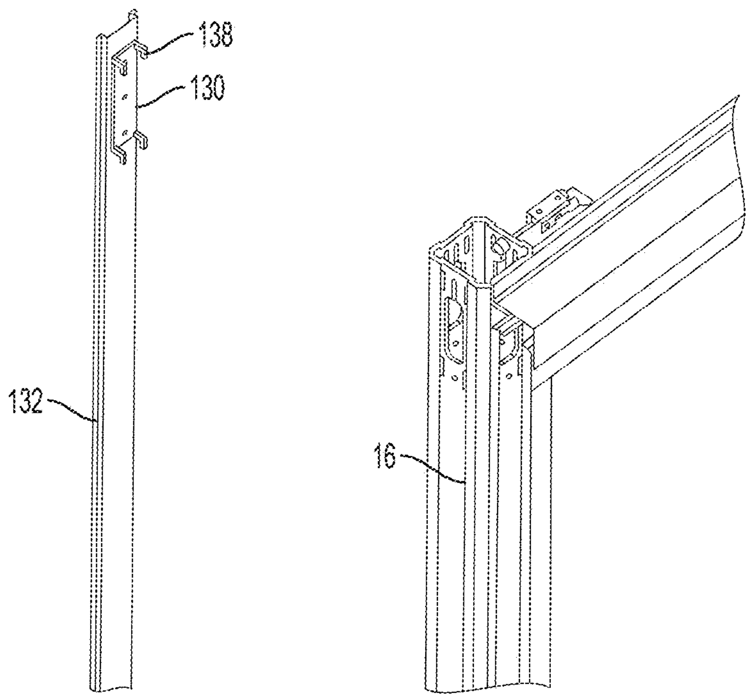
FIG. 10C is a detail view of a mounting plate of an external cable management system of a wall panel of FIG. 10A.
Figure 10D:
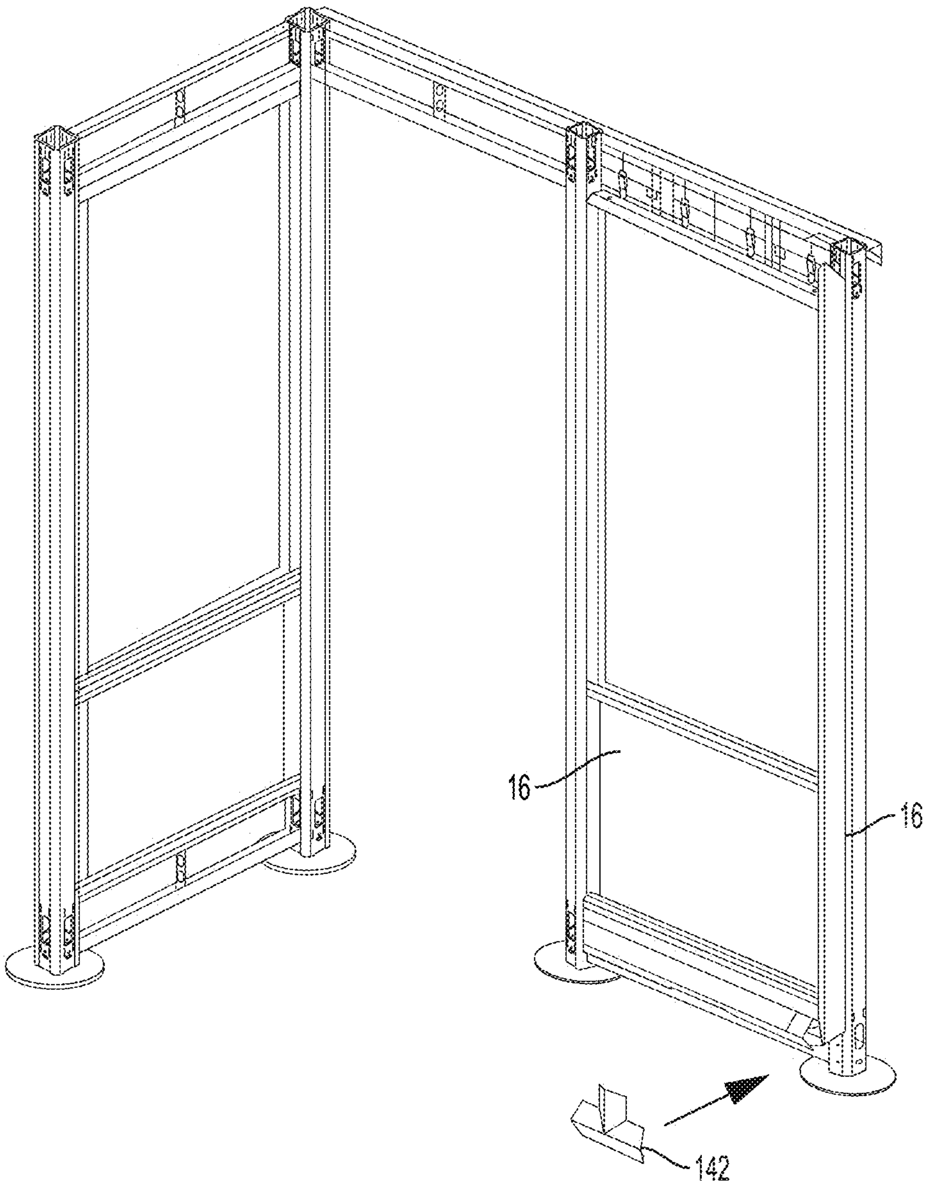
FIG. 10D is a detail view of a cable cover of an external cable management system of a wall panel of FIG. 10A.

With continued reference to FIG. 10A, lower stretcher 18 may include a cover 28 as previously described. A mounting plate 136 may be attached to the cover 28 and a horizontal trough 140 may snap onto mounting plate 136. Once installed, the interior space of trough 140 may receive and route cables or wires through the wall panel system. Cable covers 142 may be used to connect horizontal trough 140 and vertical trough 134 with additional troughs on the same or adjacent wall panels. Cable covers 142 may snap onto horizontal troughs 140 and vertical troughs 134 to conceal the transition between horizontal and vertical troughs (FIG. 10D). When multiple wall panels 10 are installed with multiple horizontal troughs 140 and vertical troughs 134, a network of cable paths is achieved. Electrical outlets, Ethernet ports, auxiliary ports, communication ports, and other known connections may now be placed in multiple locations along the height and width of the wall panel 10 to allow for connection of devices to cables routed through the cable management system.

Figure 11:
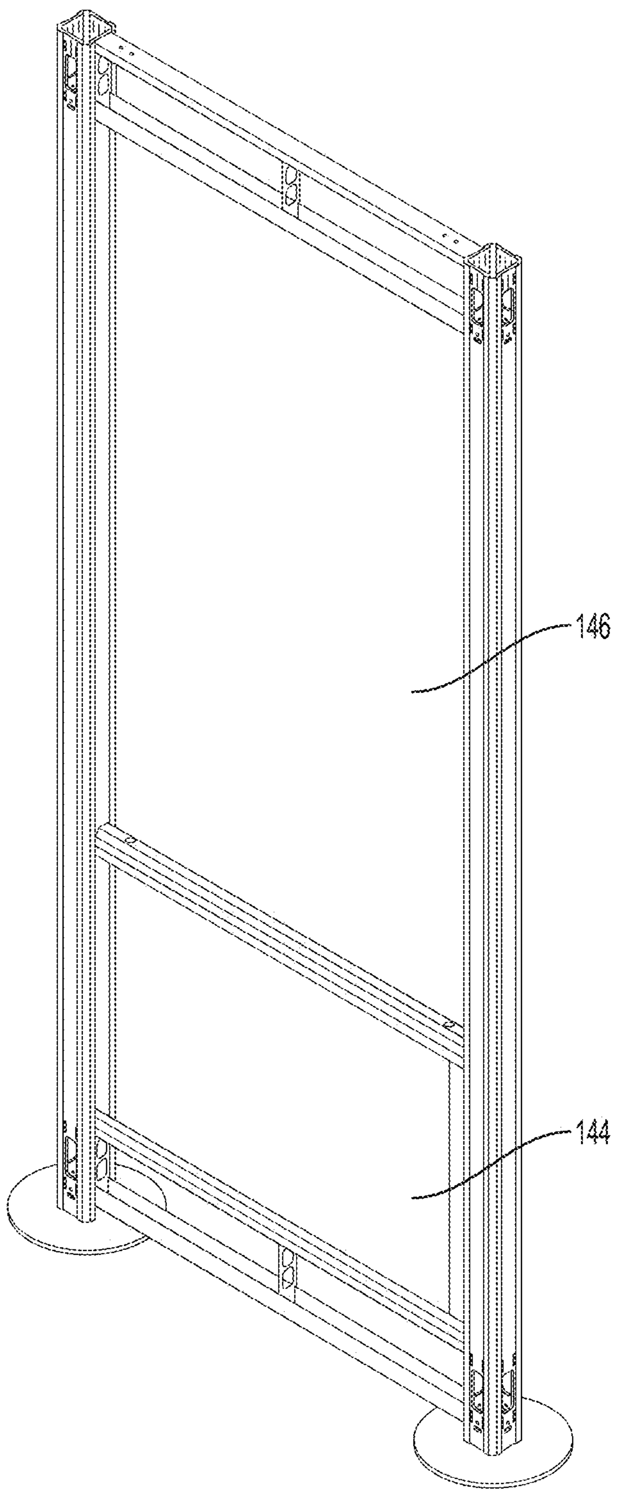
FIG. 11 is a perspective view of an alternative wall panel of FIG. 1A.
Figure 12B:
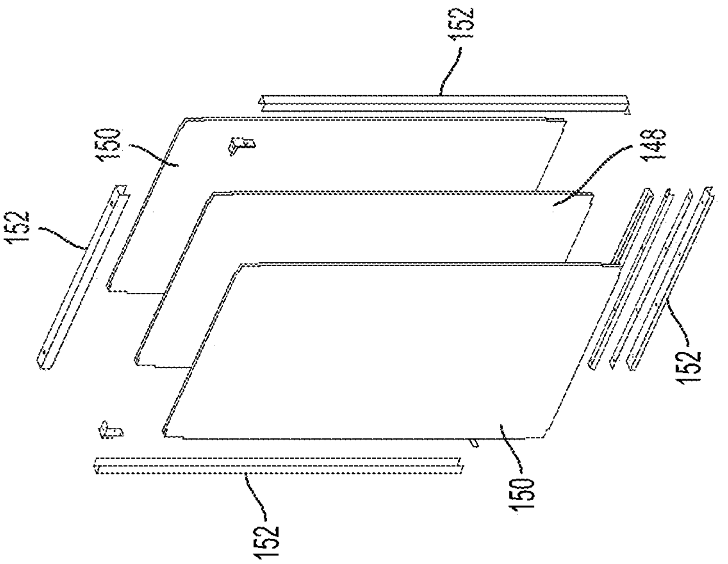
FIG. 12B is an exploded view of a panel for a wall panel of FIG. 12A.
Figure 12A:
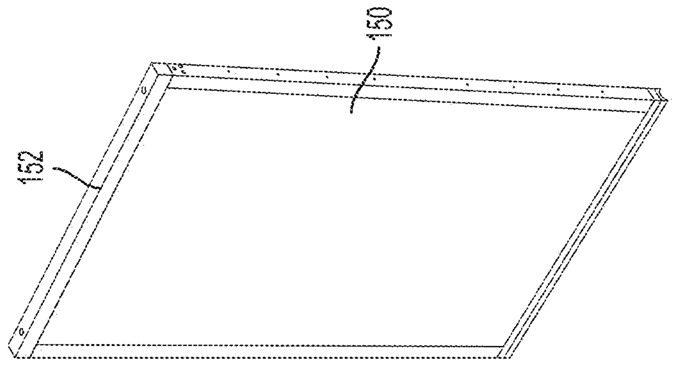
FIG. 12A is a perspective view of a panel for a wall panel of FIG. 1A.

Although the figures depict wall panel 10 comprising lower frame 20, middle frame 22, and upper frame 24, a person of skill in the art will recognize that the skeleton created by lower stretcher 18, upper stretcher 26, and posts 16*a*, 16*b* may support other embodiments. One such embodiment may be a single frame. Another embodiment may include two frames, as depicted in FIGS. 9-11. As shown in FIG. 11, the two frames may include a lower frame 144 and an upper frame 146. As mentioned previously, each of the frames may support a panel comprising any combination of the previously described latching members. The single frame or multiple frames may comprise a panel comprising any combination of plastic, clear glass, frosted glass, sound insulating foam, sound dampening material, fabric wrapped fiberglass, and medium density fiberboard (MDF), and other desired wall panel materials. The panels may comprise one or more of the above listed materials either integrally or separately formed with the frame. For example, as seen in FIGS. 12A and 12B, the panels may include a MDF mounting board 148 attached between two fabric wrapped fiberglass panels 150. The panels may be bounded by a frame 152 which may be constructed of aluminum, plastic, other metals, or any other structurally supportive material. The panels of the single frame or multiple frames may be continuous with each frame.

Figure 13B:
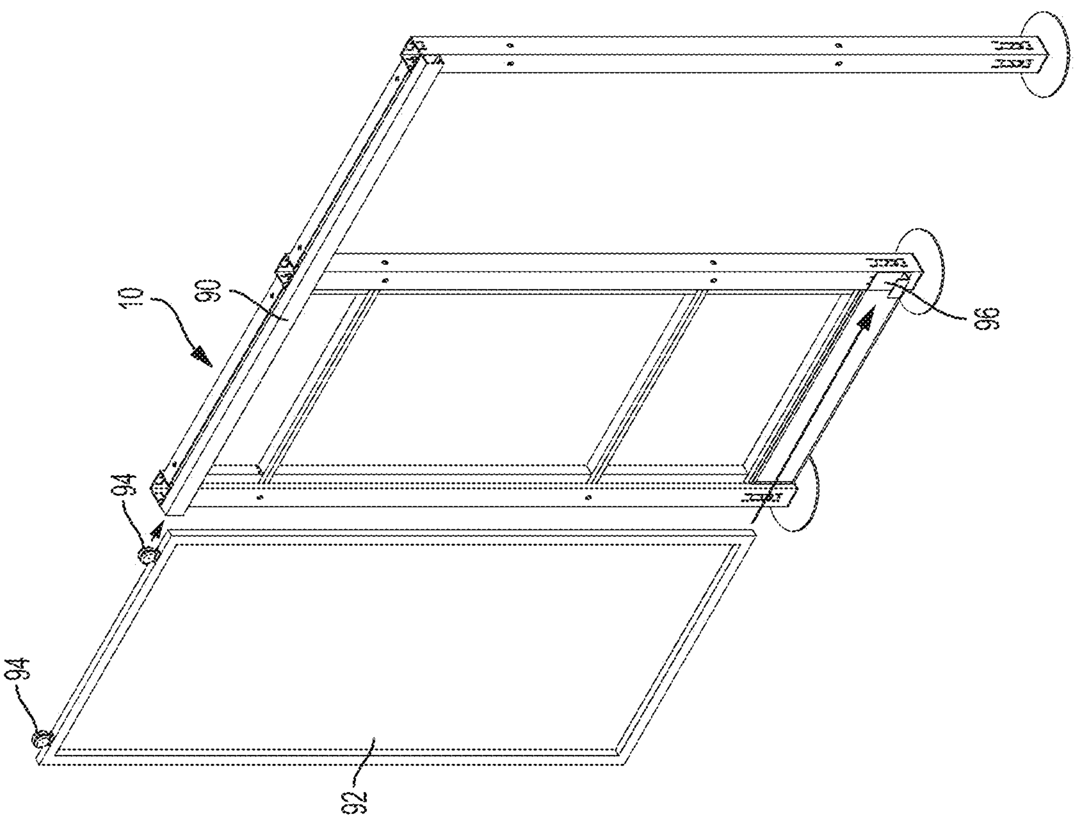
FIGS. 13A and 13B are perspective views of the wall panel of FIG. 1A including an embodiment of a sliding door assembly.
Figure 13A:
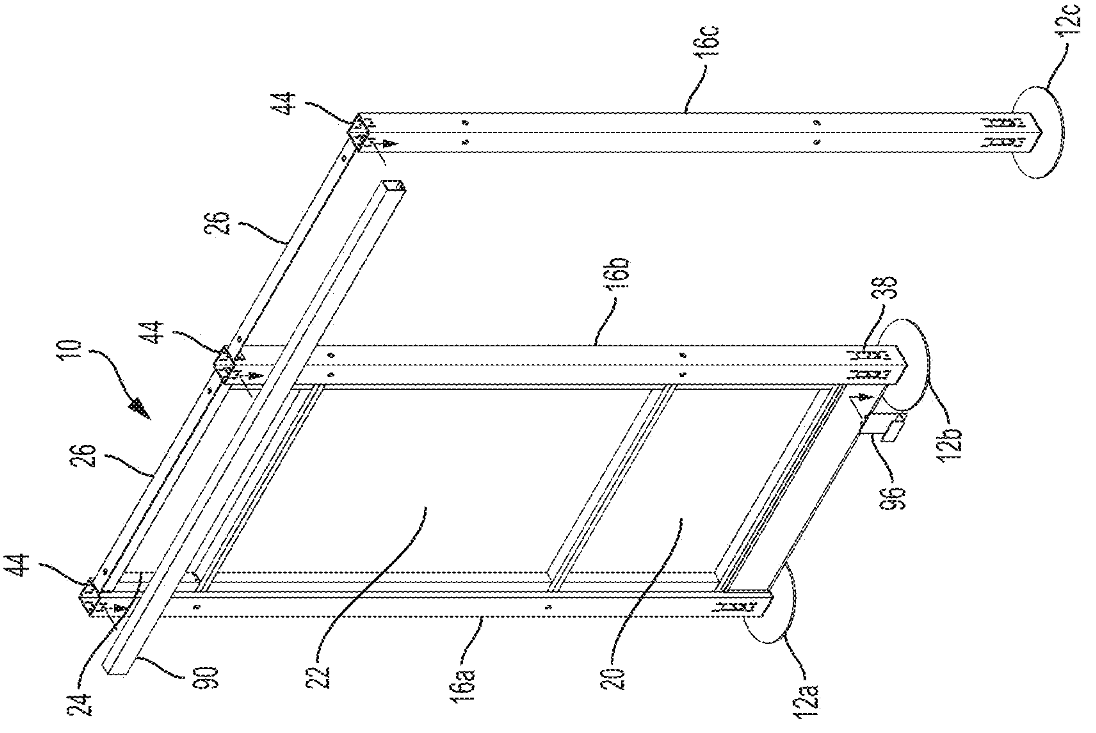
Figure 13C:
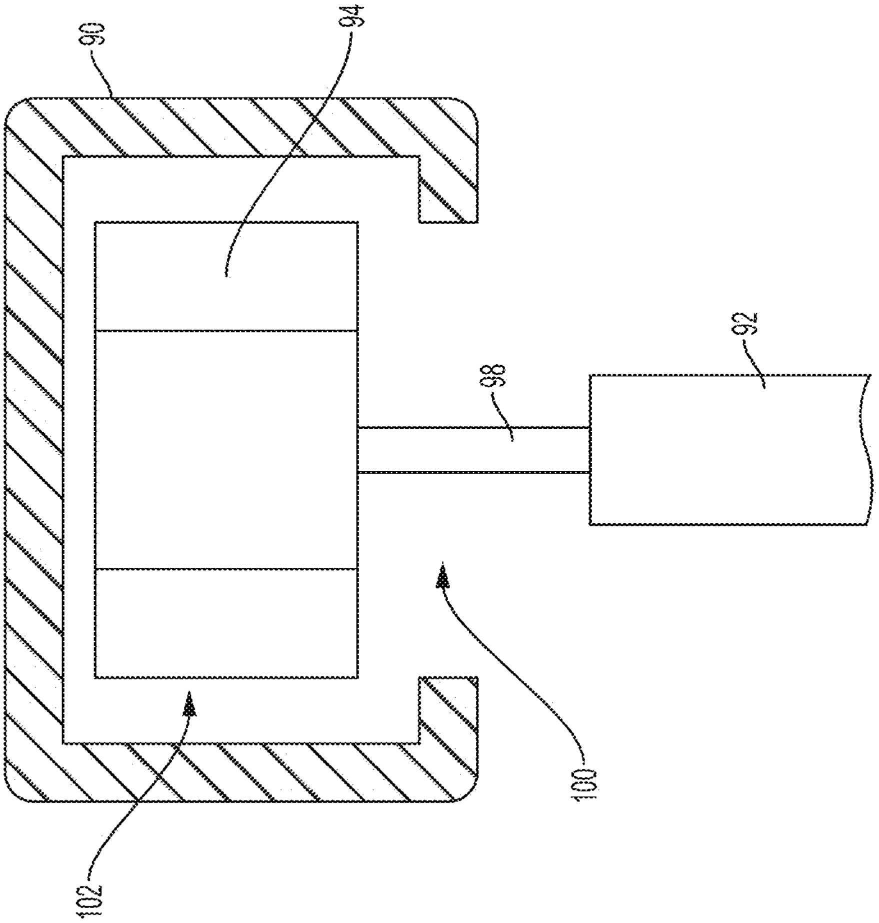
FIG. 13C is a partial cross-sectional view of the sliding door assembly of FIG. 13A.

Referring now to FIGS. 13A-13C, the wall panel system of the present invention may be seen including a door 92 moveable between an open position and a closed position. A third post 16*c*, third base plate 12*c*, and second upper stretcher 26 may connect to a wall panel 10 of FIG. 1A (or other embodiments of wall panel 10). As seen in FIG. 13A, a door hanger 90 may be connected to slots 44 of posts 16*a*, 16*b*, and 16*c* with corresponding hooks (not depicted). A door 92 fitted with one or more wheels 94, may be hung from door hanger 90 to provide access through a wall panel system. Door hanger 90 may comprise hooks (not depicted) which engage slots 44 to secure the door hanger 90 to the wall panel system. As can be seen in FIG. 13C, wheel(s) 94 may comprise an extension 98 connecting the wheel(s) 94 to the door 92. The extension 98 may extend through an opening 100 of door hanger 90 such that wheel(s) 94 are engaged within a track 102 of door hanger 90. The door may be guided by a door guide 96 located on one of the posts 16*a*, 16*b*, 16*c*. For example, door guide 96 may be attached to slots 38 of post 16*b* by corresponding hooks.

Figure 14B:
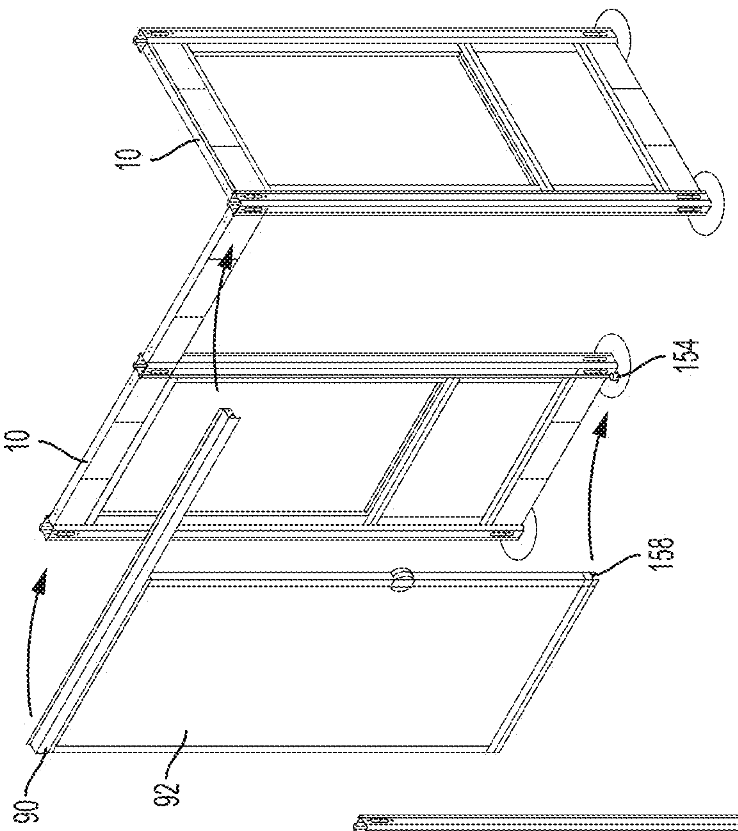
FIGS. 14A and 14B are perspective views of the wall panel of FIG. 1A including an alternative sliding door assembly.
Figure 14A:
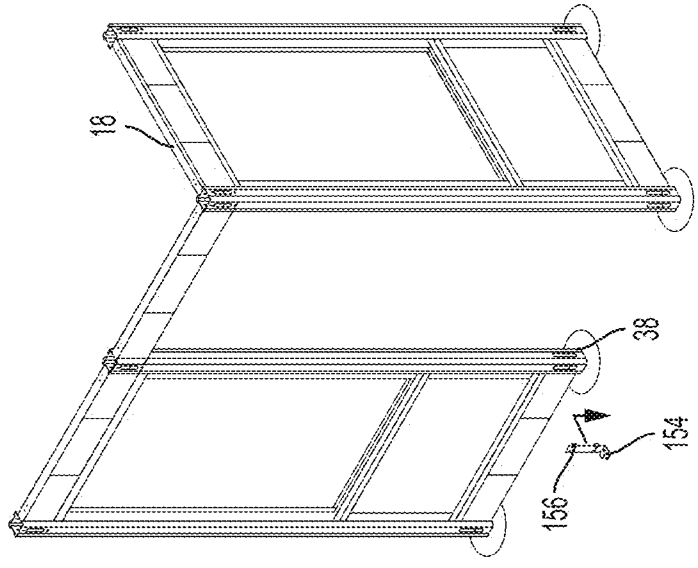

Referring to FIGS. 14A and 14B, an alternative embodiment of door 92 may be seen. Door 92 may be hung in the same manner as described in FIG. 13C. The door 92 may be moveable between an open position and a closed position. In place of door guide 96, a door guide 154 may be used. The door guide 154 may have hooks 156 (see FIG. 14A) for engaging slots 38. Once installed, the door guide 154 may guide door 92 via engagement with a track 158 located on a bottom surface of the door 92. The door guide 154 may be generally circular or egg-shaped to facilitate guiding of the door. The door 92 may be installed in track 102 of door hanger 90 and then door 92 may be lifted above the door guide 154 and lowered such that the hooks on door hanger 90 engage slots 44 simultaneously or substantially simultaneously with the track 158 on the door 92 engaging the door guide 154.

With assembly of a single wall panel 10 described, a person of skill in the art will readily understand from this disclosure that multiple wall panels 10 may be assembled together to provide a separation for a large open area. Each post 16 may comprise the same connection points on one or more surfaces such that a wall panel may extend from post 16 in any or all directions. Such a feature allows for customization of a workspace. Referring to FIG. 14B, a wall panel 10 can be seen installed substantially perpendicular to the door 92 and associated wall panel 10. It can be appreciated from FIG. 14B, that multiple wall panels 10 may be added in any direction to create multiple rooms, divided areas, hallways, etc.

For example, a first post 16*a* may be connected to a second post 16*b* with any number of frames as described previously. After a first wall panel 10*a* is constructed, a third post 16*c* may be connected to second post 16*b* in the same manner. The third post 16*c* may be arranged such that when assembled with a frame or frames, a second wall panel 10*b* may be generally perpendicular to the wall panel 10*a*. A third wall panel 10*c* may be constructed by connecting a fourth post 16*d* to the third post 16*c* in the above described manner. A fourth wall panel 10*d* may be constructed by connecting post 16*d* to post 16*a* in the above described manner. A person of skill in the art will thus appreciate that an enclosed space is defined by wall panels 10*a*, 10*b*, 10*c*, and 10*d*. Many configurations of this enclosed space may be created with the described wall panel system.

Although the above example describes only one wall panel 10 extending in each direction, multiple wall panels 10 may be connected together in series to extend the walls of the enclosed space in each direction. Posts 16 may comprise more or less than four surfaces and each surface may comprise slots for corresponding frames and stretchers allowing the wall panels 10 to extend in any number of directions, thus allowing customization of each enclosed space constructed with the wall panels 10. Additionally, the walls may partially enclose a space such that one or more "walls" are actually open spaces through which entrance may be gained to the space enclosed by the wall panel 10. Similarly, it will be appreciated that one or more of the wall panels 10*a*-10*d* described above may be constructed as a door way.

Many configurations of an enclosed space may be created with the described wall panel system. The wall panels 10 may be constructed such that multiple rooms or enclosures are created. Each room or enclosure may have an opening to gain entry. The opening may comprise a door as described above or any door suitable to gain entry, such as a hinged door. The multiple rooms or enclosures may be of the same or similar size or may be of varying sizes. The size of the room or enclosure may be dependent on the number of wall panels 10 used to construct the room or enclosure. The wall panels 10 may also be constructed so as to form hallways or may use an existing structure or wall to form one wall of an enclosure. Thus, individual customized spaces may be created based on the desired function and use of the space.

Figure 15A:
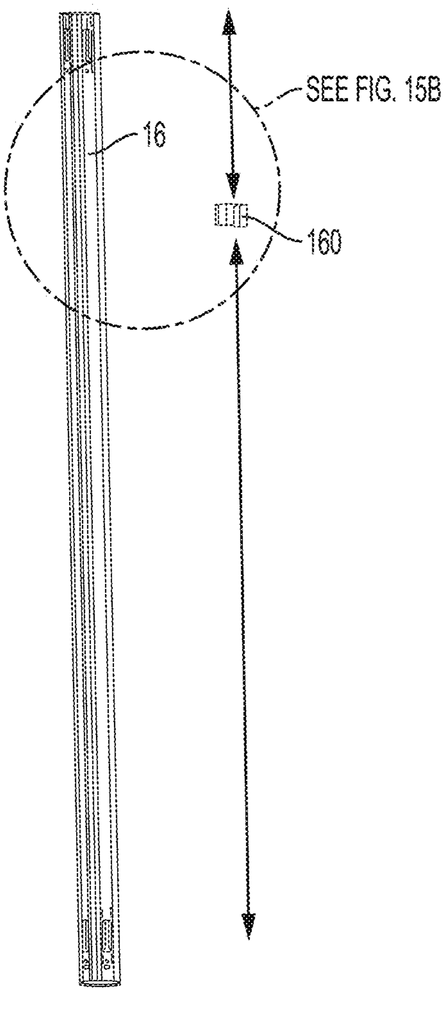
FIG. 15A is a perspective view of a wall mounting bracket for a wall panel of FIG. 1A.
Figure 15B:
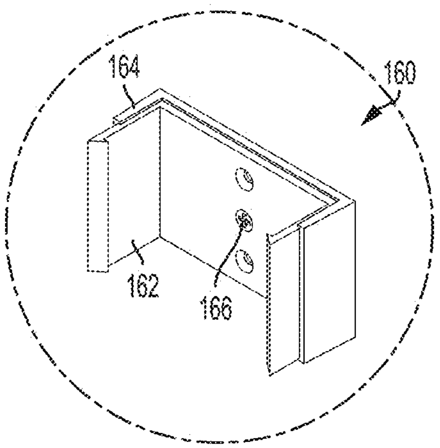
FIGS. 15B and 15C are detailed views of a wall mounting bracket for a wall panel of FIG. 15A.
Figure 15C:
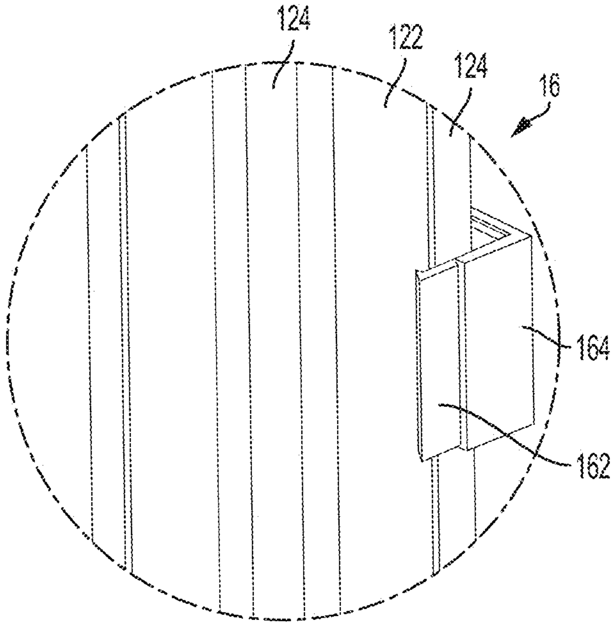

Referring to FIGS. 15A-15C, where the wall panel system of the present invention is adjacent a building wall, a wall mounting bracket 160 may be provided. As seen in FIG. 15B, the wall mounting bracket 160 comprises generally u-shaped or c-shaped brackets 162 and 164. Inner bracket 162 may be constructed of plastic or other flexible material such that it may receive a post 16 (FIG. 15C). The inner mounting bracket 162 may have generally angled protrusions to engage the reduced portion 122 between raised portions 124 of post 16. This can allow the inner mounting bracket 162 to snap on to the post. The inner mounting bracket 162 may be fastened, such as with a screw 166 to an outer bracket 164. Outer bracket 164 may be constructed of metal to provide strength and stability to the wall mounting bracket. The wall mounting bracket 160 may be installed at any height along the length of the post 16. It can be appreciated that with the inner flexible, plastic mounting bracket 162, the post may be pushed into the bracket and with the outer stronger metal mounting bracket 164, the wall panel system may limit movement from side to side or front to back.

Figure 16A:
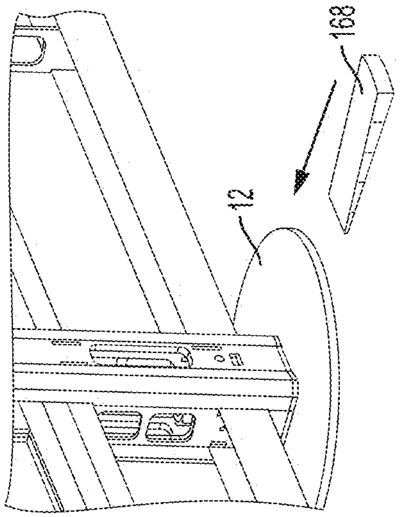
FIGS. 16A-16D are perspective views depicting an illustrative sequence of installation of a shim for a wall panel of FIG. 1A.
Figure 16B:
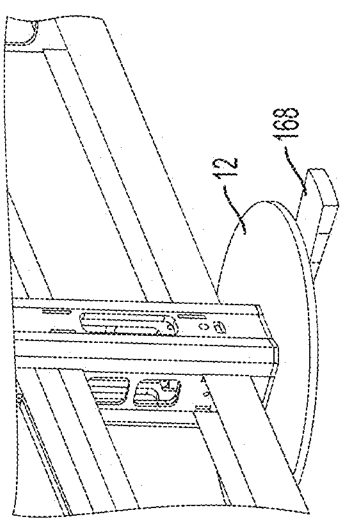
Figure 16C:
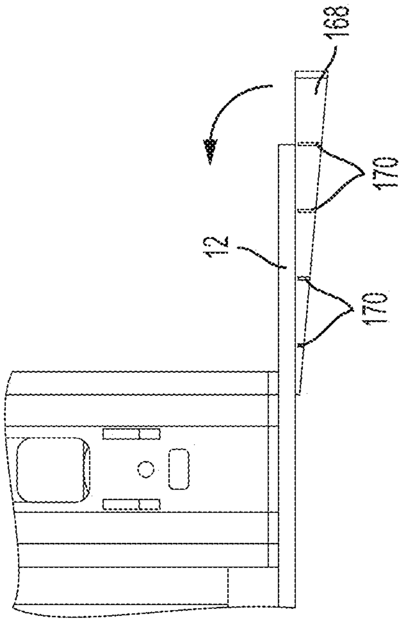
Figure 16D:
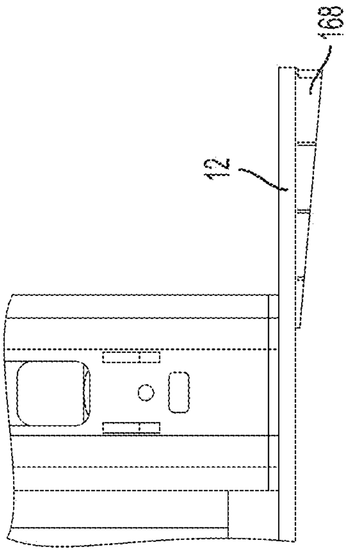

Referring to FIGS. 16A-16D, an additional leveling mechanism is shown. A shim 168 may be pushed under the base plate 12. The shim 168 may be forced under base plate 12 until the desired leveling is achieved (FIG. 16B). The shim 168 may have several profiled fracture lines 170. The shim 168 may then be folded up (FIG. 16C) or otherwise separated at fracture lines 170 to achieve a clean look (FIG. 16D). The shim may be of a plastic or rubber construction.

Figure 17:
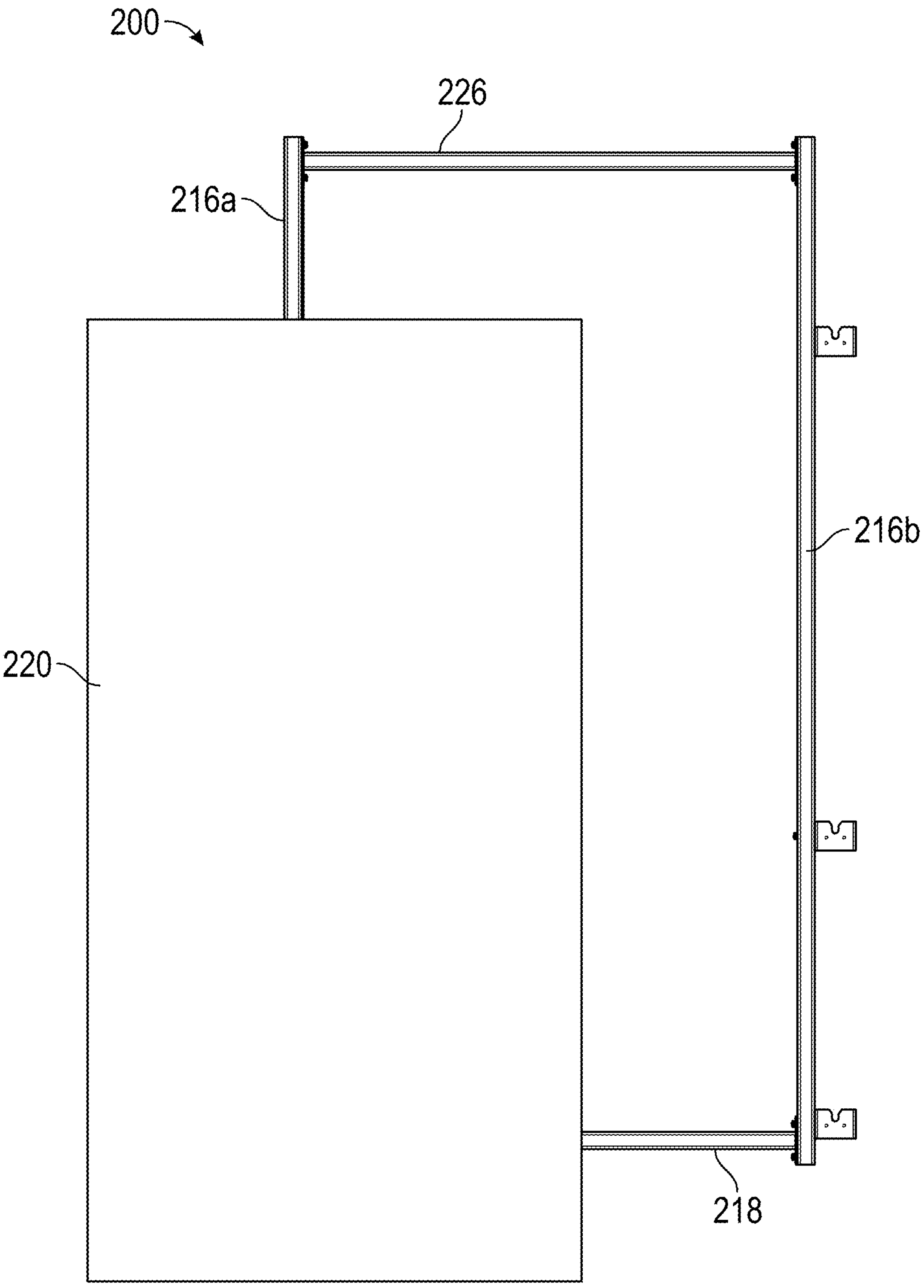
FIG. 17 illustrates a front view of an alternative wall panel, according to an embodiment for the present disclosure.

FIG. 17 illustrates an alternative wall panel 200. The wall panel 200 may include posts 216*a* and 216*b*, which may be substantially upright posts. The wall panel 200 may include a lower stretcher 218 and an upper stretcher 226. The wall panel 200 includes a frame 220. Although illustrated as a single frame, the frame 220 may be multiple frames, such as described with respect to FIGS. 1A and 1B. In examples where the frame 220 is multiple frames, additional stretchers (e.g., additional stretchers 226 or 218) may be installed between the posts 216*a* and 216*b* between the adjacent frames 220. As discussed previously, the frame 220 may be formed of materials, such as laminate, plastic, clear glass, frosted glass, and insulating foam, sound dampening material, fabric wrapped fiberglass, and medium density fiberboard (MDF), as desired by the user of each individual workspace. The panels may comprise one or more of the above listed materials, for example, the panels may be laminated. The panels may include a MDF mounting board attached between two fabric wrapped fiberglass panels. In some examples, where the frame 220 comprises multiple frames, the frames may be the same or different materials. Although not shown in FIG. 17, the lower stretcher 218 may include a cable chase to enclose cables or wires which are routed through the lower stretcher 218, such as described previously with respect to FIGS. 1A and 1B.

Figure 18:
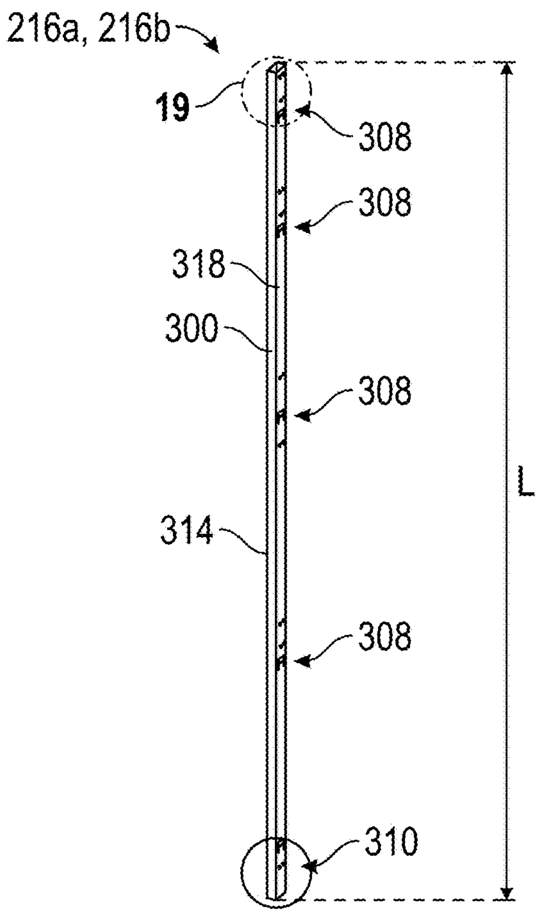
FIG. 18 illustrates a perspective view of a post for the wall panel of FIG. 17.
Figure 19:
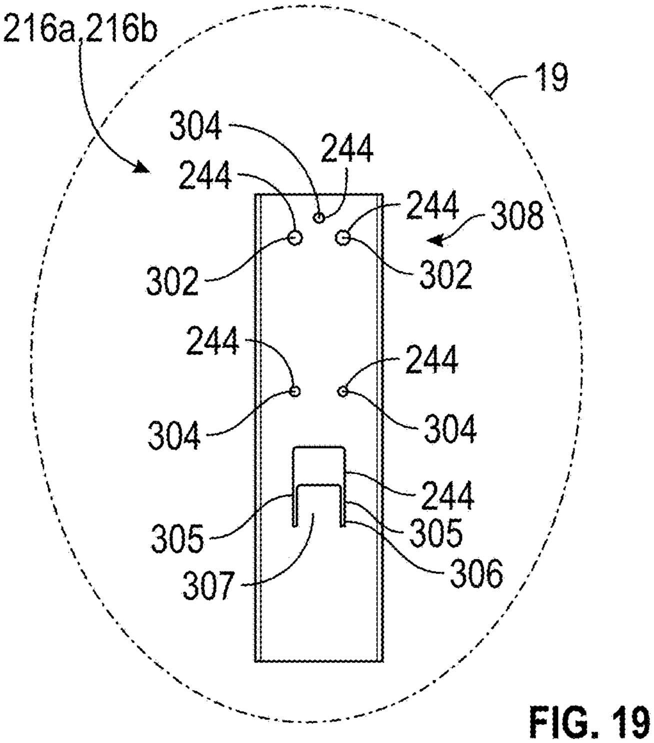
FIG. 19 illustrates a detail view of the post of FIG. 18.

FIGS. 18 and 19 illustrate the post 216*a* and the post 216*b*, for ease of disclosure, FIGS. 18 to 19 will refer to post 216*a*, though 216*b* is understood to have the same or identical structure as the post 216*a*. The post 216*a* may include a tube 300. The tube 300 may be rectangular, though other shapes are contemplated. The tube 300 may be steel, aluminum, fiberglass, or other structural material. The tube 300 may be one-inch by two-inch rectangular steel tubing. The tube 300 may be hollow. The tube 300 may include a first side 312 and a second side 314. The first side may be longer than the second side 314. As the tube 300 is rectangular, the third side and forth side of the tube that are not visible in FIGS. 18 and 19 may be identical to the first side 312 and the second side 314, respectively.

As shown in the detail view 19 of FIG. 19, the post 216*a* includes a plurality of openings 244 at an upper end of the tube 300. The plurality of openings 244 allow for the upper stretcher 226, the lower stretcher 218, and the frame 220 to be connected to the post 216*a* and the post 216*b*. The plurality of openings 244 include one or more through holes 302, one or more tapped holes 304, and one or more slots or cutouts 306. The cutouts 306 may be spring clip cutouts as is described in more detail to follow. The cutouts 306 may have laterally extending slots 305 to form a flange 307. The plurality of openings 244 form a hole pattern 308. The hole pattern 308 is repeated along the vertical length L of the post 216*a*. The hole pattern 308 is located on the first side 312 and the third side (not visible) of the post 216*a*. As shown in FIG. 18, a mirror-image of the hole pattern 308 is located at the lower end as hole pattern 310. The hole pattern 310 is an identical mirror image of the hole pattern 308 and thus the hole pattern 308 is rotated 180 degrees to form the hole pattern 310. Although shown on one surface in FIGS. 18 and 19, the openings 244 may be provided on any or all sides of the post. Thus, as will be appreciated, the frames 220 may be coupled to any or all sides (e.g., all four sides) of the post 216*a*, 216*b*, such that any shape or layout of wall system may be achieved.

Figure 20A:
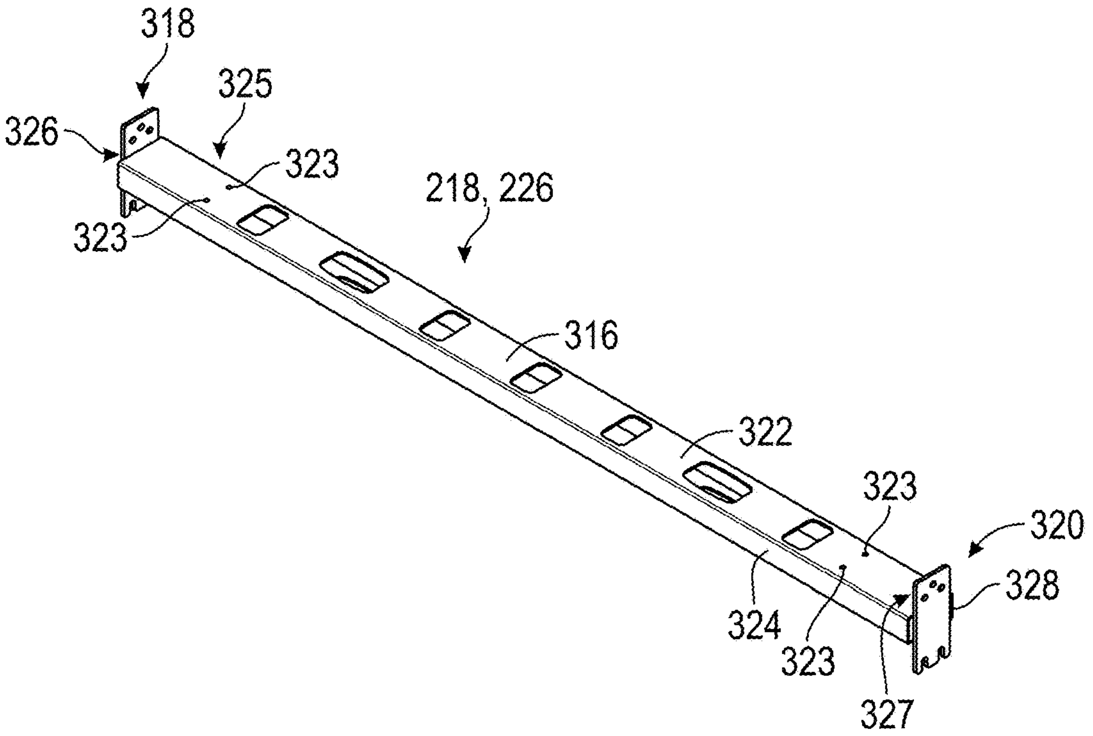
FIG. 20A illustrates a perspective view of an upper stretcher and a lower stretcher for the wall panel of FIG. 17.
Figure 21A:
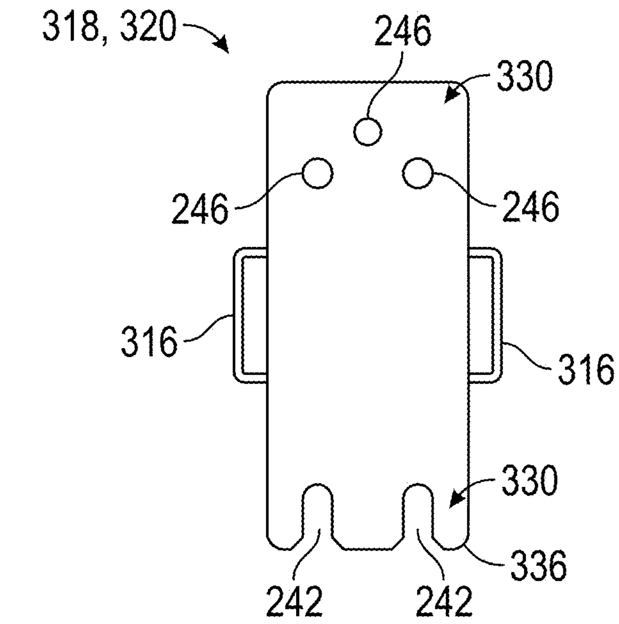
FIG. 21A illustrates an end view of the upper stretcher and the lower stretcher of FIG. 20A.

FIGS. 20A and 21A illustrate the upper stretcher 226 and the lower stretcher 218. The upper stretcher 226 and the lower stretcher 218 may be intercostal members. That is, the upper stretcher 226 and the lower stretcher 218 may be members that extend between posts (e.g., between post 216*a* and post 216*b*). For ease of disclosure, FIGS. 20A and 21A are described with respect to the upper stretcher 226, however, the upper stretcher 226 and the lower stretcher 218 may have identical structure. The upper stretcher 226 may include a body 316, a first end plate 318, and a second end plate 320. The body 316 may be a tube. The body 316 may be rectangular, though other shapes are contemplated. The body 316 may be formed of aluminum, fiber glass, steel, or other material. The body 316 may be one-inch by two-inch rectangular steel tubing. The body 316 may be hollow. The body 316 may include a first side 322 and a second side 324. The first side 322 may be longer than the second side 324. As the body 316 is rectangular, the third side and forth side of the tube that are not visible in FIG. 20A may be identical to the first side 322 and the second side 324, respectively. The first side 322 may include a plurality of openings 323 that extend from the first side 322 to the third side (not visible). The plurality of openings 323 may include a first hole pattern 325 located near the first end plate 318 and a second hole pattern 327 located near the second end plate 320.

With continued reference to FIGS. 20A and 21A, the body 316 may include a first end surface 326 and a second end surface 328. The first end surface 326 may be connected to the first end plate 318. The second end surface 328 may be connected to the second end plate 320. The first end plate 318 and the second end plate 320 may be welded, brazed, or otherwise secured to the first end surface 326 and the second end surface 328, respectively.

FIG. 21A illustrates the first end plate 318 and the second end plate 320, which may be identical. The first end plate 318 and the second end plate 320 may each include a hole pattern 330. As will be discussed in more detail to follow, the hole pattern 330 may align with one or more of the plurality of openings 244 in the hole pattern 308 and the hole pattern 310. The hole pattern 330 includes one or more openings 246 and a one or more openings 242. The one or more openings 242 may be slots. The one or more openings 242 may extend through an end surface 336 of the first end plate 318 and the second end plate 320.

Figure 23:
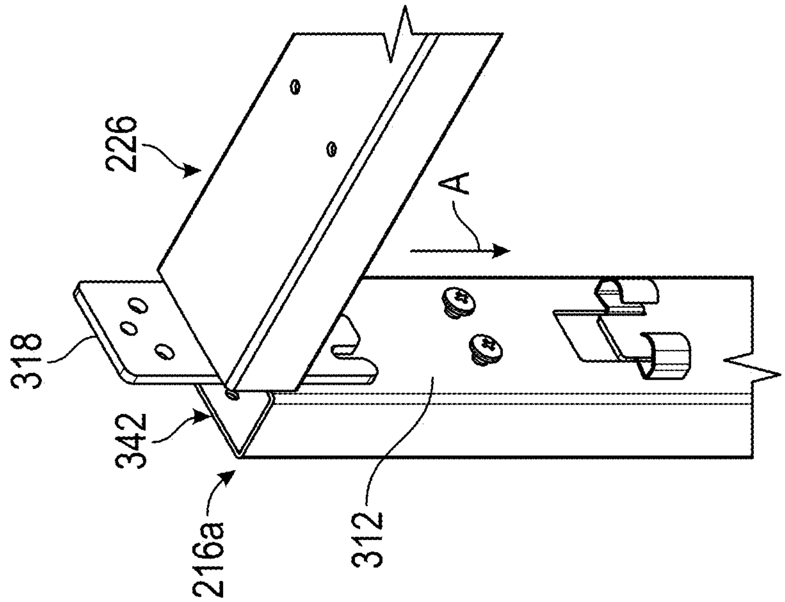
FIG. 23 illustrates a perspective view of a second step of installing the upper stretcher of FIG. 20A on the post of FIG. 18 to form the wall panel of FIG. 17.
Figure 22:
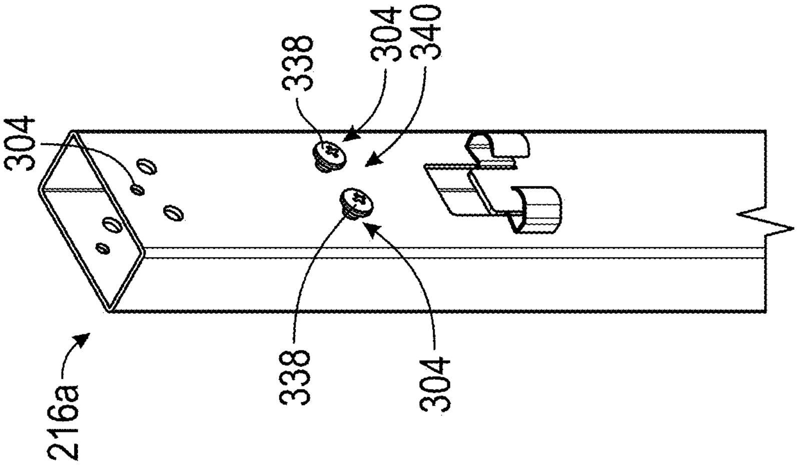
FIG. 22 illustrates a perspective view of a first step of installing the upper stretcher of FIG. 20A on the post of FIG. 18 to form the wall panel of FIG. 17.
Figure 24B:
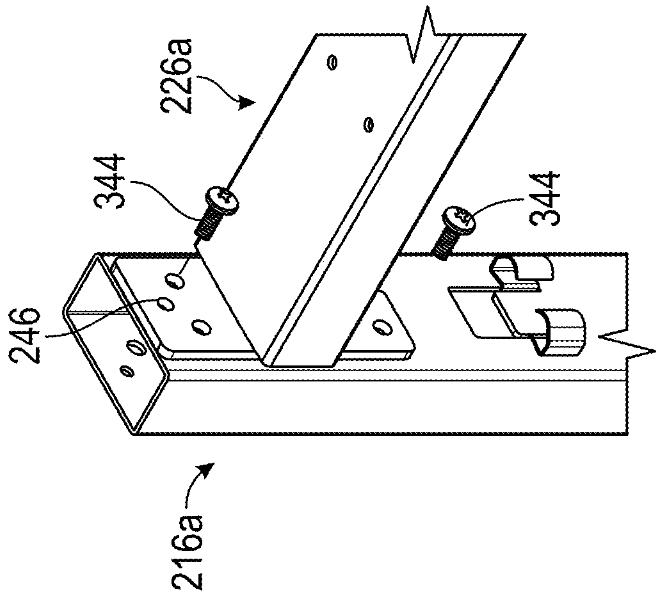
FIG. 24B illustrates a perspective view of a step of installing the upper stretcher of FIG. 20B on the post of FIG. 18 to form the wall panel of FIG. 17.
Figure 24A:
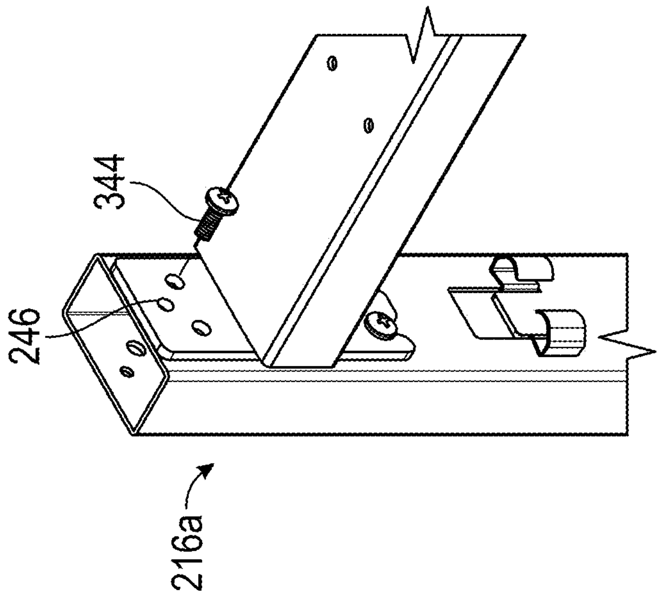
FIG. 24A illustrates a perspective view of a third step of installing the upper stretcher of FIG. 20A on the post of FIG. 18 to form the wall panel of FIG. 17.

FIGS. 22 to 24A illustrate the process of connecting the upper stretcher 226 to the post 216*a*. Referring first to FIG. 22, one or more fasteners 338 may be threaded into the lower holes 340 of the tapped holes 304. The one or more fasteners 338 may be partially threaded therein. Referring to FIG. 23, the first end plate 318 of the upper stretcher 226 may be aligned with a top 342 of the post 316*a* and may be aligned adjacent or in touching contact with the first side 312 of the post 316*a*. The first end plate 318 may then slide or be moved in the direction of arrow A toward the one or more fasteners 338. The one or more openings 242 may be aligned with the one more fasteners 338. The first end plate 318 may continue to slide or be moved in the direction of arrow A until the one or more fasteners 338 are received within respective openings of the one or more openings 242 and until the one or more openings 246 are aligned with the hole pattern 308 (e.g., referring to FIG. 19, with the upper hole of the tapped holes 304 and with the through holes 302). As shown in FIG. 24A, once the holes are aligned and the fasteners 338 are received with the openings 242, a fastener 344 may be inserted through the opening 246 and the tapped hole 304 (not visible) and secured therein. The interaction of the fasteners 338 and 344 with the respective openings on the post 216*a* and the first end plate 318 may secure the first end plate 318 to the post 216*a*.

Although not illustrated, the same or similar process may connect the second end plate 320 to the post 216*b*. Furthermore, the same or similar process may connect the first end plate 318 of the lower stretcher 218 to the post 216*a* and may connect the second end plate 320 of the lower stretcher 218 to the post 216*b*.

Figure 20B:
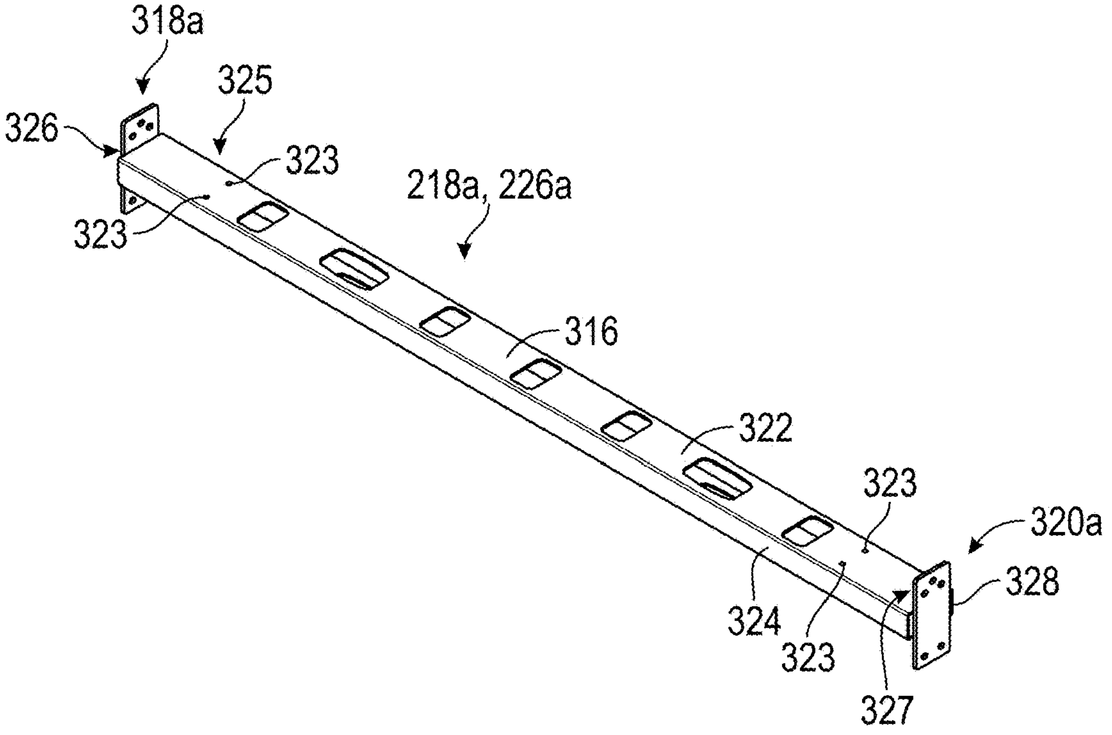
FIG. 20B illustrates a perspective view of another upper stretcher and another lower stretcher for the wall panel of FIG. 17.
Figure 21B:
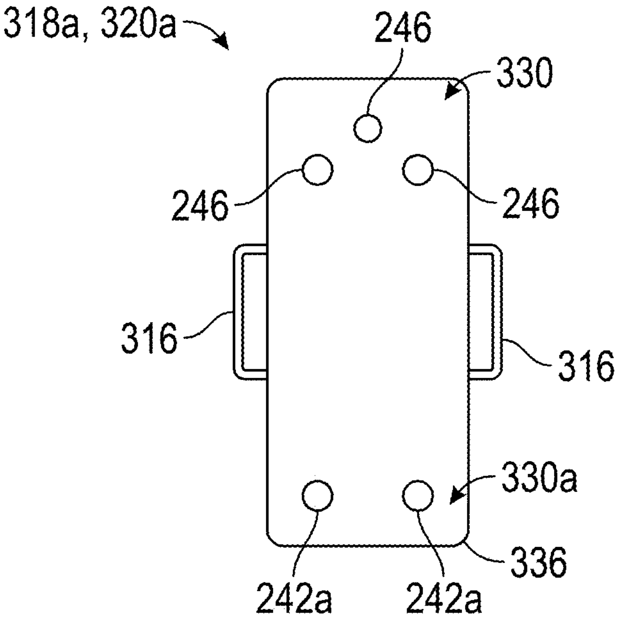
FIG. 21B illustrates an end view of the upper stretcher and the lower stretcher of FIG. 20B.

FIGS. 20B and 21B illustrate an alternative upper stretcher 226*a* and an alternative lower stretcher 218*a*. The upper stretcher 226*a* and the lower stretcher 218*a* may be the same as, or similar to, the upper stretcher 226 and the lower stretcher 218 previously described, except as noted below. Accordingly, like reference numerals in FIGS. 20B and 21B represent like parts with respect to FIGS. 20A and 21A and the foregoing description of FIGS. 20A and 21A applies to FIGS. 20B and 21B, except as noted to follow.

As shown in FIGS. 20B and 21B, the first end plate 318*a* and the second end plate 320*a* may be different than the first end plate 318 and the second end plate 320 of FIGS. 20A and 21A. For example, the one or more openings 242 of the first end plate 318 and the second end plate 320 may be open ended openings such that the openings 242 are capable of sliding over an installed fastener in the manner described with respect to FIGS. 22 to 24A. The open ended openings may be such that the openings 242 extend through the end surface 336. On the contrary, the one or more openings 242*a* of the first end plate 318*a* and the second end plate 320*a* may be discrete openings which have continuous walls that do not intersect the end surface 336*a*.

In this manner, the first end plate 318*a* and the second end plate 320*a* do not slide over already installed fasteners 344, but rather, the fasteners 344 are installed through the openings 242*a* once the hole pattern 330*a* is aligned with the hole pattern on the post 216*a* (e.g., the openings 242*a* aligned with the lower holes 340). The fasteners 344 may extend through the openings 242*a* and the lower holes 340 to secure the upper stretcher 226*a* to the post 216*a*. Although not illustrated, the same or similar process may connect the second end plate 320*a* to the post 216*b*. Furthermore, the same or similar process may connect the first end plate 318*a* of the lower stretcher 218 to the post 216*a* and may connect the second end plate 320*a* of the lower stretcher 218 to the post 216*b*.

Figure 25:
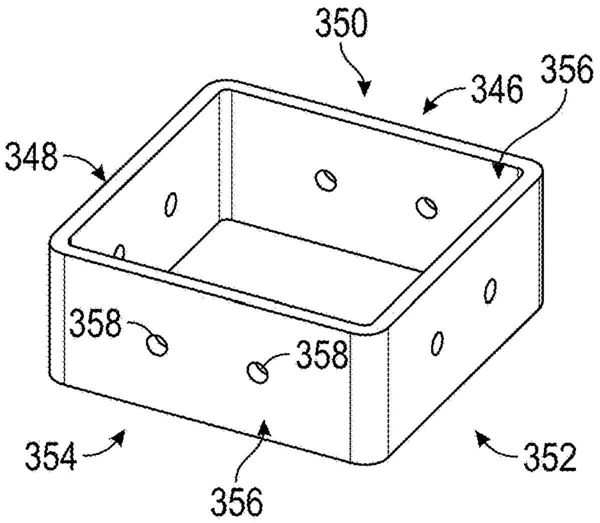
FIG. 25 illustrates a perspective view of a bracket for a wall panel assembly using the wall panel of FIG. 17.
Figure 26:
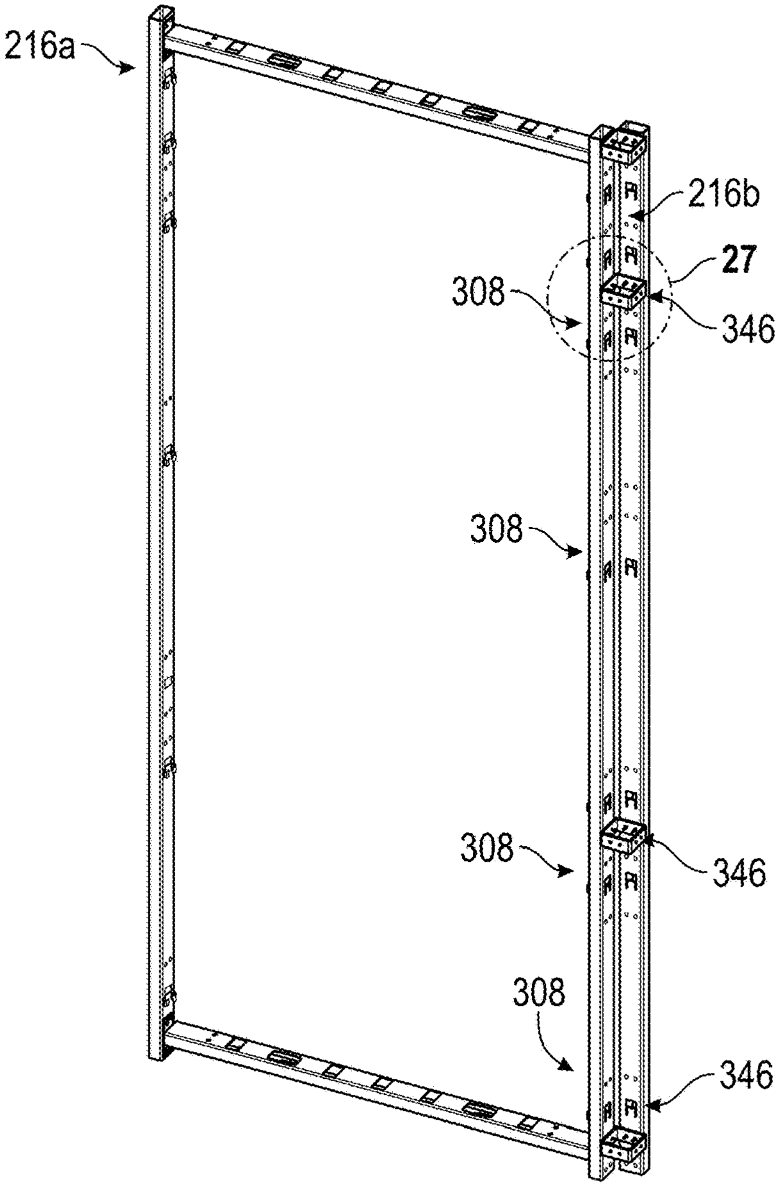
FIG. 26 illustrates perspective view of the wall panel of FIG. 17 with a frame removed and with the bracket of FIG. 25 installed.
Figure 27:
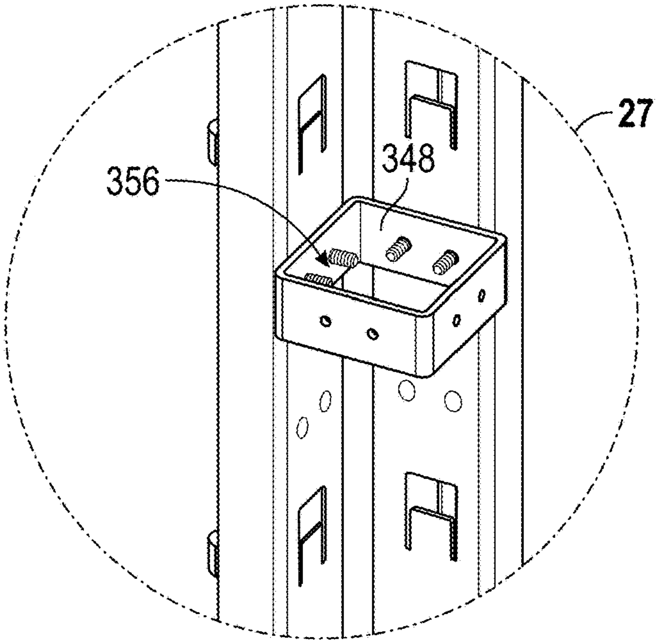
FIG. 27 illustrates a detail view of the bracket on the post of the wall panel of FIG. 26.
Figure 28:
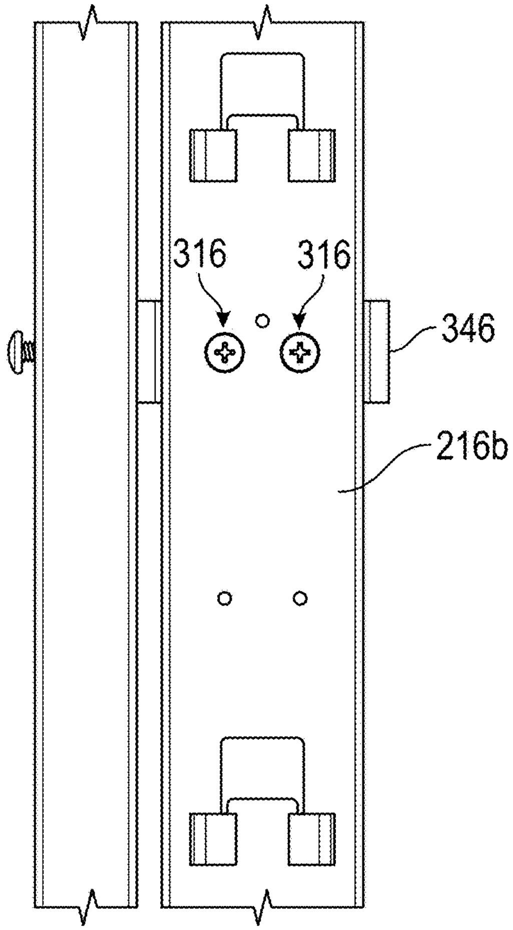
FIG. 28 shows an end view of the post having the bracket installed thereon in the wall panel of FIG. 27.
Figure 29:
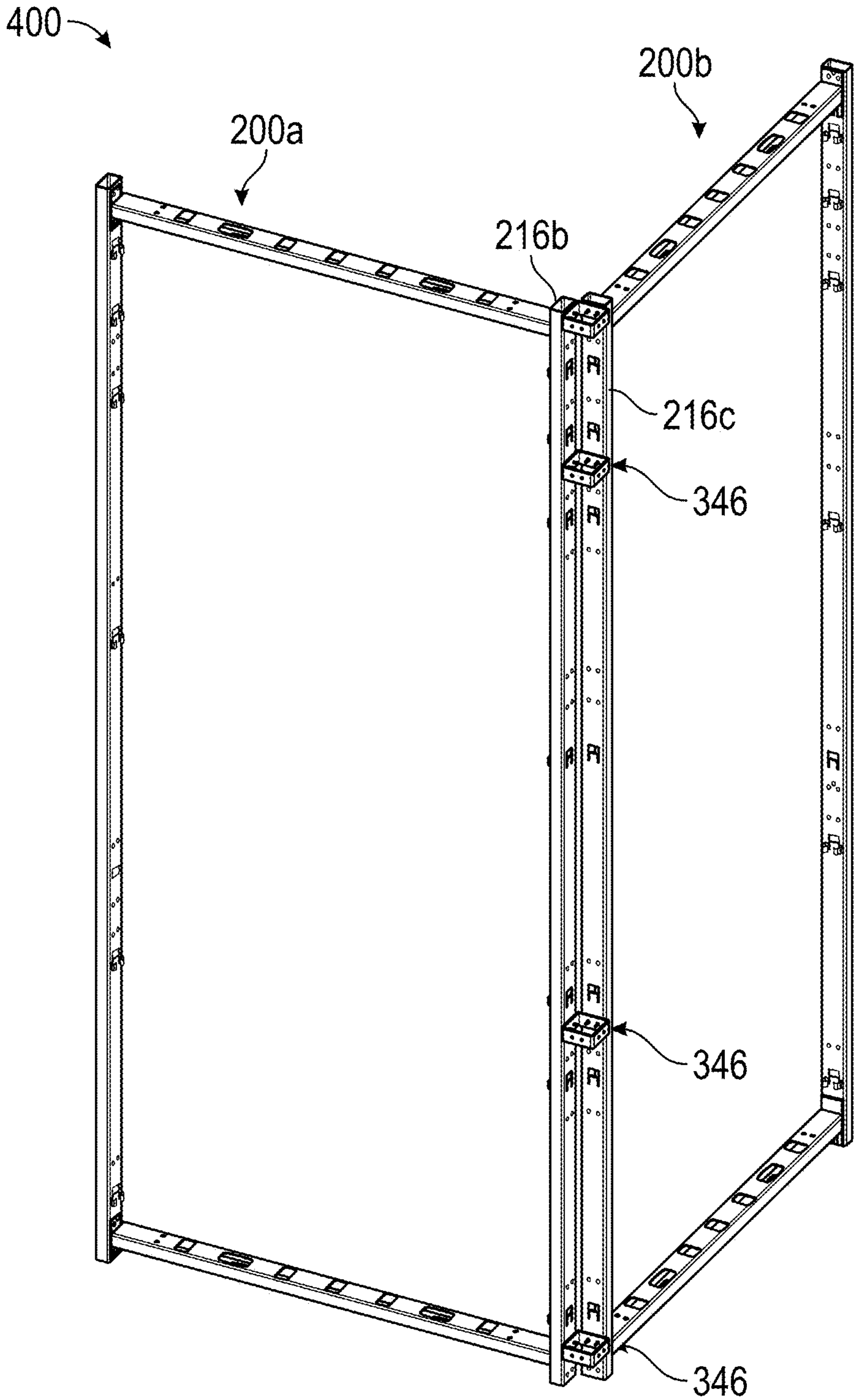
FIG. 29 illustrates a perspective view of a wall panel assembly including the wall panel of FIG. 17 and the bracket of FIG. 25.

FIG. 25 illustrates a bracket 346 that may connect one or more wall panels 200 (FIG. 17) to form a wall panel assembly 400 (FIG. 29). The bracket 346 may be a joining bracket. The bracket 346 may be rectangular. The bracket 346 may include a first side 348, a second side 350, a third side 352, and a fourth side 354. Each side may include a hole pattern 356, such as the hole pattern 356 shown on the fourth side 354. The hole pattern 356 may include one or more openings 358.

Referring to FIGS. 26 to 29, the bracket 346 may be aligned with one or more of the hole patterns 308 (FIG. 18) on the post 216*b*. Although three brackets 346 are shown in FIGS. 26 to 29, more or fewer may be provided to couple the one or more wall panels 200. The hole pattern 356 on the first side 348 of the bracket 346 may be aligned with a hole pattern 308 on the post 216*b*. The one or more openings 358 on the bracket 346 may be aligned with the one or more through holes 302 on the post 216*b*. Once aligned, one or more fasteners 360 may extend through the aligned openings and be secured therein to secure the bracket 346 to the post 216*b*. At this point, and referring to FIG. 29, a second wall panel 200*b* may be similarly aligned with the brackets 346 connected to the first wall panel 200*a* and may be secured thereto in a similar manner or in the same manner as described with respect to FIGS. 26 to 28 to form the wall panel assembly 400. That is, in FIG. 29, the second side 350 of the bracket 346 is aligned with a post 216*c* to secure the bracket 346 thereto. The bracket 346 thus secures the post 216*b* to the post 216*c*. Thus, the bracket 346 allows for the wall panels 200 to form a room, an L-configuration, a T-configuration, and X-configuration, or other 90-degree angle configurations. Although not illustrated in FIG. 29, additional wall panels may extend from the third side 253 and the fourth side 354 of the bracket 346 such that four wall panels are coupled to the bracket 346, one on each side of the bracket 346.

Figure 30A:
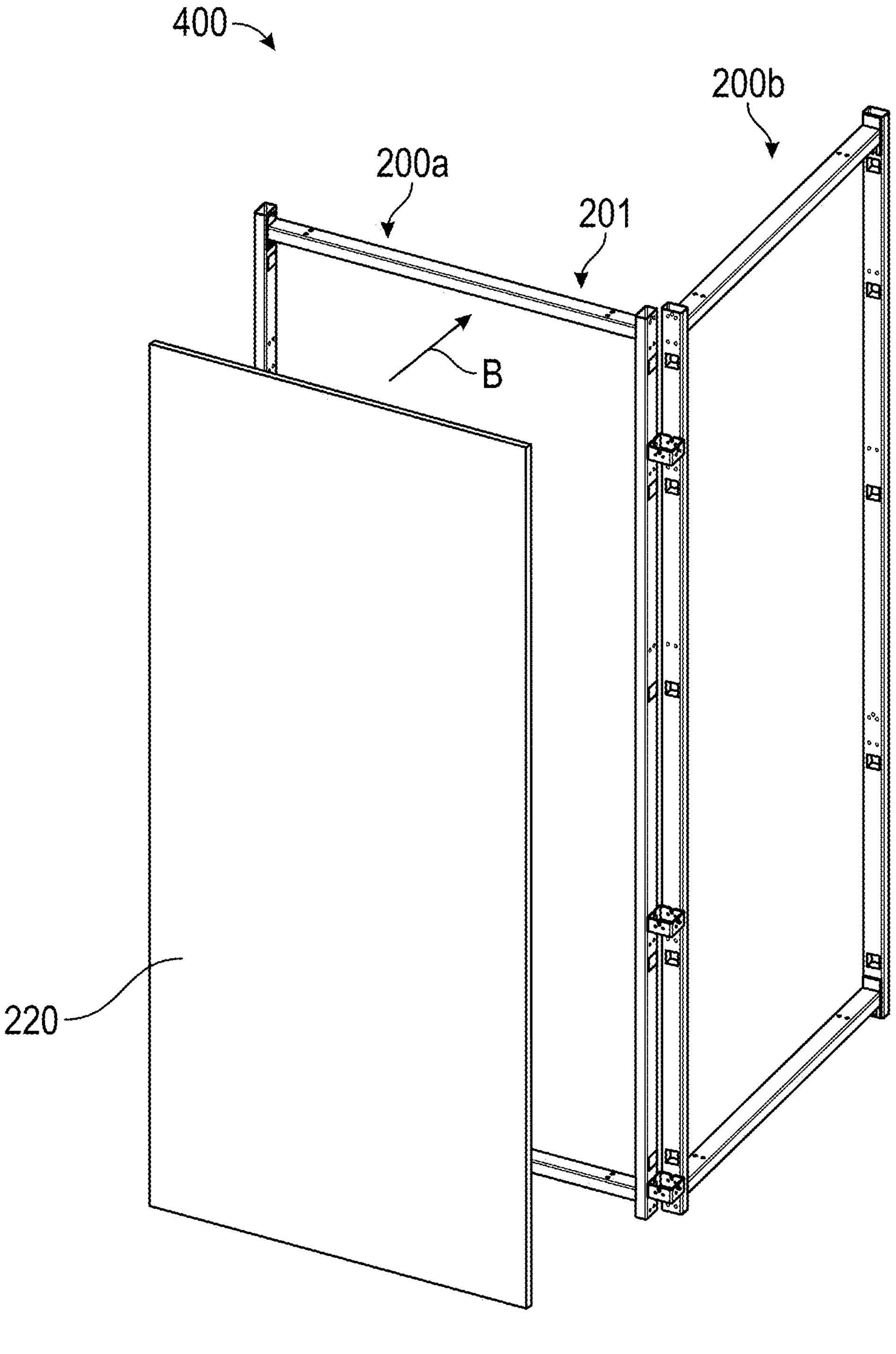
FIG. 30A illustrates a perspective view of the wall panel assembly of FIG. 29 with the frame added.

As illustrated in FIG. 30A, the frame 220 may be included in a wall panel frame 201 of the wall panels 200*a* and 200*b*. The wall panel frame 201 may be formed of the upper stretcher 226, the lower stretcher 218, the post 216*a*, and the post 216*b*. The frame 220 may be couple to the wall panels 200*a* and 200*b* before connection to another wall panel or after connection to another wall panel. Although shown in FIG. 30A without a frame 220 in the second wall panel 200*b*, a frame 220 may be included therein. The frame 220 may be installed in the wall panel 200*a* in the direction of arrow B in a manner to be described to follow.

Figure 30B:
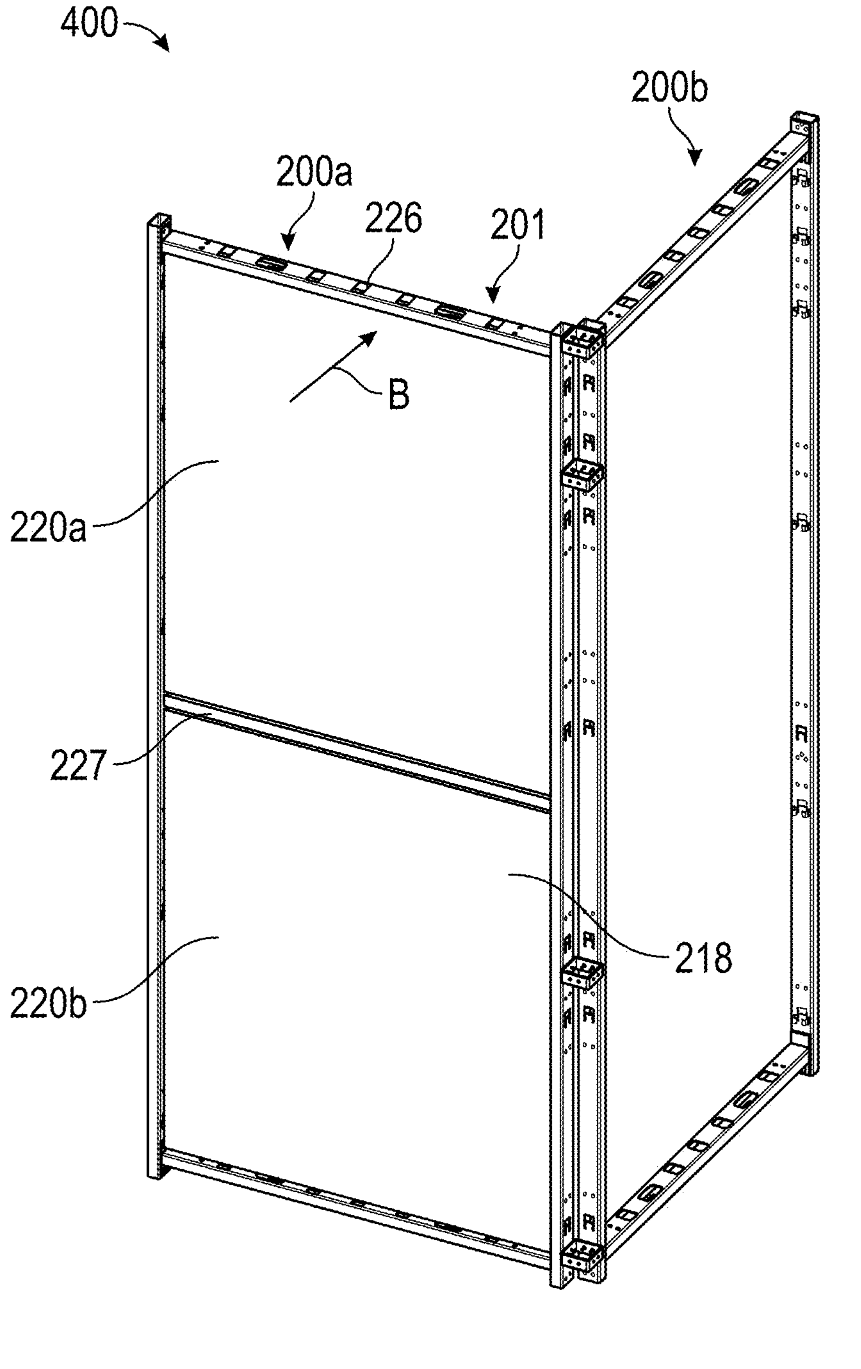
FIG. 30B illustrates a perspective view of a wall panel assembly with an alternative frame added.

As mentioned previously, the frame 220 (FIG. 30A) may be multiple frames, as shown in FIG. 30B, e.g., first frame 220*a* and second frame 220*b*. In examples where multiple frames are present, additional stretchers may be provided for securing the frames to the posts. For example, where the frame 220 (FIG. 30A) is formed of two frames, an intermediate stretcher 227 may be coupled between the posts 216*a* and 216*b* by way of the openings, as described with respect to FIGS. 20 to 24. Once the stretcher is coupled to the posts, a first frame 220*a* may be coupled between the intermediate stretcher 227 and the upper stretcher 226 and a second frame 220*b* may be coupled between the intermediate stretcher 227 and the lower stretcher 218. The frames 220*a*, 220*b* may be any of the frames described herein and may be assembled as described herein. Although two frames are shown in FIG. 30B, more frames and more intermediate stretchers may be provided. The frames may be the same or different materials.

Figure 31:
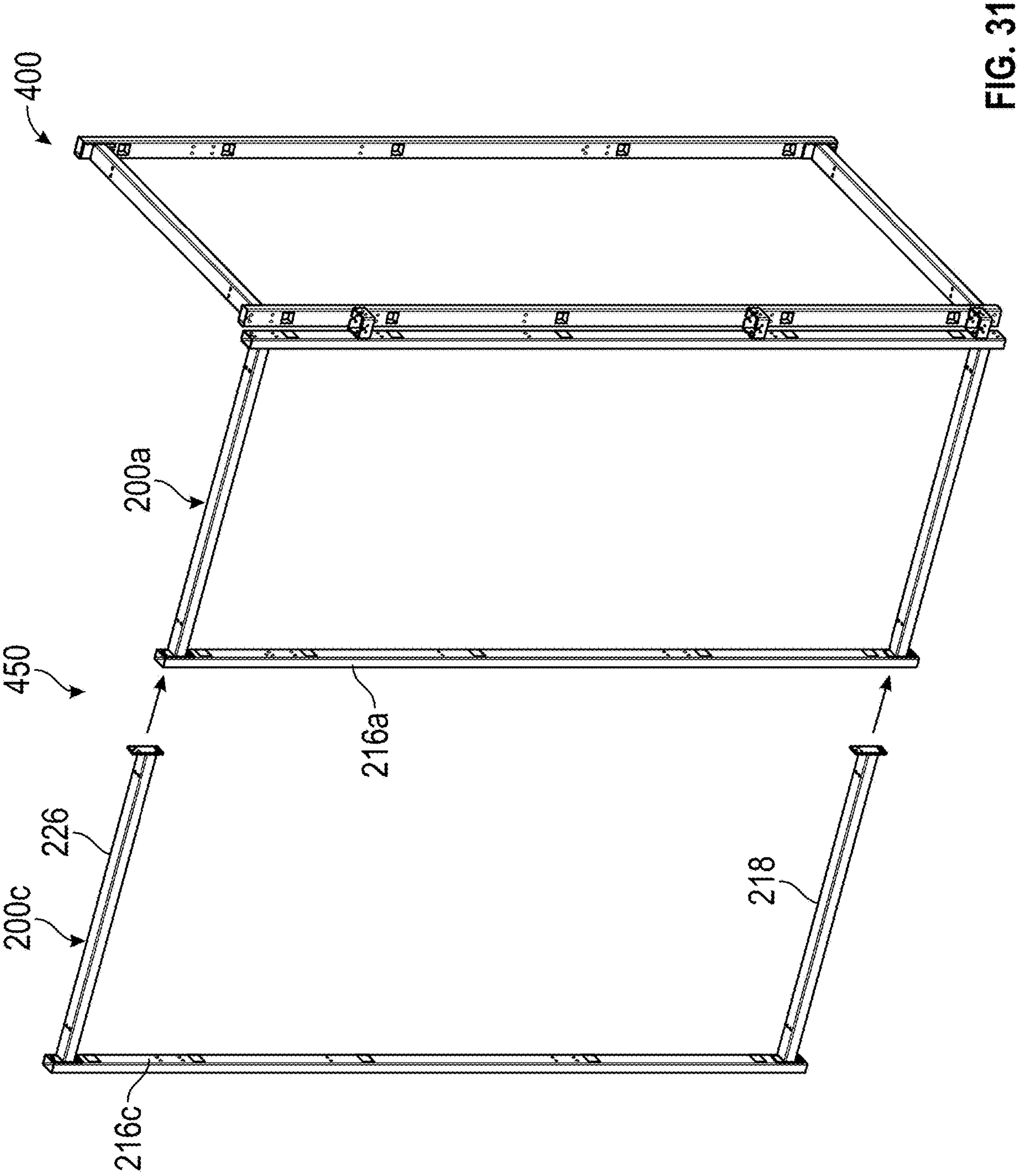
FIG. 31 illustrates perspective view of an alternative wall panel assembly including the wall panel of FIG. 17.

FIG. 31 illustrates a wall panel assembly 450 including the wall panel assembly 400 and a third wall panel 200*c*. As shown, the third wall panel 200*c* includes an upper stretcher 226 and a lower stretcher 218. The wall panel 200*c* includes a first post 216*c* and a second post 216*a*. The second post 216*a* is shared between the wall panel 200*c* and the wall panel 200*a*. Thus, when connecting wall panels in a straight or linear arrangement, each wall panel shares a post with an adjacent wall panel. The wall panel 200*c* may be connected to the wall panel 200*a* in the same manner in which the upper stretcher 226 and lower stretcher 218 are connected to the post 216*a*, as described with respect to FIGS. 22 to 24.

Figure 32:
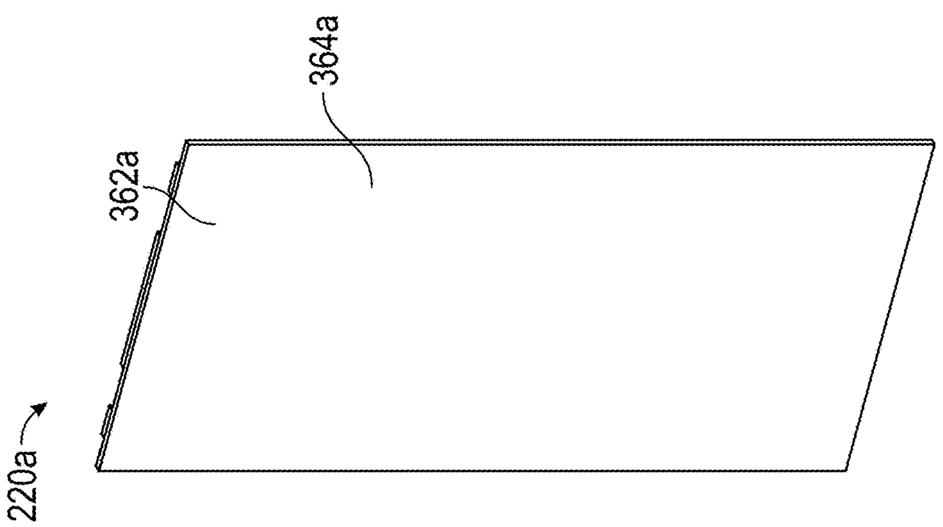
FIG. 32 illustrates a front-perspective view of a frame for the wall panel of FIG. 17.
Figure 33:
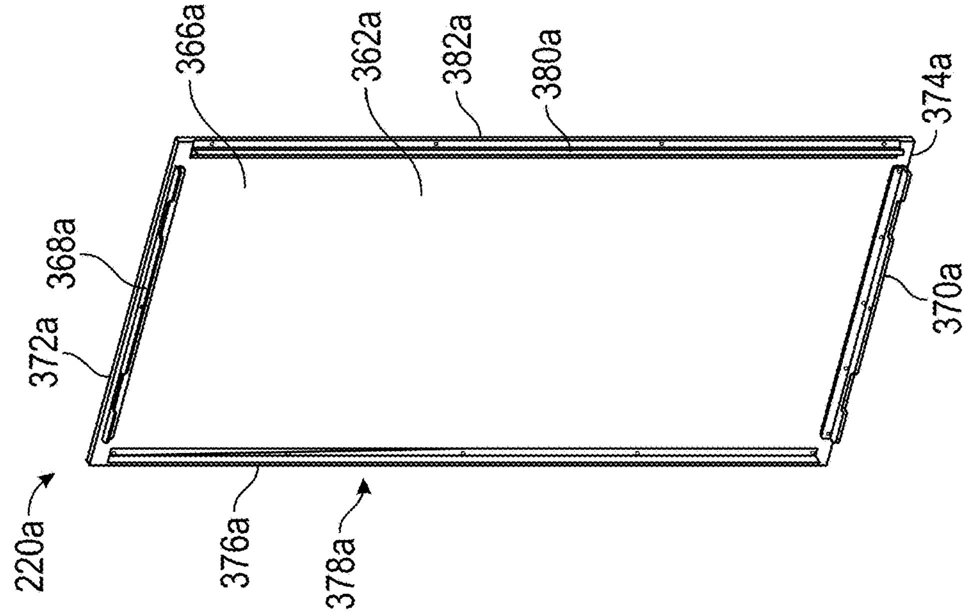
FIG. 33 illustrates a rear-perspective view of the frame of FIG. 32 for the wall panel of FIG. 17.

FIGS. 32 to 36 illustrate exemplary frames 220. As shown in FIGS. 32 and 33, a first exemplary frame 220*a* may have a body 362*a*. The body 362*a* may be solid. The body 362*a* may include a front surface 364*a* and a rear surface 366*a*. An upper support 368*a* and a lower support 370*a* may be coupled to an upper portion and a lower portion, respectively, of the rear surface 366*a* of the body 362*a*. The upper support 368*a* may be spaced apart from an upper end 372*a* of the frame 220*a*. The lower support 370*a* may be spaced apart from a lower end 374*a* of the frame 220*a*. A first lateral extrusion 376*a* may be coupled to a first side of the body 362*a* and spaced apart from a first lateral end 378*a* of the body 362*a*. A second lateral extrusion 380*a* may be coupled to a second side of the body 362*a* and spaced apart from a second lateral end 382*a* of the body 362*a*.

Figure 34:
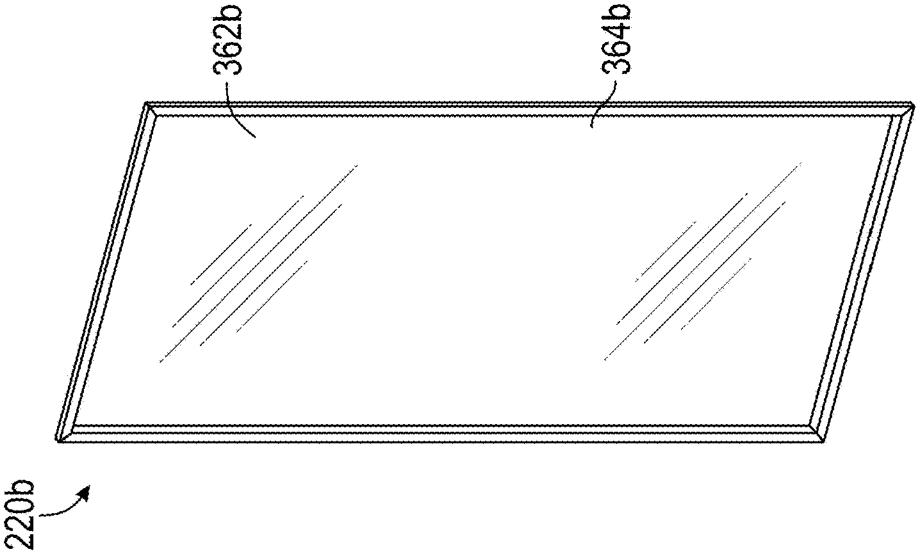
FIG. 34 illustrates a front-perspective view of a frame for the wall panel of FIG. 17.
Figure 36:
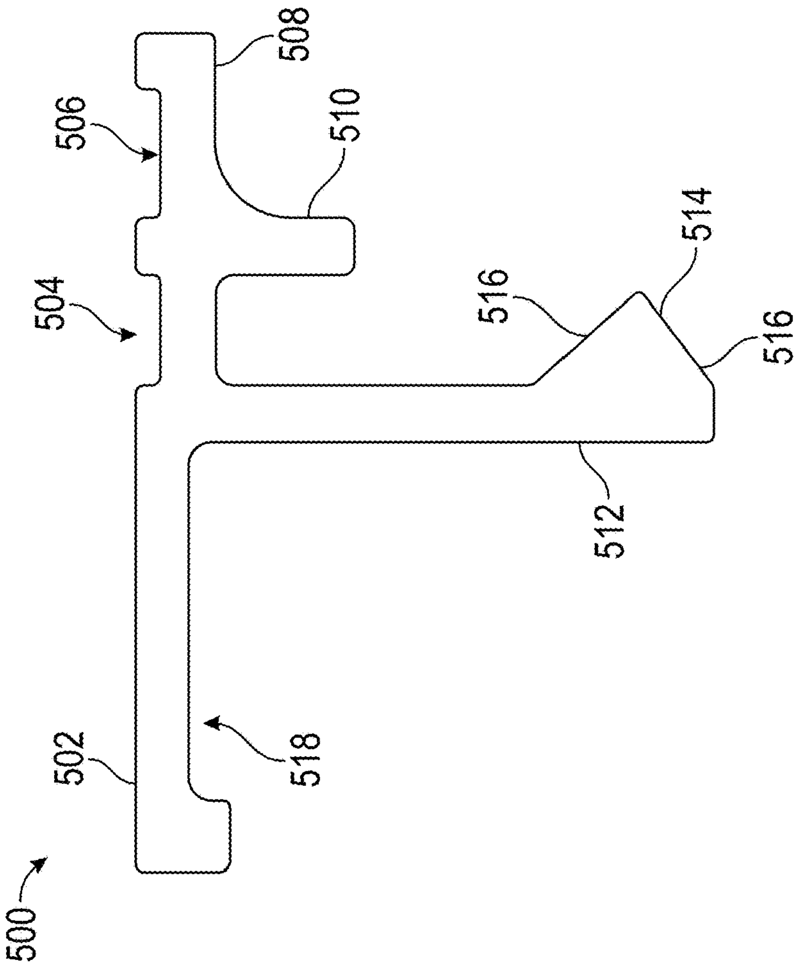
FIG. 36 illustrates an end view of an extrusion profile for the frame of FIG. 32 and for the frame of FIG. 34.
Figure 35:
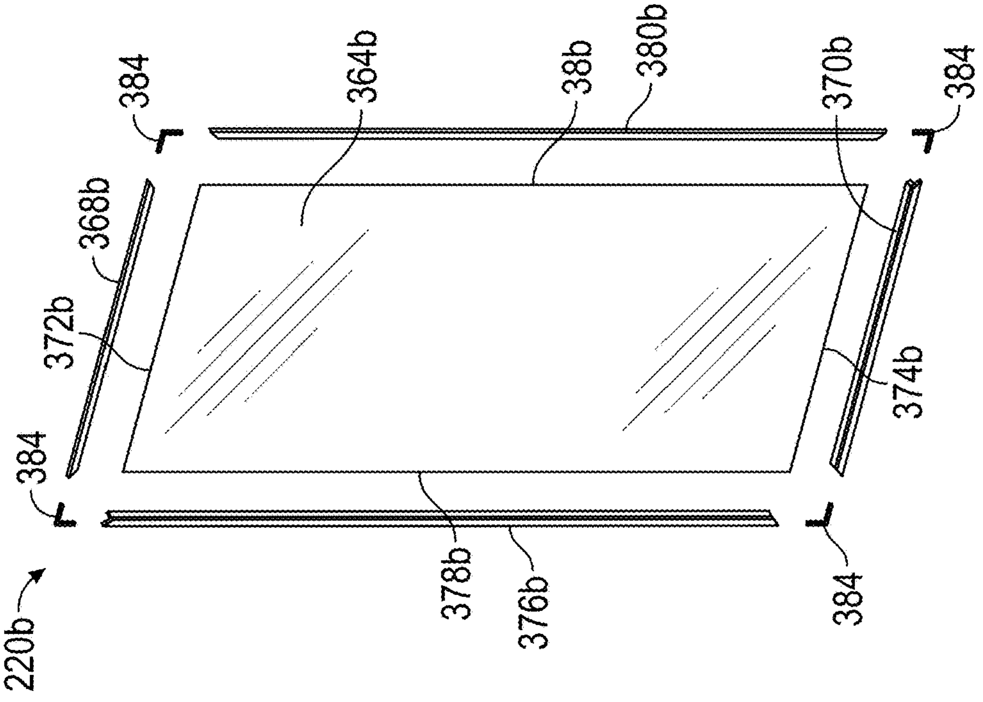
FIG. 35 illustrates a rear-perspective view of the frame of FIG. 34 for the wall panel of FIG. 17.

Referring to FIGS. 34 and 35, a second exemplary frame 220*b* may have a body 362*b*. The body 362*b* may be glass. The body 362*b* may include a front surface 364*b* and a rear surface 366*b*. An upper support 368*b* and a lower support 370*b* may be coupled to an upper portion and a lower portion, respectively, of the rear surface 366*b* of the body 362*b*. The upper support 368*b* may be coupled directly to an upper end 372*b* of the frame 220*b*. The lower support 370*b* may be coupled directly to a lower end 374*b* of the frame 220*b*. A first lateral extrusion 376*b* may be coupled directly to a first lateral end 378*b* of the body 362*b*. A second lateral extrusion 380*b* may be coupled directly to a second lateral end 382*b* of the body 362. One or more L-Brackets 384 may couple the upper support 368*b* to each of the first lateral extrusion 376*b* and the second lateral extrusion 380*b*. One or more L-Brackets 384 may couple the lower support 370*b* to each of the first lateral extrusion 376*b* and the second lateral extrusion 380*b*. In the example of FIGS. 34 and 36, the upper support 368*b* and the lower support 370*b* may be extrusions configured to receive the respective upper end 372*b* and lower end 374*b*.

Figure 37:
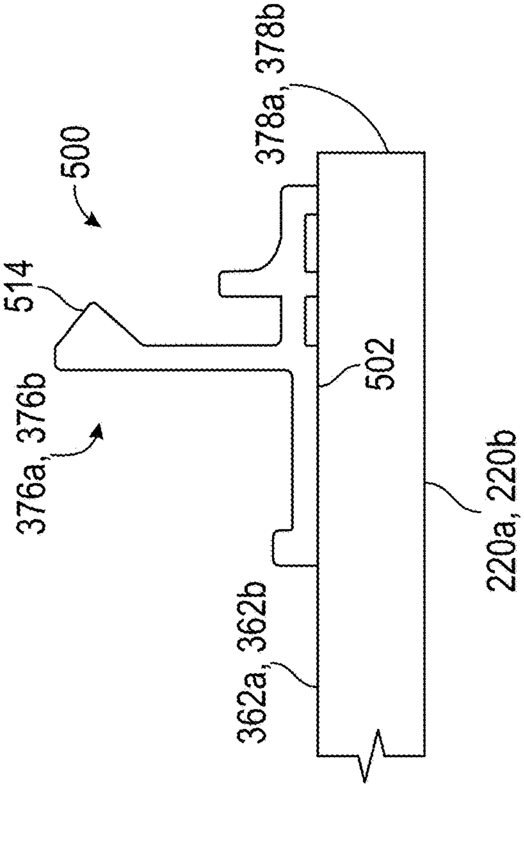
FIG. 37 illustrates a top view of the frame of FIG. 32 and the frame of FIG. 34 having the extrusion profile of FIG. 36.

Referring to FIGS. 36 and 37, each of the first lateral extrusions 376*a*, 376*b* and second lateral extrusions 380*a*, 380*b* may include an extrusion profile 500. The extrusion profile 500 may allow the frame 220 to be coupled to the posts 216 in a manner to be described. The extrusion profile 500 may include a first surface 502 for connecting to the rear surface 366*a*, 363*b* of the frames 220*a*, 220*b*. The first surface 502 includes a first indentation or groove 504 and a second indentation or groove 506. The extrusion profile 500 includes a second surface 508 opposed to the first surface 502. The second surface 508 includes a first protrusion 510, a second protrusion 512, and a groove 518. The first protrusion 510 and the second protrusion 512 may each extend generally perpendicularly from the second surface 508. The second protrusion 512 includes a hook portion 514 configured to interact with a clip on the post 216, in a manner to be described. The hook portion 514 is illustrated as triangular with ramped or angled surfaces 516, however other shapes are contemplated. The first surface 502 and the second surface 508 may be planar. As shown in FIG. 37, the hook portion may be orientated facing the lateral end of the body 362*a*, 362*b* (e.g., the first lateral end 378*a*, 378*b*). Although FIG. 37 shows the first lateral extrusion 376*a*, 376*b*, the profile 500 of the second lateral extrusion 380*a*, 380*b* may be understood to present a mirror image to FIG. 37 with the hook portion 514 orientated toward the second lateral end 382*a*, 382*b*.

Figure 39:
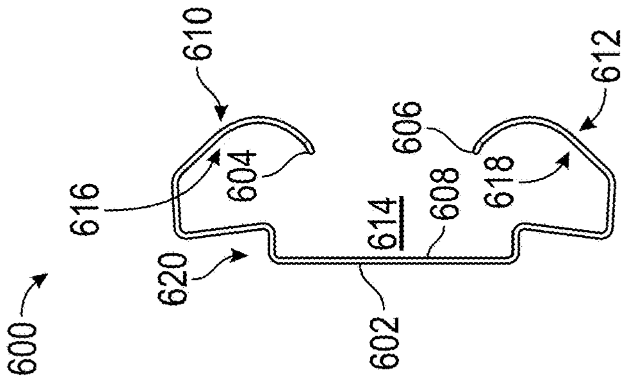
FIG. 39 illustrates an end view of the clip of FIG. 38.
Figure 38:
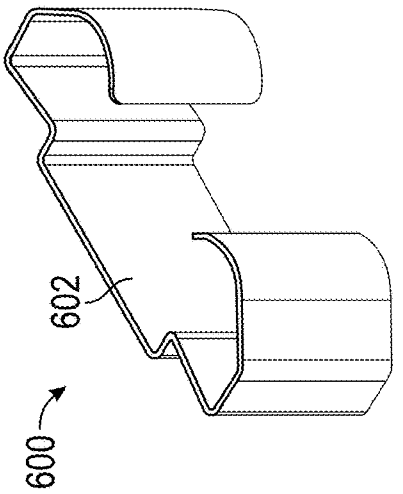
FIG. 38 illustrates a perspective view of a clip for installing the frame of FIG. 32 and the frame of FIG. 34 into the wall panel of FIG. 17.

FIGS. 38 and 39 illustrate a clip 600 configured to couple the frame 220 to wall panel frame 201 (FIG. 30). The clip 600 may be a spring clip. The clip 600 may be a contoured member configured to interact with the extrusion profile 500. The clip 600 may be molded, machined, or otherwise manufactured. The clip 600 may be flat, sheet metal or molded plastic or polymer. The clip 600 may have a first surface 602. The first surface 602 is contoured from a first terminal end 604 to a second terminal end 606. The clip 600 may have a second surface 608. The second surface 608 may follow the same contour as the first surface 602. The second surface 608 may be contoured from the first terminal end 604 to the second terminal end 606.

With continued reference to FIGS. 38 and 39, the clip 600 includes a first hook portion 610 and a second hook portion 612. The contour of the clip 600 is such that an interior portion 614 is defined between the second surface 608, an interior 616 of the first hook portion 610 and an interior 618 of the second hook portion 612. The contour of the clip 600 further forms a latch portion 620.

Figure 40:
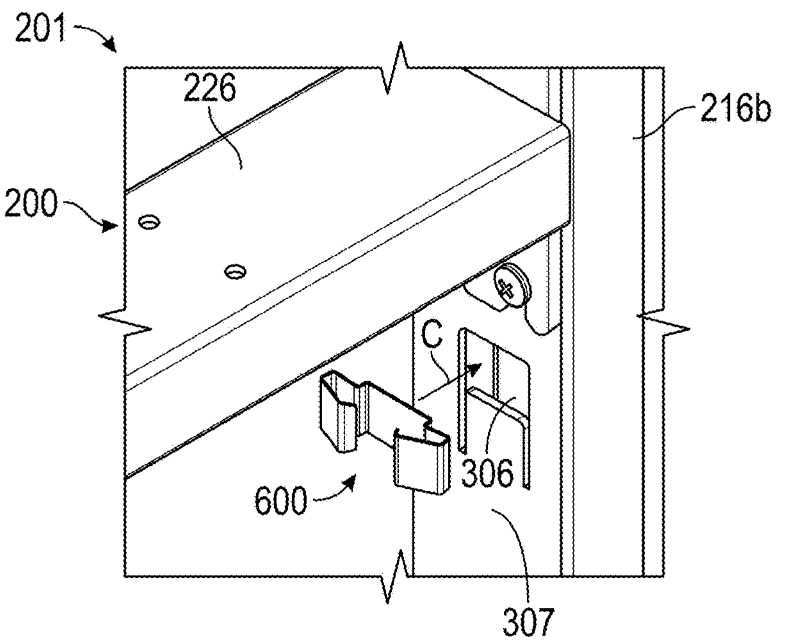
FIG. 40 illustrates a partial perspective view of the clip of FIG. 38 being installed in the wall panel of FIG. 17.
Figure 41:
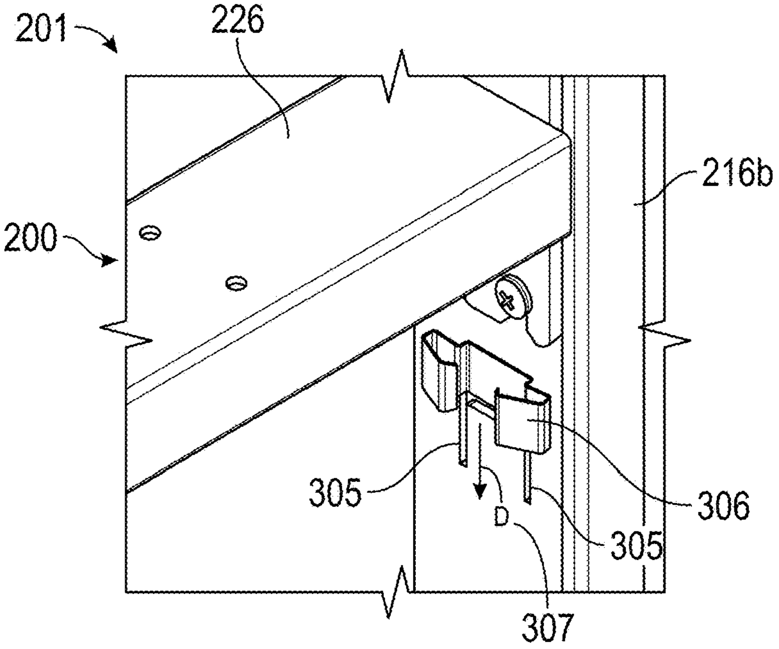
FIG. 41 illustrates a partial perspective view of the clip of FIG. 38 being installed in the wall panel of FIG. 17.

FIGS. 40 and 41 illustrate a portion of the wall panel frame 201 of the wall panel 200 showing the upper stretcher 226 and the post 216*b*. The spring clip 600 may be aligned with the cutout 306 and moved in the direction of arrow C toward the cutout 306. Once aligned with the cutout 306, the spring clip 600 may be moved in the direction of arrow D toward the flange 307. The latch portion 620 may extend into the cutout 306 and behind the flange 307. The corners of the latch portion 620 may extend in the lateral slots 305 such that the first hook portion 610 and the second hook portion 612 extend on an opposing side of the flange from the latch portion 620. The spring clip may be installed in FIGS. 40 and 41 by a hand, without any tools required.

Figure 42:
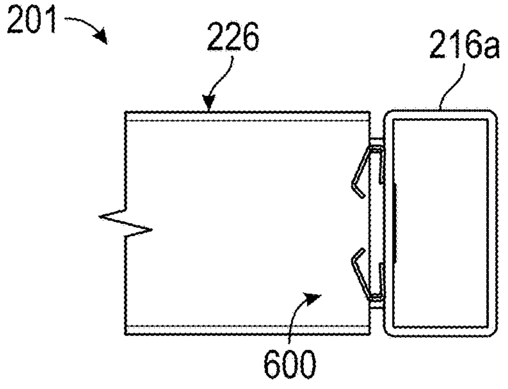
FIG. 42 illustrates a top view of the wall panel of FIG. 17 with the clip of FIG. 38 installed.
Figure 43:
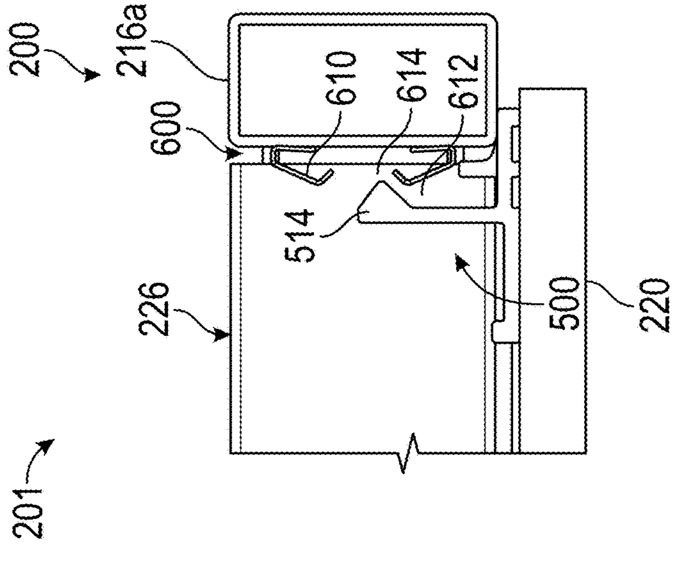
FIG. 43 illustrates a top view of the wall panel of FIG. 17 with the clip of FIG. 38 and the frame of FIG. 32 or the frame of FIG. 34 installed.

FIG. 42 illustrates a top view of the wall panel frame 201 showing a portion of the upper stretcher 226 and the post 216*a*. In FIG. 42, the clip 600 is fully installed on the post 216*a*. FIG. 43 illustrates the connection of the frame 220 to the wall panel frame 201 to form the wall panel 200. As illustrated, the extrusion profile 500 is aligned with the clip 600 for connection thereto. The hook portion 514 extends into the interior portion 614 and engages either the first hook portion 610 or the second hook portion 612 to secure the extrusion profile 500 to the clip 600 and thus secure the frame 220 to the wall panel frame 201.

Figure 44:
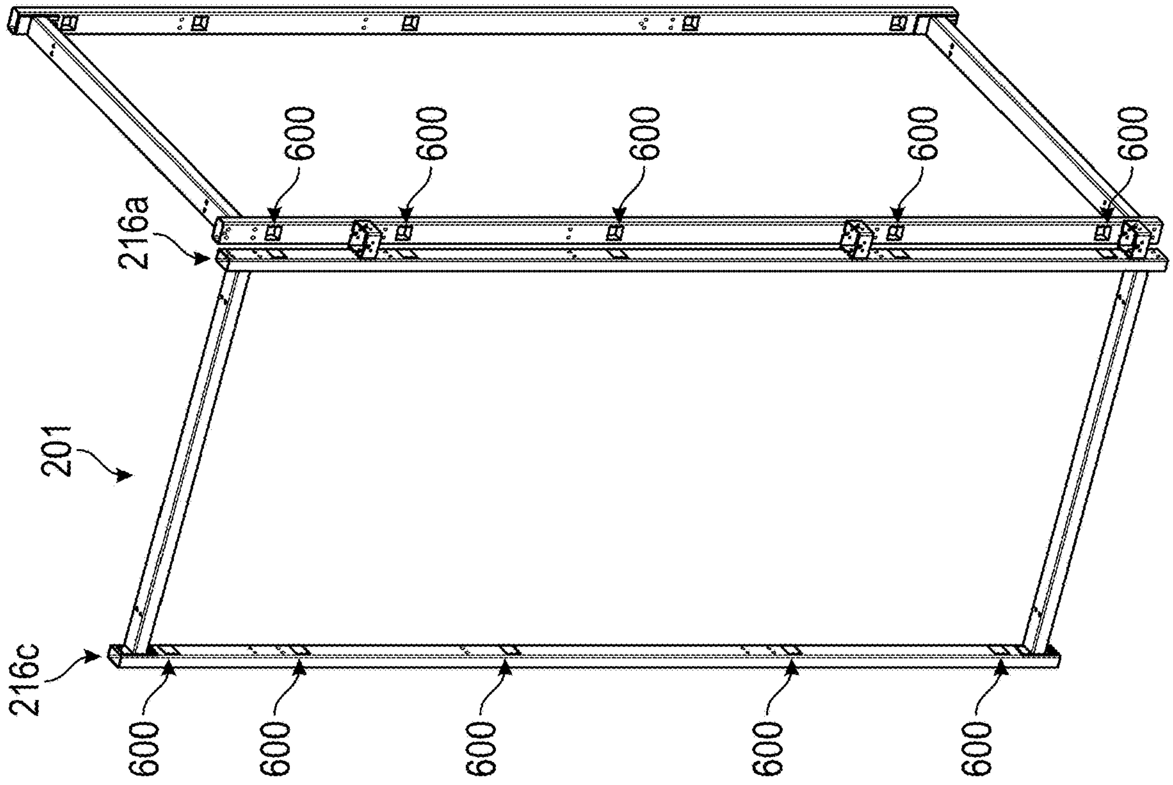
FIG. 44 illustrates a perspective view of a wall panel frame of the wall panel of FIG. 17.

In order to ensure a secure connection between the frame 220 and the wall panel frame 201, a plurality of clips 600 may be provided on the posts 216*a*, 216*b* as shown in FIG. 44. Ten clips 600 are shown in the wall panel frame 201 of FIG. 44, however more or fewer may be provided. Accordingly, when the wall panel frame 201 has been constructed, as described previously, the frame 220 may be installed on the wall panel frame 201.

To install the frame 220 on the wall panel frame 201, and referring back to FIGS. 30 and 43, the frame 220 is moved in the direction of arrow B. As the extrusion profile 500 on the lateral extrusions (e.g., FIG. 33, 376*a*, 380*a*) moves toward the clip 600, the hook portion 514 of the extrusion profile 500 causes the hook portion 612 on the clip 600 to depress inward toward the post 216*a*. Once the hook portion 514 passes the hook portion 612, the hook portion 612 extends back to its original position (e.g., the position of FIG. 43) and the hook portion 514 engages with the hook portion 612 to secure the frame 220 to the wall panel frame 201. As may be appreciated, if the frame 220 is oriented parallel to the wall panel frame 201 during installation, the extrusion profile 500 will depress all the spring clips 600 on the posts 216*a*, 21*c* (FIG. 44) simultaneously and will then release the depression and engage the spring clips 600 simultaneously. Although, in some embodiments, the profile 500 may not depress all spring clips 600 simultaneously and addition movement in the direction B will be required to fully engage the frame 220 with the wall panel frame 201.

Figure 45:
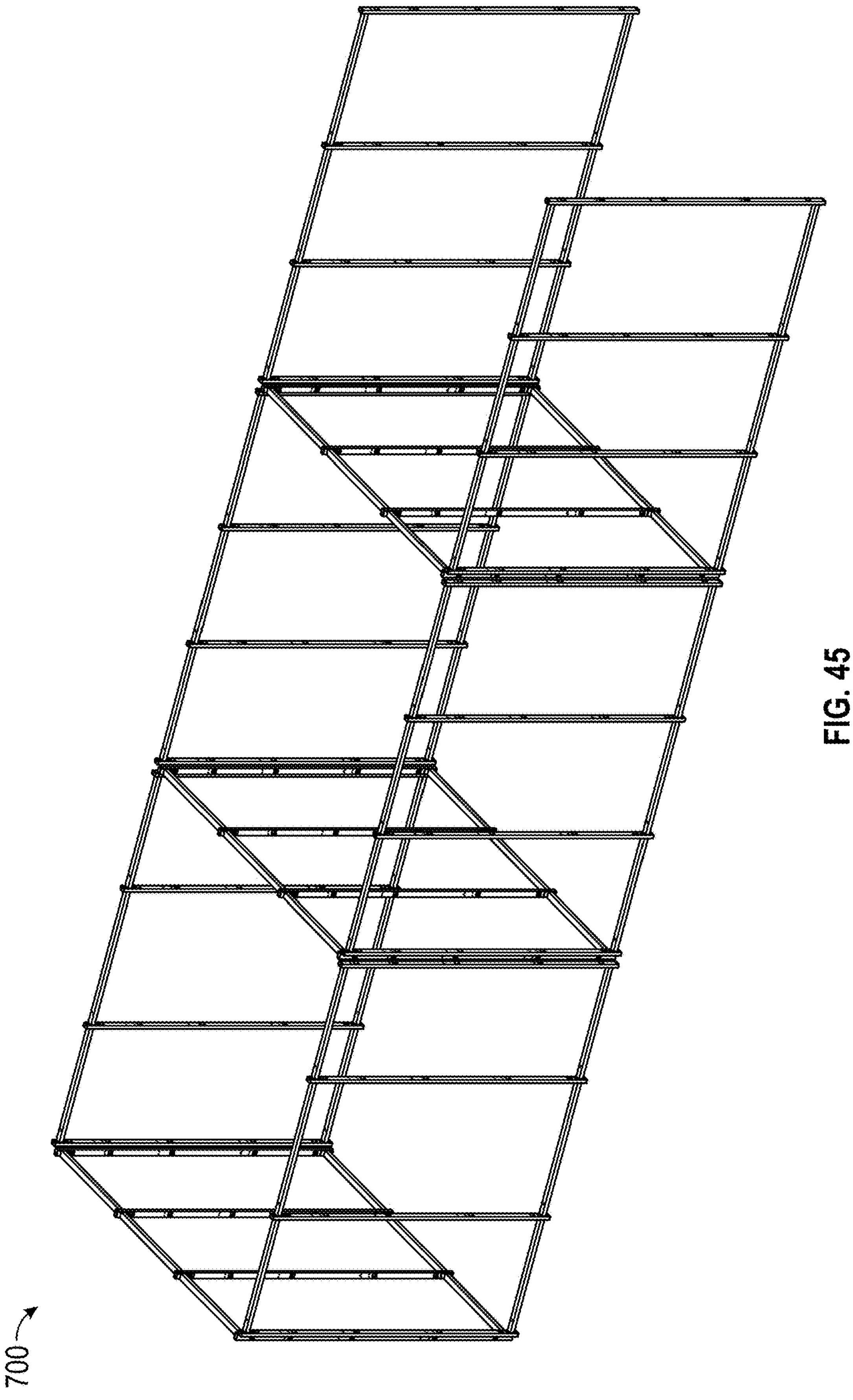
FIG. 45 illustrates a perspective view of a wall panel assembly using the wall panels of FIG. 17 before the frames of FIG. 32 or FIG. 34 are installed.
Figure 46:
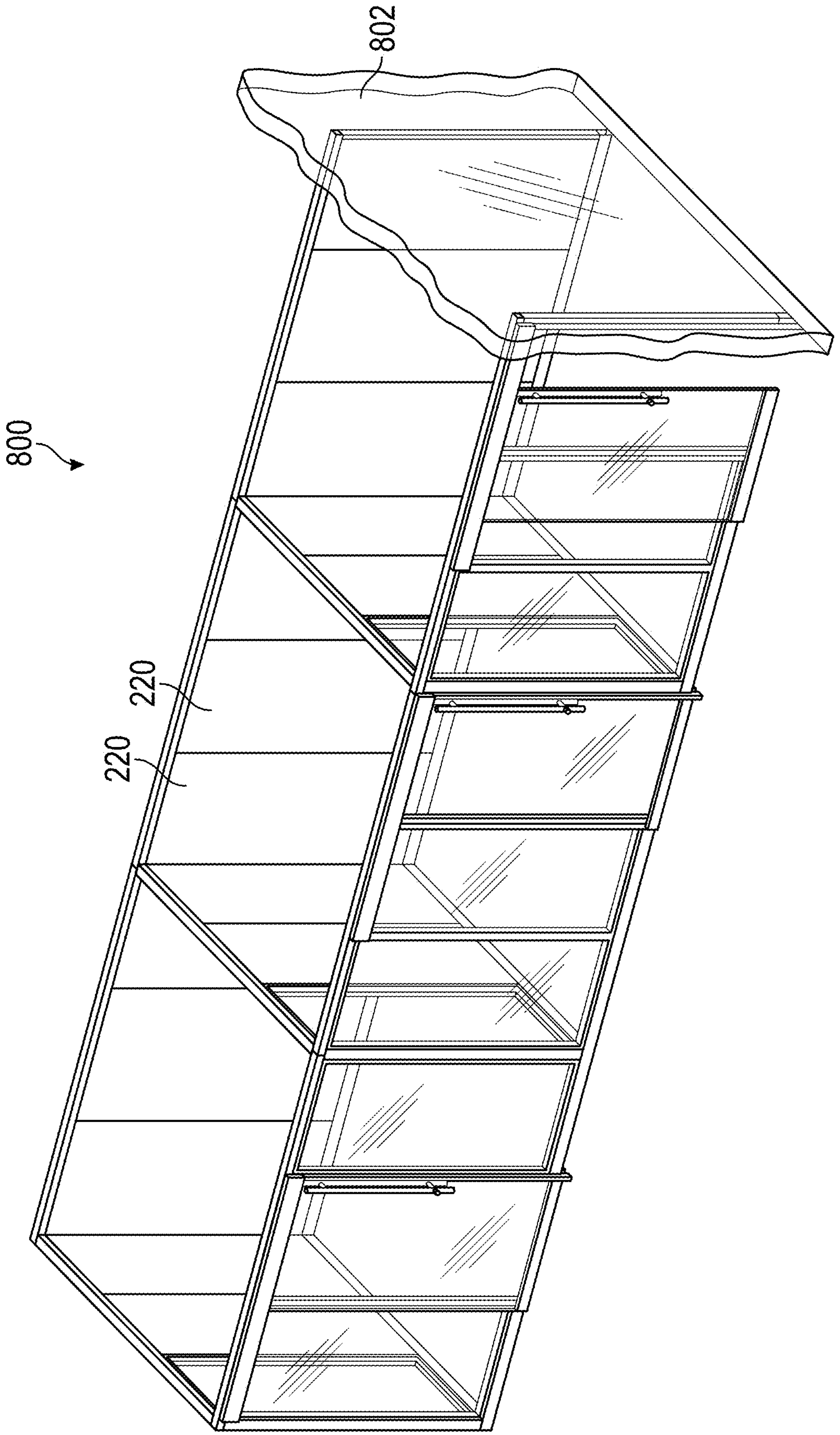
FIG. 46 illustrates a perspective view of the wall panel assembly of FIG. 45 with the frames installed.
Figure 47:
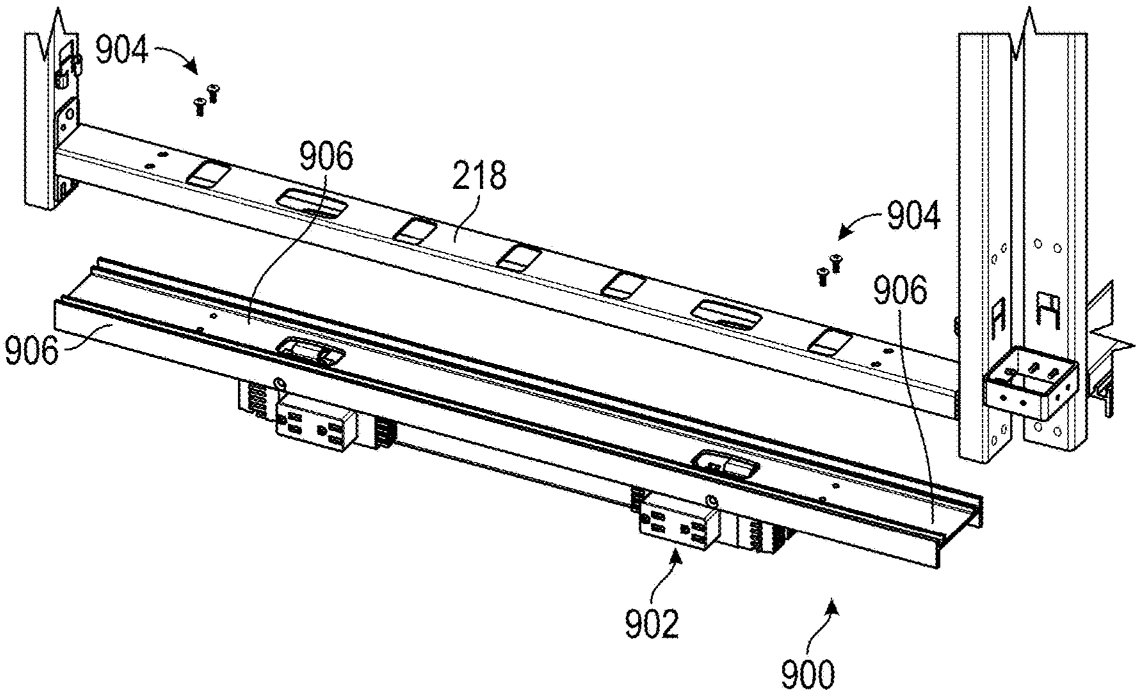
FIG. 47 illustrates a partial perspective view with an extrusion profile being installed on the lower stretcher of FIG. 20.
Figure 48:
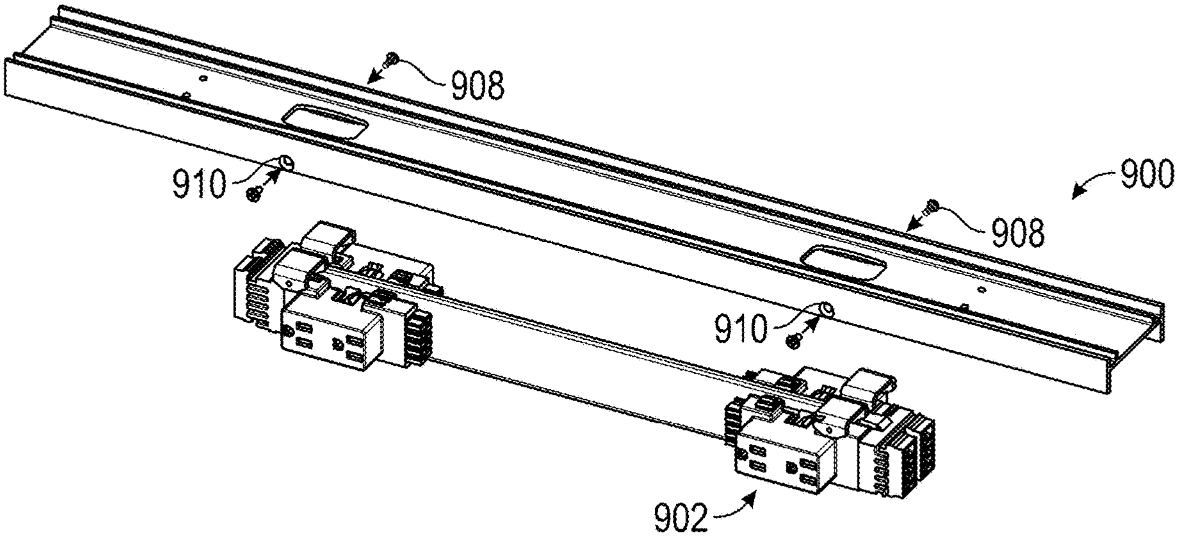
FIG. 48 illustrates a perspective view of an auxiliary unit being installed on the extrusion profile of FIG. 47.
Figure 49:
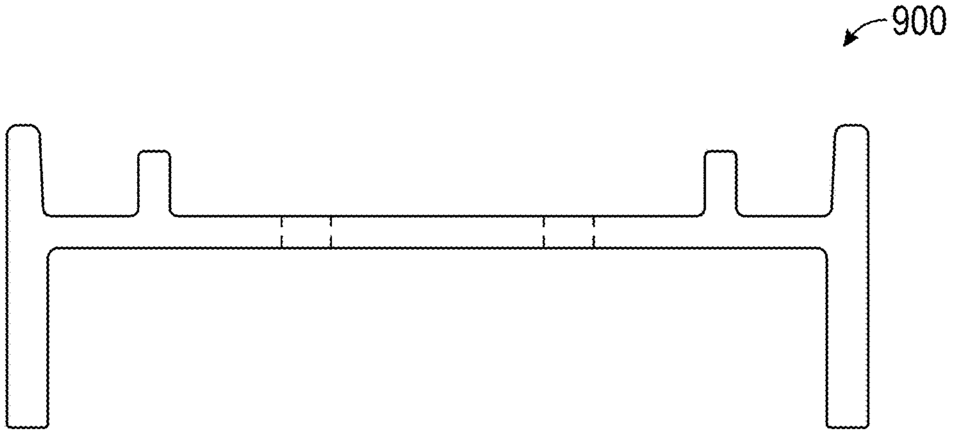
FIG. 49 illustrates an end view of the extrusion profile of FIG. 47.
Figure 50:
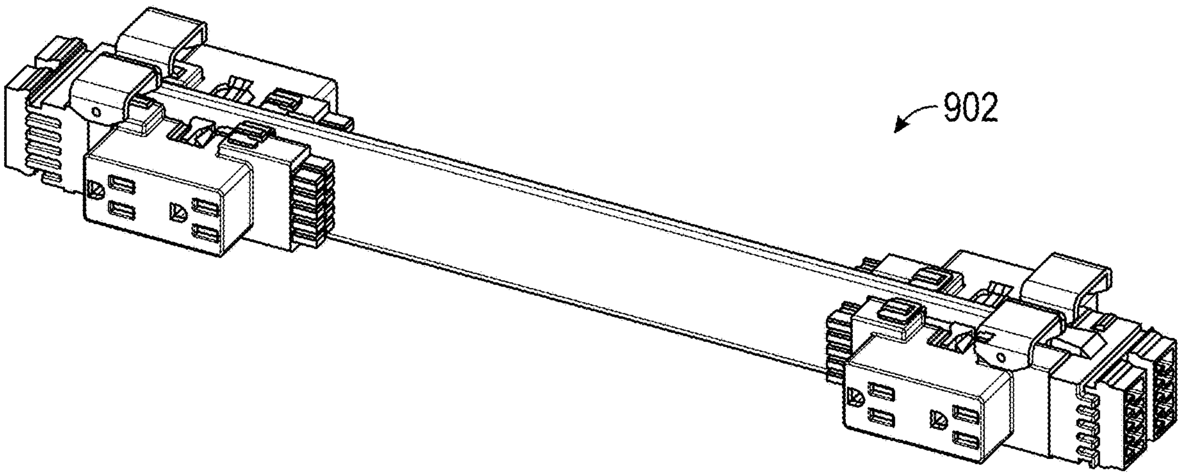
FIG. 50 illustrates a perspective view of an exemplary auxiliary unit for use with the extrusion profile of FIG. 47.

Accordingly, as appreciated from the forgoing disclosure, a limitless number of room or wall assembly designs are possible with the quick wall frames of the foregoing disclosure. To install a quick wall assembly, the wall panel frame 201 may be first constructed in the manner previously described. Then, the brackets may be coupled to the wall panel frames 201 such that a skeleton of the wall panel assembly is formed. For example, referring to FIG. 45, a skeleton 700 of a wall panel assembly is shown. Once the skeleton is formed, the frames 220 may be inserted therein to form the wall panel assembly. For example, referring to FIG. 46, the frames have been inserted into the skeleton 700 of FIG. 45 to form a wall panel assembly 800. The frames may be constructed of any material described herein to provide any desired interior design for the wall panel assembly 800. FIG. 46 illustrates the wall panel assembly 800 abutting a building wall 802, though such an abutment is not required. In some examples, the wall panel assembly 800 is secured to the building wall 802. As shown, some of the frames 220 may be doors, windows, solid walls, glass walls, or the like. When constructed as doors, the doors may be slidable with respect to the wall panel frames 201 or may pivot with respect to the wall panel frames 201.

In an example, auxiliary units may be incorporated into the wall panels 200 or wall panel assemblies. For example, as shown in FIGS. 47 to 50, the lower stretcher 218 may include a lower stretcher extrusion profile 900 secured thereto. An auxiliary unit 902 may be coupled to the extrusion profile 900. The auxiliary unit 902 may be, for example, but not limited to, an outlet, a USB port, electrical connection, power unit, air connection, or other connection points, etc. To install, the extrusion profile 900 may be secured to a lower surface of the lower stretcher 218 with one or more fasteners 904. The fasteners 904 may extend through openings 906 on the extrusion profile 900 and through openings 323 (FIG. 20) on the lower stretcher 218. The auxiliary unit 902 may be coupled to the extrusion profile 900 with one or more fasteners 908 extending through openings 910 in the side wall of the extrusion profile 900.

Many configurations of an enclosed space may be created with the described wall panel system. The wall panels 200 may be constructed such that multiple rooms or enclosures are created. Each room or enclosure may have an opening to gain entry. The opening may comprise a door as described above or any door suitable to gain entry, such as a hinged door. The multiple rooms or enclosures may be of the same or similar size or may be of varying sizes. The size of the room or enclosure may be dependent on the number of wall panels 200 used to construct the room or enclosure. The wall panels 200 may also be constructed so as to form hallways or may use an existing structure or wall to form one wall of an enclosure. Thus, individual customized spaces may be created based on the desired function and use of the space.

Although wall panels 10 and wall panels 200 are described separately, features from both embodiments are interchangeable with each other.

According to an embodiment, a wall panel may include: a first upright post; a second upright post; a lower stretcher for connecting the first upright post to the second upright post; an upper stretcher for connecting the first upright post to the second upright post; at least one frame for placement within the first upright post, the second upright post, the lower stretcher, and the upper stretcher; and a first retractable latch located on the at least one frame, the first retractable latch adapted to engage at least one of the first upright post, second upright post, lower stretcher, or upper stretcher.

According to an embodiment, a wall panel system may include: at least one wall panel, the at least one wall panel comprising, a first upright post; a second upright post; a lower stretcher for connecting the first upright post to the second upright post; an upper stretcher for connecting the first upright post to the second upright post; at least one frame for placement within the first upright post, the second upright post, the lower stretcher, and the upper stretcher; a first retractable latch located on the at least one frame; and a second retractable latch located on the at least one frame.

According to an embodiment, a frame for a wall panel may include an upper surface, a lower surface, a first side surface, and a second side surface opposing the first side surface; a rail located on the upper surface; a trench located on the lower surface; and a first retractable latch and a second retractable latch.

According to an embodiment, a method of assembling a wall panel system may include: providing a first upright post; providing a second upright post; connecting a lower stretcher to the first upright post and to the second upright post; connecting an upper stretcher to the first upright post and to the second upright post; connecting at least one frame within the first upright post, the second upright post, the lower stretcher, and the upper stretcher using a first retractable latch.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A wall panel comprising:

a wall panel frame having:

a first upright post;

a second upright post;

an upper stretcher connecting the first upright post to the second upright post; and a lower stretcher connecting the first upright post to the second upright post;

a frame having an extrusion profile, wherein the extrusion profile is configured to couple the frame to the wall panel frame; and a clip that is configured to engage the extrusion profile to couple the first upright post to the frame wherein the upper stretcher or the lower stretcher includes a hole pattern, the hole pattern configured to align with a hole pattern on the first upright post, the second upright post, or both the first upright post and the second upright post; and wherein the hole pattern on the upper stretcher the lower stretcher includes one or more slots configured to engage more or more fasteners installed in the hole pattern on the first upright post, the second upright post, or both the first upright post and the second upright post.

2. The wall panel of claim 1, wherein each of the first upright post and the second upright post includes one or more hole patterns.

3. The wall panel of claim 2, wherein the one or more hole patterns each includes a plurality of openings and a cutout.

4. The wall panel of claim 1, wherein the upper stretcher and the lower stretcher are identical.

5. The wall panel of claim 1, wherein the extrusion profile includes a hook portion configured to engage a hook portion on the clip to secure the frame to the first upright post.

6. The wall panel of claim 5, further comprising a second clip configured to couple the first upright post to the frame.

7. The wall panel of claim 6, wherein the hook portion of the extrusion profile is configured to engage a hook portion on the second clip to secure the frame to the first upright post.

8. The wall panel of claim 1, wherein the clip is a spring clip configured to move between a first, original state and a second, depressed state, wherein the extrusion profile causes the spring clip to move from the first, original state to the second, depressed state, and back again to the first, original state.

9. The wall panel of claim 1, wherein the clip is countered and includes a latch portion configured to couple to the first upright post and one or more hook portions configured to engage with the extrusion profile.

10. The wall panel of claim 1, wherein the extrusion profile includes a first lateral extrusion and a second lateral extrusion, and wherein the first lateral extrusion is configured to couple the frame to the first upright post and the second lateral extrusion is configured to couple the frame to the second upright post.

11. The wall panel of claim 10, wherein the first lateral extrusion and the second lateral extrusion are coupled to the same surface of the frame.

12. The wall panel of claim 10, wherein the first lateral extrusion is configured to couple to a plurality of clips on the first upright post and the second lateral extrusion is configured to couple to a plurality of clips on the second upright post.

13. The wall panel of claim 1, further comprising a second extrusion profile coupled to the lower stretcher, the second extrusion profile configured to couple an auxiliary unit to the lower stretcher.

14. The wall panel of claim 1, wherein the frame is a plurality of frames, and wherein adjacent frames of the plurality of frames are separated by an additional stretcher.

15. The wall panel of claim 1, wherein the upper stretcher and the lower stretcher each has a first end plate and a second end plate, wherein the first end plate has a first end plate hole pattern configured to align with a first upright post hole pattern on the first upright post, and wherein the second end plate comprises a second end plate hole pattern configured to align with a second upright post hole pattern on the second upright post.

16. The wall panel of claim 15, wherein the first end plate hole pattern and the second end plate hole pattern each comprises at least one slot configured to slide over a fastener previously secured in the first upright post hole pattern and the second upright hole pattern respectively.

17. The wall panel of claim 15, wherein the first end plate hole pattern and the second end plate hole pattern each comprises at least one discrete hole, and wherein a fastener is installed in the discrete hole after the first end plate hole pattern is aligned with the first upright post hole pattern and the second end plate hole pattern is aligned with the second upright post hole pattern.

18. A wall panel assembly comprising:

a plurality of wall panels, each wall panel having:

a first upright post;

a second upright post;

an upper stretcher connecting the first upright post to the second upright post;

a lower stretcher connecting the first upright post to the second upright post;

a frame having an extrusion profile, wherein the extrusion profile is configured to couple the frame to first upright post and the second upright post;

a clip that is configured to engage the extrusion profile to couple the first upright post to the frame; and one or more brackets configured to join the first upright post of adjacent wall panels of the plurality of wall panels wherein the upper stretcher or the lower stretcher includes a hole pattern, the hole pattern configured to align with a hole pattern on the first upright post, the second upright post, or both the first upright post and the second upright post; and wherein the hole pattern on the upper stretcher the lower stretcher includes one or more slots configured to engage more or more fasteners installed in the hole pattern on the first upright post, the second upright post, or both the first upright post and the second upright post.

19. The wall panel assembly of claim 18, wherein each of the one or more brackets includes a hole pattern configured to align with a hole pattern on the first upright post, the second upright post, or both the first upright post and the second upright post.

20. The wall panel assembly of claim 18, wherein the plurality of wall panels are configured to be connected to adjacent wall panels in a linear configuration sharing one of the first upright post and the second upright post between the adjacent wall panels.

21. The wall panel assembly of claim 18, wherein the plurality of wall panels are configured to be connected to adjacent wall panels at 90-degree angles by the one or more brackets.

22. The wall panel assembly of claim 18, wherein the frame is a plurality of frames, and wherein adjacent frames of the plurality of frames are separated by an additional stretcher.

* * * * *